(12) United States Patent
Klingenberg et al.

(10) Patent No.: US 10,078,810 B2
(45) Date of Patent: Sep. 18, 2018

(54) SYSTEMS AND METHODS FOR PROVIDING PERSONALIZED DELIVERY SERVICES

(71) Applicant: United Parcel Service of America, Inc., Atlanta, GA (US)

(72) Inventors: Robert Lee Klingenberg, Atlanta, GA (US); Joe Rizzo, Woodstock, GA (US); Sumeet Pradeep Shroff, Chamblee, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 13/913,066

(22) Filed: Jun. 7, 2013

(65) Prior Publication Data
US 2013/0275328 A1  Oct. 17, 2013

Related U.S. Application Data

(63) Continuation of application No. 13/326,750, filed on Dec. 15, 2011, now abandoned, which is a
(Continued)

(51) Int. Cl.
*G06Q 10/08* (2012.01)
*G06Q 20/20* (2012.01)
*G06Q 30/06* (2012.01)

(52) U.S. Cl.
CPC ......... *G06Q 10/0835* (2013.01); *G06Q 10/08* (2013.01); *G06Q 10/083* (2013.01);
(Continued)

(58) Field of Classification Search
CPC .. G06Q 10/0835; G06Q 19/08; G06Q 10/083; G06Q 10/0832
(Continued)

(56) References Cited

U.S. PATENT DOCUMENTS 3,721,096 A  3/1973 Deckert, Jr. et al.
3,876,059 A  4/1975 Durst
(Continued)

FOREIGN PATENT DOCUMENTS

CN  1643534 A  7/2005
CN  101203873 A  6/2008
(Continued)

OTHER PUBLICATIONS

United States Patent and Trademark Office, Office Action for U.S. Appl. No. 10/696,180, Jul. 18, 2013, 38 pages, USA.
(Continued)

*Primary Examiner* — Vanel Frenel
(74) *Attorney, Agent, or Firm* — Shook, Hardy & Bacon L.L.P.

(57) ABSTRACT

Systems and methods are disclosed for providing personalized delivery services by a carrier providing a package delivery service. For example, a consignee may indicate a delivery preference to be applied to delivery of a package, such as indicating a specific location where the package is to be left upon delivery, if the consignee is not present to accept the package. In one embodiment, the consignee may be notified by the carrier of the scheduled delivery of the package prior to a first delivery attempt, and may be linked to the carrier's web site to indicate a delivery preference. Alternatively, the delivery preference may be indicated by the consignee proactively accessing the web site. After conveying a delivery preference, the carrier's systems communicate the delivery preference at the appropriate time to a portable computing device which informs the delivery personnel of the consignee's delivery preference. Other embodiments allow the consignor to indicate delivery preferences.

8 Claims, 29 Drawing Sheets

Related U.S. Application Data continuation of application No. 12/616,183, filed on Nov. 11, 2009, now Pat. No. 8,108,259, which is a continuation of application No. 11/460,268, filed on Jul. 27, 2006, now Pat. No. 7,765,131, which is a continuation of application No. 11/425,333, filed on Jun. 20, 2006, now Pat. No. 7,657,466.

(60) Provisional application No. 60/750,684, filed on Dec. 14, 2005, provisional application No. 60/692,849, filed on Jun. 21, 2005, provisional application No. 60/701,712, filed on Jul. 22, 2005.

(52) U.S. Cl.
CPC ....... *G06Q 10/087* (2013.01); *G06Q 10/0832* (2013.01); *G06Q 10/0833* (2013.01); *G06Q 10/0838* (2013.01); *G06Q 20/203* (2013.01); *G06Q 30/0633* (2013.01)

(58) Field of Classification Search
USPC .................. 705/330, 28, 29, 7.27, 37, 26.81
See application file for complete search history.

(56) References Cited

U.S. PATENT DOCUMENTS

| | | |
|---|---|---|
| 3,933,031 A | 1/1976 | Uhlarik |
| 4,111,601 A | 9/1978 | Richard |
| 4,832,204 A | 5/1989 | Handy et al. |
| 5,153,842 A | 10/1992 | Dlugos, Sr. et al. |
| 5,168,444 A | 12/1992 | Cukor et al. |
| 5,375,240 A | 12/1994 | Grundy |
| 5,400,020 A | 3/1995 | Jones et al. |
| 5,444,444 A | 8/1995 | Ross |
| 5,460,110 A | 10/1995 | Eronen et al. |
| 5,623,260 A | 4/1997 | Jones |
| 5,648,770 A | 7/1997 | Ross |
| 5,656,799 A | 8/1997 | Ramsden et al. |
| 5,657,010 A | 8/1997 | Jones |
| 5,659,731 A | 8/1997 | Gustafson |
| 5,668,543 A | 9/1997 | Jones |
| 5,711,670 A | 1/1998 | Barr |
| 5,786,748 A | 7/1998 | Nikolic et al. |
| 5,831,860 A | 11/1998 | Foladare et al. |
| 5,835,377 A | 11/1998 | Bush |
| 5,884,272 A | 3/1999 | Walker et al. |
| 6,029,140 A | 2/2000 | Martin et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,292,709 B1 | 9/2001 | Uhl et al. |
| 6,304,856 B1 * | 10/2001 | Soga et al. ....................... 705/28 |
| 6,313,760 B1 | 11/2001 | Jones |
| 6,317,060 B1 | 11/2001 | Jones |
| 6,323,254 B1 | 11/2001 | Weikard et al. |
| 6,343,275 B1 | 1/2002 | Wong |
| 6,344,796 B1 | 2/2002 | Ogilvie et al. |
| 6,356,196 B1 | 3/2002 | Wong et al. |
| 6,363,323 B1 | 3/2002 | Jones |
| 6,411,891 B1 | 6/2002 | Jones |
| 6,422,506 B1 | 7/2002 | Colby |
| 6,442,589 B1 | 8/2002 | Takahashi et al. |
| 6,463,354 B1 | 10/2002 | Pintsov |
| 6,463,420 B1 | 10/2002 | Guidice et al. |
| 6,486,801 B1 | 11/2002 | Jones |
| 6,492,912 B1 | 12/2002 | Jones |
| 6,510,383 B1 | 1/2003 | Jones |
| 6,536,659 B1 | 3/2003 | Hauser et al. |
| 6,539,360 B1 | 3/2003 | Kadaba |
| 6,606,604 B1 | 8/2003 | Dutta |
| 6,618,668 B1 | 9/2003 | Laird |
| 6,634,551 B2 | 10/2003 | Barta et al. |
| 6,683,542 B1 | 1/2004 | Jones |
| 6,700,507 B2 | 3/2004 | Jones |
| 6,701,299 B2 | 3/2004 | Kraisser et al. |
| 6,714,859 B2 | 3/2004 | Jones |
| 6,741,927 B2 | 5/2004 | Jones |
| 6,748,318 B1 | 6/2004 | Jones |
| 6,748,320 B2 | 6/2004 | Jones |
| 6,763,299 B2 | 7/2004 | Jones |
| 6,763,300 B2 | 7/2004 | Jones |
| 6,765,487 B1 | 7/2004 | Holmes et al. |
| 6,772,130 B1 | 8/2004 | Karbowski et al. |
| 6,804,606 B2 | 10/2004 | Jones |
| 6,845,448 B1 | 1/2005 | Chaganti et al. |
| 6,859,722 B2 | 2/2005 | Jones |
| 6,862,612 B1 | 3/2005 | Horn et al. |
| 6,902,109 B2 | 6/2005 | Barta et al. |
| 6,904,359 B2 | 6/2005 | Jones |
| 6,931,314 B2 | 8/2005 | Holland et al. |
| 6,952,645 B1 | 10/2005 | Jones |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,994,253 B2 | 2/2006 | Miller et al. |
| 7,028,895 B2 | 4/2006 | Ashaari |
| 7,030,781 B2 | 4/2006 | Jones |
| 7,031,959 B2 | 4/2006 | Garner et al. |
| 7,039,813 B2 | 5/2006 | Algazi et al. |
| 7,130,803 B1 | 10/2006 | Couch et al. |
| 7,152,375 B1 | 12/2006 | Mastro et al. |
| 7,158,948 B1 | 1/2007 | Rodriguez et al. |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,257,552 B1 | 8/2007 | Franco |
| 7,305,404 B2 | 12/2007 | Owens et al. |
| 7,312,702 B1 | 12/2007 | Willms et al. |
| 7,331,248 B2 | 2/2008 | Maresca, Jr. et al. |
| 7,363,126 B1 | 4/2008 | Zhong et al. |
| 7,376,598 B2 | 5/2008 | Estes et al. |
| 7,385,499 B2 | 6/2008 | Horton et al. |
| 7,422,149 B2 | 9/2008 | Aptekar |
| 7,479,899 B2 | 1/2009 | Horstemeyer |
| 7,501,946 B2 | 3/2009 | Lanigan et al. |
| 7,511,617 B2 | 3/2009 | Burman |
| 7,528,722 B2 | 5/2009 | Nelson |
| 7,531,163 B2 | 5/2009 | Samadpour |
| 7,542,972 B2 | 6/2009 | Owens et al. |
| 7,574,366 B2 | 8/2009 | Burman |
| 7,580,845 B2 | 8/2009 | Burman |
| 7,624,024 B2 | 11/2009 | Levis et al. |
| 7,647,231 B2 | 1/2010 | Kuebert et al. |
| 7,657,466 B2 | 2/2010 | Klingenberg et al. |
| 7,693,723 B2 | 4/2010 | Wade |
| 7,711,654 B2 | 5/2010 | Schmidtberg et al. |
| 7,712,670 B2 | 5/2010 | Sauerwein, Jr. et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,831,439 B1 | 11/2010 | Bryar et al. |
| 7,848,961 B2 | 12/2010 | Estes et al. |
| 7,853,481 B1 * | 12/2010 | Johnson ............... G06Q 10/08 705/26.42 |
| 7,868,753 B2 | 1/2011 | Jenkins |
| 7,912,854 B2 | 3/2011 | Owens et al. |
| 7,962,422 B1 | 6/2011 | Melechko et al. |
| 7,969,306 B2 | 6/2011 | Ebert et al. |
| 7,984,289 B2 | 7/2011 | Orbke et al. |

(56) References Cited

U.S. PATENT DOCUMENTS

| | | | |
|---|---|---|---|
| 7,996,328 B1 | 8/2011 | Lundberg et al. |
| 8,015,023 B1 | 9/2011 | Lee et al. |
| 8,027,933 B2 | 9/2011 | Lou et al. |
| 8,036,993 B2 | 10/2011 | Estes |
| 8,068,930 B2 | 11/2011 | Perez et al. |
| 8,103,521 B2 | 1/2012 | Kuebert et al. |
| 8,103,716 B2 | 1/2012 | Boyce et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,291,234 B2 | 10/2012 | Snapp et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,386,516 B2 | 2/2013 | Owens et al. |
| 8,429,019 B1 | 4/2013 | Yeatts et al. |
| 8,463,568 B1 | 6/2013 | Wynn |
| 8,489,520 B2 | 7/2013 | Kuebert et al. |
| 8,554,694 B1 | 10/2013 | Ward et al. |
| 8,577,802 B1 | 11/2013 | Nichols et al. |
| 8,645,232 B1 | 2/2014 | Cole et al. |
| 8,731,699 B2 | 5/2014 | Nagy et al. |
| 8,736,633 B2 | 5/2014 | Gurusamy |
| 8,812,374 B1* | 8/2014 | Sriram ............ H04N 21/47815 705/1.1 |
| 9,032,032 B2 | 5/2015 | Mills et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0032573 A1* | 3/2002 | Williams ............... G06Q 10/08 705/335 |
| 2002/0032612 A1 | 3/2002 | Williams et al. |
| 2002/0032623 A1* | 3/2002 | Wheeler ............ G06Q 10/087 705/28 |
| 2002/0042808 A1 | 4/2002 | Smith et al. |
| 2002/0070882 A1 | 6/2002 | Jones |
| 2002/0073039 A1 | 6/2002 | Ogg et al. |
| 2002/0082770 A1 | 6/2002 | Jones |
| 2002/0087371 A1* | 7/2002 | Abendroth ............ G06Q 10/02 705/37 |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0130065 A1 | 9/2002 | Bloom |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0178074 A1* | 11/2002 | Bloom .................. G06Q 10/08 705/26.81 |
| 2003/0003936 A1 | 1/2003 | Tighe |
| 2003/0004893 A1* | 1/2003 | Blaesche .................. B07C 3/00 705/64 |
| 2003/0032573 A1 | 2/2003 | Tanner et al. |
| 2003/0036938 A1 | 2/2003 | Dutta et al. |
| 2003/0037009 A1 | 2/2003 | Tobin et al. |
| 2003/0074411 A1 | 4/2003 | Nale |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0182017 A1 | 9/2003 | O'Donohue et al. |
| 2003/0193414 A1 | 10/2003 | Jones |
| 2003/0195811 A1 | 10/2003 | Hayes et al. |
| 2004/0030478 A1 | 2/2004 | Holland et al. |
| 2004/0073499 A1 | 4/2004 | Martin et al. |
| 2004/0088224 A1 | 5/2004 | Mukai |
| 2004/0093312 A1 | 5/2004 | Cordery et al. |
| 2004/0117326 A1 | 6/2004 | Amato |
| 2004/0133446 A1 | 7/2004 | Myrick et al. |
| 2004/0149824 A1 | 8/2004 | Miller et al. |
| 2004/0158351 A1 | 8/2004 | Rivalto |
| 2004/0193438 A1 | 9/2004 | Stashluk et al. |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0227630 A1 | 11/2004 | Shannon et al. |
| 2004/0241644 A1 | 12/2004 | Samadpour |
| 2004/0243430 A1 | 12/2004 | Horstemeyer |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1 | 1/2005 | McLellan et al. |
| 2005/0038758 A1 | 2/2005 | Hilbush et al. |
| 2005/0043845 A1 | 2/2005 | Wiechers |
| 2005/0071258 A1 | 3/2005 | Kumakawa |
| 2005/0080638 A1 | 4/2005 | Maseruka |
| 2005/0082752 A1 | 4/2005 | Acosta |
| 2005/0104716 A1 | 5/2005 | Simms et al. |
| 2005/0114221 A1 | 5/2005 | Walters et al. |
| 2005/0177387 A1 | 8/2005 | Mojsa |
| 2005/0216144 A1 | 9/2005 | Baldassa |
| 2005/0216294 A1* | 9/2005 | Labow ............... G06Q 10/0833 705/333 |
| 2005/0216553 A1 | 9/2005 | Mallonee et al. |
| 2005/0251402 A1 | 11/2005 | Olsen et al. |
| 2005/0252596 A1 | 11/2005 | Olsen et al. |
| 2006/0010037 A1 | 1/2006 | Angert et al. |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0074729 A1 | 4/2006 | Capotosto et al. |
| 2006/0085273 A1 | 4/2006 | Mayer et al. |
| 2006/0097896 A1 | 5/2006 | Jones |
| 2006/0100970 A1* | 5/2006 | Morony .................. G06Q 10/08 705/330 |
| 2006/0149577 A1 | 7/2006 | Stashluk et al. |
| 2006/0229895 A1 | 10/2006 | Kodger, Jr. |
| 2006/0248941 A1 | 11/2006 | Maresca et al. |
| 2006/0255136 A1 | 11/2006 | Wagner et al. |
| 2006/0282277 A1 | 12/2006 | Ng |
| 2007/0000989 A1 | 1/2007 | Kadaba |
| 2007/0005452 A1 | 1/2007 | Klingenberg et al. |
| 2007/0078797 A1 | 4/2007 | Won et al. |
| 2007/0083410 A1 | 4/2007 | Hanna |
| 2007/0133876 A1 | 6/2007 | Chande et al. |
| 2007/0150533 A1 | 6/2007 | Krause et al. |
| 2007/0156415 A1 | 7/2007 | Foth et al. |
| 2007/0156439 A1 | 7/2007 | Fyda et al. |
| 2007/0192191 A1 | 8/2007 | Neal et al. |
| 2007/0200671 A1 | 8/2007 | Kelley et al. |
| 2007/0202802 A1 | 8/2007 | Kallio et al. |
| 2007/0257774 A1 | 11/2007 | Stumpert et al. |
| 2008/0004995 A1 | 1/2008 | Klingenberg et al. |
| 2008/0125959 A1 | 5/2008 | Doherty et al. |
| 2008/0133261 A1 | 6/2008 | Ray |
| 2008/0154781 A1 | 6/2008 | Kumar |
| 2008/0162241 A1* | 7/2008 | Betancourt .......... G06Q 10/083 705/337 |
| 2008/0172305 A1 | 7/2008 | Estes et al. |
| 2008/0201155 A1 | 8/2008 | Som |
| 2008/0208772 A1 | 8/2008 | Rundle |
| 2008/0210749 A1 | 9/2008 | Skaaksrud et al. |
| 2008/0221913 A1 | 9/2008 | Cook et al. |
| 2008/0223940 A1 | 9/2008 | Lee et al. |
| 2008/0281719 A1 | 11/2008 | Hall et al. |
| 2008/0312991 A1 | 12/2008 | Bharadwaj et al. |
| 2008/0319970 A1 | 12/2008 | Garner et al. |
| 2008/0320092 A1 | 12/2008 | Campbell et al. |
| 2009/0012802 A1 | 1/2009 | Pinney |
| 2009/0046892 A1 | 2/2009 | Avant et al. |
| 2009/0106124 A1 | 4/2009 | Yang |

(56) References Cited

U.S. PATENT DOCUMENTS

| | | |
|---|---|---|
| 2009/0138730 A1 | 5/2009 | Cook et al. |
| 2009/0146832 A1 | 6/2009 | Ebert et al. |
| 2009/0164295 A1 | 6/2009 | Sion |
| 2009/0164390 A1 | 6/2009 | Calman et al. |
| 2009/0173672 A1 | 7/2009 | Avant et al. |
| 2009/0187489 A1 | 7/2009 | Mallick et al. |
| 2009/0269760 A1 | 10/2009 | Samadpour |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2009/0327361 A1 | 12/2009 | Mills et al. |
| 2010/0004960 A1 | 1/2010 | Frankenberg et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100229 A1 | 4/2010 | Whitson et al. |
| 2010/0100497 A1 | 4/2010 | Kuebert et al. |
| 2010/0121689 A1 | 5/2010 | Wallace et al. |
| 2010/0185565 A1 | 7/2010 | Wade |
| 2010/0211426 A1 | 8/2010 | McClurg |
| 2010/0211444 A1 | 8/2010 | Spear |
| 2010/0235210 A1 | 9/2010 | Nadrotowicz, Jr. |
| 2010/0299278 A1 | 11/2010 | Kriss et al. |
| 2011/0004562 A1 | 1/2011 | Hennessy et al. |
| 2011/0022532 A1 | 1/2011 | Kriss |
| 2011/0060552 A1 | 3/2011 | Ono |
| 2011/0125665 A1 | 5/2011 | Kadaba |
| 2011/0238195 A1 | 9/2011 | Nagy et al. |
| 2011/0270714 A1 | 11/2011 | Myrick et al. |
| 2011/0320308 A1 | 12/2011 | Herrington |
| 2012/0016948 A1 | 1/2012 | Sinha |
| 2012/0030133 A1 | 2/2012 | Rademaker |
| 2012/0047085 A1 | 2/2012 | Naghshineh et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0173308 A1 | 7/2012 | Brown et al. |
| 2012/0173448 A1 | 7/2012 | Rademaker |
| 2012/0179622 A1 | 7/2012 | Amato |
| 2012/0208559 A1 | 8/2012 | Svendsen et al. |
| 2012/0235791 A1 | 9/2012 | Donlan et al. |
| 2012/0246077 A1 | 9/2012 | Skaaksrud et al. |
| 2012/0303538 A1 | 11/2012 | Marcus et al. |
| 2012/0303539 A1 | 11/2012 | Marcus et al. |
| 2012/0303540 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2013/0006731 A1 | 1/2013 | Cook et al. |
| 2013/0006777 A1 | 1/2013 | Krishnareddy et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0054054 A1 | 2/2013 | Tollenaere et al. |
| 2013/0066744 A1 | 3/2013 | Higgins et al. |
| 2013/0073336 A1 | 3/2013 | Heath |
| 2013/0113819 A1 | 5/2013 | Gurusamy |
| 2013/0144428 A1 | 6/2013 | Irwin et al. |
| 2013/0212037 A1 | 8/2013 | Briggman et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262336 A1 | 10/2013 | Wan et al. |
| 2013/0275328 A1 | 10/2013 | Klingenberg et al. |
| 2013/0291079 A1 | 10/2013 | Lowe et al. |
| 2014/0052661 A1 | 2/2014 | Shakes et al. |
| 2014/0222711 A1 | 8/2014 | Tibbs et al. |
| 2014/0266668 A1 | 9/2014 | Blankenship et al. |
| 2015/0081587 A1 | 3/2015 | Gillen |
| 2015/0134560 A1 | 5/2015 | Krishnaiahsetty |
| 2015/0154559 A1 | 6/2015 | Barbush et al. |

FOREIGN PATENT DOCUMENTS

| | | |
|---|---|---|
| CN | 102567883 A1 | 7/2012 |
| DE | 19644163 A1 | 5/1998 |
| DE | 10007897 C1 | 6/2001 |
| GB | 2483220 A | 3/2012 |
| JP | 10-2007956 | 7/1998 |
| JP | 11-139540 | 5/1999 |
| JP | 2000-339373 | 8/2000 |
| JP | 2001-014393 | 1/2001 |
| JP | 2001-022678 | 1/2001 |
| JP | 2002-042008 | 2/2002 |
| JP | 2002-056307 | 2/2002 |
| JP | 2005-213020 A | 8/2005 |
| JP | 2006-206225 A | 8/2006 |
| TW | 201220221 A | 5/2012 |
| WO | WO 2000/019170 A1 | 4/2000 |
| WO | WO 2000/019171 A1 | 4/2000 |
| WO | WO 00/30014 A1 | 5/2000 |
| WO | WO 00/46726 | 8/2000 |
| WO | WO 00/46728 | 8/2000 |
| WO | WO 2000/052422 A1 | 9/2000 |
| WO | WO 01/16889 A1 | 3/2001 |
| WO | WO 01/29778 A1 | 4/2001 |
| WO | WO 01/35344 A2 | 5/2001 |
| WO | WO 01/39031 A2 | 5/2001 |
| WO | WO 01/65454 A2 | 9/2001 |
| WO | WO 01/67344 A1 | 9/2001 |
| WO | WO 2001/065451 A1 | 9/2001 |
| WO | WO 2001/065523 A1 | 9/2001 |
| WO | WO 2001/065524 A1 | 9/2001 |
| WO | WO 01/72109 A2 | 10/2001 |
| WO | WO 01/84359 A2 | 11/2001 |
| WO | WO 01/88831 A2 | 11/2001 |
| WO | WO 01/97101 A2 | 12/2001 |
| WO | WO 02/07104 A1 | 1/2002 |
| WO | WO 02/17045 A2 | 2/2002 |
| WO | WO 02/052378 A2 | 7/2002 |
| WO | WO 2003/034293 A1 | 4/2003 |
| WO | WO 2004/015518 A3 | 2/2004 |
| WO | WO 2005/105329 A1 | 11/2005 |
| WO | WO 2011/017286 A2 | 2/2011 |
| WO | WO 2011/0150971 A2 | 12/2011 |
| WO | WO 2012/045182 A1 | 4/2012 |
| WO | WO 2012/129529 A1 | 9/2012 |
| WO | WO 2012/135143 A2 | 10/2012 |
| WO | WO 2012/161728 A1 | 11/2012 |
| WO | WO 2012/161730 A2 | 11/2012 |
| WO | WO 2012/161731 A2 | 11/2012 |
| WO | WO 2012/161732 A2 | 11/2012 |

OTHER PUBLICATIONS

Brewin, Bob and Rosencrance, Linda, Follow That Package!, Article, Mar. 19, 2001 (Retrieved from the Internet Apr. 25, 2003), p. 1-p. 5, Retrieved from the Internet.

Caminiti et al., United Parcel Service Introduces Advanced Label Imaging System, Published by Business Wire on Nov. 29, 1989, Section 1, p. 1, Downloaded from the Internet on Sep. 19, 2005, 2 Pages.

De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.

Descartes, Scheduling Software Helps Webvan Meet 30-Minute Delivery Window, www.stores.org, Jul. 2000.

El Portal Del Transporte, FedEx Insight Empowers Customers with Enhanced Shipment Visibility and Control, Article, Apr. 11, 2001 (Retrieved On Apr. 25, 2003), p. 9, Paragraph 4—p. 10, Line 7, Retrieved from the Internet: <URL:http://www.transportando.net/newsabril_completa.htm>.

(56) References Cited

OTHER PUBLICATIONS

FedEx, "RPS Adds Automated Package Pick-Up to Redesigned Web Site," www.fedex.com/us/about/gound/pressreleases/pressrelease111198.html?link=4, retrieved Sep. 10, 2003.
Frontline Solutions, FedEx Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia, and Memphis Tennessee.
Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.
Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.
International Search Report and Written Opinion for PCT/US06/24169 dated May 10, 2007.
International Searching Authority, International Search Report and Written Opinion for International Application No. PCT/US11/59511, mailed May 2, 2012.
International Searching Authority, International Search Report and Written Opinion for International Application No. PCT/US11/59513, mailed Apr. 27, 2012.
International Searching Authority, International Search Report and Written Opinion, mailed Apr. 24, 2012, for International Application No. PCT/US11/59504.
iPventure, "Schedule Distribution Routes and Timeslots," http://www.ipventure.com/onlineorder/distribution.php, retrieved on Apr. 16, 2008.
Many Happy Returns—UPS Unvels Advanced Outline Returns Solution, Journal, Sep. 20, 2000, Downloaded from the Internet on Oct. 3, 2002, Accession No. 12921102, Business Wire, United States of America.
Office Action dated Sep. 23, 2011 for U.S. Appl. No. 12/616,183.
Notice of Allowance dated Nov. 10, 2011 for U.S. Appl. No. 12/616,183.
Office Action dated Jan. 23, 2009 for U.S. Appl. No. 11/460,268.
Office Action dated Aug. 6, 2009 for U.S. Appl. No. 11/460,268.
Notice of Allowance dated Mar. 25, 2010 for U.S. Appl. No. 11/460,268.
Office Action of U.S. Appl. No. 11/425,333, dated Jun. 11, 2009.
Office Action of U.S. Appl. No. 11/425,333, dated Oct. 15, 2008.
Notice of Allowance dated Nov. 2, 2009 for U.S. Appl. No. 11/425,333.
Outlook 2000 Handbook First Edition (relevant part); p. 95, last 9 lines; one page.
Pender, Lee, Hard Times Are The Best Times, Magazine, August 15, 2001 (Retrieved on Apr. 25, 2003), p. 3, Paragraph 3, Retrieved from the Internet: <URL:http://www.cio.com/archive/081501/besttimes_content/html>.
Van Huzien, Gordon, Messaging: The Transport Part of the XML Puzzle, Article, Jul. 2000 (Retrieved from the Internet Apr. 25, 2003:<URL:http://www-106.ibm.com/developerworks/library/xml-messaging/>.
International Searching Authority, International Search Report and Written Opinion for International Application No. PCT/US11/59506, dated Aug. 3, 2012, 9 pages, United States Patent and Trademark Office, USA.
Canadian Intellectual Property Office, Requisition by Examiner for Application No. 2,609,841, dated Dec. 2, 2011, 4 pages, Canada.
United States Patent and Trademark Office, Office Action for U.S. Appl. No. 13/569,316, dated Sep. 19, 2012, 18 pages, USA.
United States Patent and Trademark Office, Office Action for U.S. Appl. No. 13/569,316, dated Nov. 6, 2012, 14 pages, USA.
United States Patent and Trademark Office, Office Action for U.S. Appl. No. 13/174,269, dated Nov. 7, 2012, 23 pages, USA.
United States Patent and Trademark Office, Office Action for U.S. Appl. No. 13/174,248, dated Nov. 27, 2012, 24 pages, USA.
United States Patent and Trademark Office, Office Action for U.S. Appl. No. 13/174,290, dated Nov. 28, 2012, 25 pages, USA.
United States Patent and Trademark Office, Office Action for U.S. Appl. No. 13/174,306, Dec. 28, 2012, 27 pages, USA.
United States Patent and Trademark Office, Office Action for U.S. Appl. No. 13/174,299, Dec. 31, 2012, 27 pages, USA.
United States Patent and Trademark Office, Office Action for U.S. Appl. No. 13/174,269, Feb. 4, 2013, 13 pages, USA.
United States Patent and Trademark Office, Office Action for U.S. Appl. No. 13/569,316, Feb. 6, 2013, 11 pages, USA.
United States Patent and Trademark Office, Office Action for U.S. Appl. No. 13/174,299, Feb. 8, 2013, 9 pages, USA.
United States Patent and Trademark Office, Office Action for U.S. Appl. No. 13/174,248, Feb. 12, 2013, 11 pages, USA.
United States Patent and Trademark Office, Office Action for U.S. Appl. No. 13/174,306, Feb. 15, 2013, 11 pages, USA.
United States Patent and Trademark Office, Office Action for U.S. Appl. No. 13/174,290, Feb. 21, 2013, 12 pages, USA.
United States Patent and Trademark Office, Office Action for U.S. Appl. No. 13/174,269, May 8, 2013, 14 pages, USA.
United States Patent and Trademark Office, Office Action for U.S. Appl. No. 13/569,316, May 10, 2013, 14 pages, USA.
United States Patent and Trademark Office, Office Action for U.S. Appl. No. 13/174,299, May 15, 2013, 13 pages, USA.
United States Patent and Trademark Office, Office Action for U.S. Appl. No. 13/174,248, May 16, 2013, 13 pages, USA.
United States Patent and Trademark Office, Office Action for U.S. Appl. No. 13/174,306, May 21, 2013, 14 pages, USA.
United States Patent and Trademark Office, Office Action for U.S. Appl. No. 13/174,290, May 15, 2013, 13 pages, USA.
Office Action dated Jan. 31, 2012, for U.S. Appl. No. 10/696,180, filed Oct. 28, 2003.
Canadian Office Action dated Feb. 15, 2012, for Canadian Application No. 2,504,285.
Declaration of David Ellison pertaining to UPS and Mailbox etc. pre-filing activities from Mar. 2001—Nov. 1, 2002.
International Search Report, dated Jul. 5, 2005 for International Application No. PCT/US 2003/34746 filed Oct. 31, 2003.
Office Action from U.S. Appl. No. 10/696,180 dated Feb. 3, 2009.
Office Action from U.S. Appl. No. 10/696,180 dated Aug. 19, 2009.
Office Action from U.S. Appl. No. 10/696,180 dated Dec. 9, 2009.
Office Action from U.S. Appl. No. 10/696,180 dated May 10, 2010.
Office Action from U.S. Appl. No. 10/696,180 dated Oct. 18, 2010.
Office Action from U.S. Appl. No. 10/696,180 dated Feb. 15, 2011.
Office Action from U.S. Appl. No. 10/696,180 dated Jul. 7, 2011.
United States Patent and Trademark Office, Office Action for U.S. Appl. No. 13/181,185, dated Apr. 9, 2013, 19 pages, USA.
United States Patent and Trademark Office, Office Action for U.S. Appl. No. 13/913,171, Oct. 2, 2013, 36 pages, USA.
United States Patent and Trademark Office, Office Action for U.S. Appl. No. 13/746,854, Oct. 2, 2013, 30 pages, USA.
United States Patent and Trademark Office, Office Action for U.S. Appl. No. 13/174,290, Aug. 29, 2013, 15 pages, USA.
United States Patent and Trademark Office, Office Action for U.S. Appl. No. 13/174,269, Aug. 29, 2013, 14 pages, USA.
United States Patent and Trademark Office, Office Action for U.S. Appl. No. 13/174,299, Aug. 29, 2013, 13 pages, USA.
United States Patent and Trademark Office, Office Action for U.S. Appl. No. 13/174,306, Aug. 29, 2013, 14 pages, USA.
United States Patent and Trademark Office, Office Action for U.S. Appl. No. 13/569,316, Aug. 29, 2013, 15 pages, USA.
United States Patent and Trademark Office, Office Action for U.S. Appl. No. 13/181,185, Sep. 26, 2013, 27 pages, USA.
United States Patent and Trademark Office, Office Action for U.S. Appl. No. 13/746,862, Oct. 8, 2013, 31 pages, USA.
United States Patent and Trademark Office, Office Action for U.S. Appl. No. 13/174,248, Sep. 6, 2013, 14 pages, USA.
United States Patent and Trademark Office, Office Action for U.S. Appl. No. 13/746,862, Oct. 2, 2013, 28 pages, USA.
Canadian Intellectual Property Office, Requisition by Examiner for Application No. 2,504,285, Oct. 10, 2013, 2 pages, Canada.

(56) References Cited

OTHER PUBLICATIONS

United States Patent and Trademark Office, Office Action for U.S. Appl. No. 13/913,191, Oct. 24, 2013, 26 pages, USA.
United States Patent and Trademark Office, Office Action for U.S. Appl. No. 13/913,198, Oct. 25, 2013, 25 pages, USA.
European Patent Office, Result of Consultation for Application No. 03778034.3, dated Dec. 2, 2013, 5 pages, The Netherlands.
United States Patent and Trademark Office, Office Action for U.S. Appl. No. 13/913,185, Dec. 13, 2013, 31 pages, USA.
International Searching Authority, International Search Report and Written Opinion for International Application No. PCT/US2013/68219, dated Feb. 21, 2014, 13 pages, USA.
United States Patent and Trademark Office, Notice of Allowance for U.S. Appl. No. 13/913,198, dated Mar. 6, 2014, 7 pages, USA.
European Patent Office, Communication Pursuant to Article 94(3) EPC for Application No. 06773704.9, dated Feb. 5, 2014, 6 pages, The Netherlands.
United States Patent and Trademark Office, Office Action for U.S. Appl. No. 10/696,180, dated Mar. 13, 2014, 30 pages, USA.
United States Patent and Trademark Office, Office Action for U.S. Appl. No. 13/181,185, dated Mar. 27, 2014, 21 pages, USA.
Fedex, "FedEx Mobile Ship", retrieved from <http://www.fedex.com/us/mobile/label.html, redirected to http://mobilesolutions.fedex.com/shipping-label.html> on Sep. 25, 2013, 2 pages.
Gao, Huiji, et al., "Cyber-Physical-Social Systems: Harnessing the Crowdsourcing Power of Social Media for Disaster Relief", IEEE Intelligent Systems, Copyright 2011, pp. 10-14, IEEE Computer Society.
Lindsay, Bruce R., "Congressional Research Service, Social Media and Disasters: Current Uses, Future Options, and Policy Considerations," CRS Report for Congress, Sep. 6, 2011, 10 pages, Congressional Research Service.
Raco Industries, "Increase Delivery Visibility and Simplify Your Process," retrieved from <http://www.racointeractive.com/media/834/raco_interactive-pd.pdf>, on Sep. 25, 2013, 2 pages.
United States Patent and Trademark Office, Office Action for U.S. Appl. No. 13/913,185, dated May 16, 2014, 25 pages, USA.
International Searching Authority, International Search Report and Written Opinion for International Application for PCT/US2013/68210, dated May 20, 2014, 9 pages, United States Patent and Trademark Office, USA.
United States Patent and Trademark Office, Notice of Allowance for U.S. Appl. No. 13/326,750, dated Jun. 17, 2014, 17 pages, USA.
United States Patent and Trademark Office, Office Action for U.S. Appl. No. 13/326,807, dated Jun. 26, 2014, 19 pages, USA.
United States Patent and Trademark Office, Office Action for U.S. Appl. No. 13/326,851, dated Aug. 5, 2014, 39 pages, USA.
United States Patent and Trademark Office, Office Action for U.S. Appl. No. 13/174,269, dated Aug. 18, 2014, 21 pages, USA.
United States Patent and Trademark Office, Office Action for U.S. Appl. No. 13/174,306, dated Aug. 18, 2014, 21 pages, USA.
United States Patent and Trademark Office, Office Action for U.S. Appl. No. 13/174,248, dated Aug. 18, 2014, 21 pages, USA.
United States Patent and Trademark Office, Office Action for U.S. Appl. No. 13/174,299, dated Aug. 18, 2014, 20 pages, USA.
United States Patent and Trademark Office, Office Action for U.S. Appl. No. 13/174,290, dated Aug. 18, 2014, 20 pages, USA.
United States Patent and Trademark Office, Office Action for U.S. Appl. No. 13/746,842, dated Aug. 19, 2014, 22 pages, USA.
Canadian Intellectual Property Office, Requisition by the Examiner for Application No. 2,609,841, dated Oct. 6, 2014, 3 pages, Canada.
United States Patent and Trademark Office, Office Action for U.S. Appl. No. 13/746,854, dated Aug. 19, 2014, 20 pages, USA.
United States Patent and Trademark Office, Office Action for U.S. Appl. No. 13/746,862, dated Aug. 20, 2014, 21 pages, USA.
United States Patent and Trademark Office, Office Action for U.S. Appl. No. 13/569,316, dated Aug. 22, 2014, 20 pages, USA.
United States Patent and Trademark Office, Office Action for U.S. Appl. No. 13/762,969, dated Aug. 29, 2014, 38 pages, USA.
United States Patent and Trademark Office, Office Action for U.S. Appl. No. 13/326,750, dated Sep. 5, 2014, 7 pages, USA.
United States Patent and Trademark Office, Office Action for U.S. Appl. No. 13/326,807, dated Sep. 18, 2014, 6 pages, USA.
United States Patent and Trademark Office, Office Action for U.S. Appl. No. 13/326,887, dated Sep. 25, 2014, 16 pages, USA.
United States Patent and Trademark Office, Office Action for U.S. Appl. No. 13/465,555, dated Oct. 7, 2014, 42 pages, USA.
United States Patent and Trademark Office, Office Action for U.S. Appl. No. 13/326,807, dated Feb. 5, 2014, 29 pages, USA.
United States Patent and Trademark Office, Office Action for U.S. Appl. No. 13/326,887, dated Feb. 13, 2014, 29 pages, USA.
United States Patent and Trademark Office, Office Action for U.S. Appl. No. 13/174,248, dated Dec. 27, 2013, 12 pages, USA.
United States Patent and Trademark Office, Office Action for U.S. Appl. No. 13/746,862, dated Dec. 23, 2013, 16 pages, USA.
United States Patent and Trademark Office, Office Action for U.S. Appl. No. 13/746,842, dated Feb. 13, 2014, 16 pages, USA.
United States Patent and Trademark Office, Office Action for U.S. Appl. No. 13/174,299, dated Dec. 27, 2013, 11 pages, USA.
United States Patent and Trademark Office, Office Action for U.S. Appl. No. 13/174,290, dated Dec. 27, 2013, 12 pages, USA.
United States Patent and Trademark Office, Office Action for U.S. Appl. No. 13/174,269, dated Dec. 27, 2013, 12 pages, USA.
United States Patent and Trademark Office, Office Action for U.S. Appl. No. 13/746,854, dated Dec. 27, 2013, 15 pages, USA.
United States Patent and Trademark Office, Office Action for U.S. Appl. No. 13/174,306, dated Dec. 26, 2013, 12 pages, USA.
United States Patent and Trademark Office, Office Action for U.S. Appl. No. 13/569,316, dated Dec. 24, 2013, 13 pages, USA .
United States Patent and Trademark Office, Office Action for U.S. Appl. No. 13/326,750, dated Jan. 30, 2014, 28 pages, USA.
United States Patent and Trademark Office, Notice of Allowance for U.S. Appl. No. 13/913,171, dated Feb. 11, 2014, 45 pages, USA.
United States Patent and Trademark Office, Notice of Allowance for U.S. Appl. No. 13/913,191, dated Feb. 20, 2014, 25 pages, USA.
United States Patent and Trademark Office, Office Action for U.S. Appl. No. 13/326,851, dated Feb. 21, 2014, 29 pages, USA.
United States Patent and Trademark Office, Office Action for U.S. Appl. No. 13/181,185, dated Nov. 7, 2018, 25 pages, USA.
United States Patent and Trademark Office, Office Action for U.S. Appl. No. 13/913,171, dated Nov. 20, 2014, 13 pages, USA.
United States Patent and Trademark Office, Office Action for U.S. Appl. No. 13/465,555, dated Nov. 20, 2014, 9 pages, USA.
United States Patent and Trademark Office, Office Action for U.S. Appl. No. 13/913,198, dated Dec. 1, 2014, 15 pages, USA.
United States Patent and Trademark Office, Office Action for U.S. Appl. No. 13/913,191, dated Dec. 5, 2014, 17 pages, USA.
International Preliminary Examining Authority, International Preliminary Report on Patentability for International Application No. PCT/US2013/068219, dated Dec. 12, 2014, 8 pages, United States Patent and Trademark Office, USA.
United States Patent and Trademark Office, Office Action for U.S. Appl. No. 13/465,555, dated Jul. 17, 2015, 12 pages, U.S.A.
United States Patent and Trademark Office, Office Action for U.S. Appl. No. 13/569,316, dated Jul. 23, 2015, 21 pages, U.S.A.
United States Patent and Trademark Office, Office Action for U.S. Appl. No. 13/746,854, dated Jul. 23, 2015, 21 pages, U.S.A.
United States Patent and Trademark Office, Office Action for U.S. Appl. No. 13/174,269, dated Jul. 23, 2015, 15 pages, U.S.A.
United States Patent and Trademark Office, Office Action for U.S. Appl. No. 13/746,862, dated Jul. 23, 2015, 21 pages, U.S.A.
United States Patent and Trademark Office, Office Action for U.S. Appl. No. 13/746,842, dated Jul. 23, 2015, 22 pages, U.S.A.
United States Patent and Trademark Office, Office Action for U.S. Appl. No. 13/174,290, dated Jul. 23, 2015, 19 pages, U.S.A.
United States Patent and Trademark Office, Office Action for U.S. Appl. No. 13/174,248, dated Jul. 23, 2015, 20 pages, U.S.A.
United States Patent and Trademark Office, Office Action for U.S. Appl. No. 13/174,306, dated Jul. 23, 2015, 20 pages, U.S.A.
United States Patent and Trademark Office, Office Action for U.S. Appl. No. 13/174,299, dated Jul. 23, 2015, 19 pages, U.S.A.

(56) References Cited

OTHER PUBLICATIONS

International Searching Authority, International Search Report and Written Opinion for International Application No. PCT/US2014/042959, dated Aug. 4, 2015, 8 pages, United States Patent and Trademark Office, U.S.A.
International Searching Authority, International Search Report and Written Opinion for International Application No. PCT/US2011/059508, dated Feb. 4, 2015, 9 pages, U.S. Patent and Trademark Office, USA.
International Preliminary Examining Authority, International Preliminary Report on Patentability for International Application No. PCT/US2013/068210, dated Jan. 2, 2015, 9 pages, U.S. Patent and Trademark Office, USA.
U.S. Patent and Trademark Office, Office Action for U.S. Appl. No. 13/913,185, dated Jan. 20, 2015, 20 pages, USA.
U.S. Patent and Trademark Office, Office Action for U.S. Appl. No. 13/746,842, dated Feb. 27, 2015, 19 pages, USA.
U.S. Patent and Trademark Office, Office Action for U.S. Appl. No. 13/746,854, dated Feb. 27, 2015, 17 pages, USA.
U.S. Patent and Trademark Office, Office Action for U.S. Appl. No. 13/746,862, dated Mar. 2, 2015, 19 pages, USA.
U.S. Patent and Trademark Office, Office Action for U.S. Appl. No. 13/174,299, dated Mar. 2, 2015, 16 pages, USA.
U.S. Patent and Trademark Office, Office Action for U.S. Appl. No. 13/174,269, dated Mar. 2, 2015, 16 pages, USA.
U.S. Patent and Trademark Office, Office Action for U.S. Appl. No. 13/174,290, dated Mar. 2, 2015, 15 pages, USA.
U.S. Patent and Trademark Office, Office Action for U.S. Appl. No. 13/174,306, dated Mar. 2, 2015, 16 pages, USA.
U.S. Patent and Trademark Office, Office Action for U.S. Appl. No. 13/569,316, dated Mar. 3, 2015, 18 pages, USA.
U.S. Patent and Trademark Office, Office Action for U.S. Appl. No. 13/174,248, dated Mar. 4, 2015, 16 pages, USA.
U.S. Patent and Trademark Office, Office Action for U.S. Appl. No. 13/913,191, dated Mar. 10, 2015, 15 pages, USA.
U.S. Patent and Trademark Office, Office Action for U.S. Appl. No. 13/913,198, dated Mar. 11, 2015, 14 pages, USA.
U.S. Patent and Trademark Office, Office Action for U.S. Appl. No. 13/465,555, dated Mar. 12, 2015, 11 pages, USA.
United States Patent and Trademark Office, Office Action for U.S. Appl. No. 13/913,171, dated Mar. 24, 2015, 13 pages, USA.
United States Patent and Trademark Office, Office Action for U.S. Appl. No. 13/326,807, dated Apr. 7, 2015, 19 pages, USA.
United States Patent and Trademark Office, Office Action for U.S. Appl. No. 13/326,887, dated Apr. 9, 2015, 20 pages, USA.
United States Patent and Trademark Office, Office Action for U.S. Appl. No. 13/762,969, dated Apr. 14, 2015, 12 pages, USA.
United States Patent and Trademark Office, Office Action for U.S. Appl. No. 13/326,750, dated Apr. 20, 2015, 18 pages, USA.
United States Patent and Trademark Office, Office Action for U.S. Appl. No. 13/326,851, dated Apr. 29, 2015, 21 pages, USA.
International Searching Authority, International Search Report and Written Opinion for International Application No. PCT/US2013/75572, dated Feb. 20, 2015, 14 pages, United States Patent and Trademark Office, USA.
United States Patent and Trademark Office, Office Action for U.S. Appl. No. 13/913,185, dated Jun. 15, 2015, 21 pages, USA.
United States Patent and Trademark Office, Office Action for U.S. Appl. No. 13/181,185, dated Jun. 10, 2015, 29 pages, USA.
United States Patent and Trademark Office, Office Action for U.S. Appl. No. 10/696,180, dated Jun. 25, 2015, 45 pages, USA.
United States Patent and Trademark Office, Office Action for U.S. Appl. No. 13/839,398, dated Jul. 7, 2015, 8 pages, USA.
Canadian Intellectual Property Office, Requisition by the Examiner for Application No. 2,609,841, dated Aug. 26, 2015, 5 pages, Canada.
Internet Archive WayBackMachine: www.usps.com, specifically, QuantumViewTM, https://web.archive.org/web/20021002110106/http://www.ups.com/iovs/ivs_learnmore.html, QuantumView Inbound, QuantumView Outbound, How QuantumView Outbound Works, Quantum View Service Options, QuantumView and UPS Administration, 15 pages, retrieved Sep. 27-28, 2015.
United States Patent and Trademark Office, Office Action for U.S. Appl. No. 13/913,198, dated Sep. 24, 2015, 24 pages, U.S.A.
United States Patent and Trademark Office, Office Action for U.S. Appl. No. 13/913,191, dated Sep. 24, 2015, 23 pages, U.S.A.
United States Patent and Trademark Office, Office Action for U.S. Appl. No. 10/696,180, dated Oct. 8, 2015, 27 pages, U.S.A.
United States Patent and Trademark Office, Office Action for U.S. Appl. No. 13/913,185, dated Oct. 20, 2015, 20 pages, U.S.A.
United States Patent and Trademark Office, Office Action for U.S. Appl. No. 13/174,299, dated Nov. 10, 2015, 15 pages, U.S.A.
United States Patent and Trademark Office, Office Action for U.S. Appl. No. 13/174,306, dated Nov. 17, 2015, 17 pages, U.S.A.
United States Patent and Trademark Office, Office Action for U.S. Appl. No. 13/174,290, dated Nov. 17, 2015, 16 pages, U.S.A.
United States Patent and Trademark Office, Office Action for U.S. Appl. No. 13/174,269, dated Nov. 17, 2015, 17 pages, U.S.A.
United States Patent and Trademark Office, Office Action for U.S. Appl. No. 13/174,248, dated Nov. 17, 2015, 20 pages, U.S.A.
United States Patent and Trademark Office, Office Action for U.S. Appl. No. 13/569,316, dated Nov. 17, 2015, 21 pages, U.S.A.
United States Patent and Trademark Office, Office Action for U.S. Appl. No. 13/746,854, dated Nov. 17, 2015, 17 pages, U.S.A.
United States Patent and Trademark Office, Office Action for U.S. Appl. No. 13/746,862, dated Nov. 17, 2015, 18 pages, U.S.A.
International Searching Authority, International Search Report and Written Opinion for International Application No. PCT/US2015/016025, dated Apr. 29, 2015, 10 pages, European Patent Office, The Netherlands.
International Searching Authority, International Search Report and Written Opinion for International Application No. PCT/US2015/019475, dated Aug. 31, 2015, 15 pages, European Patent Office, The Netherlands.
Canadian Intellectual Property Office, Requisition by the Examiner for Application No. 2,842,840, dated Nov. 4, 2015, 5 pages, Canada.
United States Patent and Trademark Office, Office Action for U.S. Appl. No. 13/913,171, dated Dec. 15, 2015, 26 pages, U.S.
United States Patent and Trademark Office, Office Action for U.S. Appl. No. 13/465,555, dated Nov. 19, 2015, 22 pages, U.S.
United States Patent and Trademark Office, Office Action for U.S. Appl. No. 13/326,887, dated Dec. 17, 2015, 28 pages, U.S.
United States Patent and Trademark Office, Office Action for U.S. Appl. No. 13/326,750, dated Dec. 23, 2015, 26 pages, U.S.
United States Patent and Trademark Office, Office Action for U.S. Appl. No. 13/326,851, dated Dec. 24, 2015, 29 pages, U.S.
United States Patent and Trademark Office, Office Action for U.S. Appl. No. 13/746,842, dated Jan. 22, 2016, 22 pages, U.S.
United States Patent and Trademark Office, Office Action for U.S. Appl. No. 13/839,398, dated Jan. 20, 2016, 48 pages, U.S.
United States Patent and Trademark Office, Office Action for U.S. Appl. No. 13/839,398, dated Feb. 22, 2016, 9 pages, U.S.
United States Patent and Trademark Office, Office Action for U.S. Appl. No. 13/181,185, dated Apr. 13, 2016, 34 pages, U.S.
United States Patent and Trademark Office, Office Action for U.S. Appl. No. 13/465,555, dated Mar. 17, 2016, 22 pages, U.S.
United States Patent and Trademark Office, Office Action for U.S. Appl. No. 14/100,556, dated Mar. 25, 2016, 54 pages, U.S.
United States Patent and Trademark Office, Office Action for U.S. Appl. No. 14/025,893, dated Sep. 22, 2016, 52 pages, U.S.A.
United States Patent and Trademark Office, Office Action for U.S. Appl. No. 14/049,828, dated Oct. 3, 2016, 64 pages, U.S.A.
United States Patent and Trademark Office, Office Action for U.S. Appl. No. 13/839,398, dated Oct. 6, 2016, 25 pages, U.S.A.
United States Patent and Trademark Office, Office Action for U.S. Appl. No. 14/049,605, dated Aug. 25, 2016, 59 pages, U.S.A.
United States Patent and Trademark Office, Office Action for U.S. Appl. No. 13/465,555, dated Nov. 10, 2016, 19 pages, U.S.A.
Canadian Intellectual Property Office, Requisition by the Examiner for Application No. 2,885,818, dated May 30, 2016, 4 pages, Canada.

(56) References Cited

OTHER PUBLICATIONS

Canadian Intellectual Property Office, Requisition by the Examiner for Application No. 2,884,747, dated May 30, 2016, 4 pages, Canada.
European Patent Office, Communication Pursuant to Rules 70(2) and 70a(2) EPC for Application No. 13796181.9, dated May 24, 2016, 9 pages, Germany.
European Patent Office, Extended European Search Report for Application No. 13821253.5, dated May 17, 2016, 11 pages, Germany.
European Patent Office, Extended European Search Report for Application No. 13795343.6, dated May 19, 2016, 9 pages, Germany.
United States Patent and Trademark Office, Office Action for U.S. Appl. No. 10/696,180, dated Jun. 1, 2016, 28 pages, U.S.A.
United States Patent and Trademark Office, Office Action for U.S. Appl. No. 13/913,171, dated Jun. 8, 2016, 22 pages, U.S.A.
United States Patent and Trademark Office, Office Action for U.S. Appl. No. 13/913,198, dated Jun. 14, 2016, 23 pages, U.S.A.
United States Patent and Trademark Office, Office Action for U.S. Appl. No. 13/913,191, dated Jun. 9, 2016, 24 pages, U.S.A.
Non-Final Rejection dated Jul. 21, 2017 for U.S. Appl. No. 14/640,753.
Non-Final Rejection dated Aug. 4, 2017 for U.S. Appl. No. 13/181,185.
Non-Final Rejection dated Aug. 3, 2017 for U.S. Appl. No. 14/623,145.
Final Rejection dated Sep. 11, 2017 for U.S. Appl. No. 13/913,185.
Final Rejection dated Jul. 28, 2017 for U.S. Appl. No. 13/913,198.
Final Rejection dated Jul. 18, 2017 for U.S. Appl. No. 13/913,171.
Final Rejection dated Jul. 11, 2017 for U.S. Appl. No. 13/746,854.
Final Rejection dated Jul. 10, 2017 for U.S. Appl. No. 13/913,191.
Final Rejection dated Jul. 10, 2017 for U.S. Appl. No. 13/746,862.
English Translation of CN Office Action dated Jun. 29, 2017 for CN Application No. 201380070854.
CN Office Action date Jun. 29, 2017 for CN Application No. 201380070854.
CA Office Action dated Jul. 11, 2017 for CA Application No. 2942296.
Non-Final Rejection dated Jun. 14, 2017 for U.S. Appl. No. 14/049,605.
Final Rejection dated Jun. 29, 2017 for U.S. Appl. No. 13/746,842.
Final Rejection dated Jun. 29, 2017 for U.S. Appl. No. 13/569,316.
Final Rejection dated Jun. 27, 2017 for U.S. Appl. No. 13/174,248.
Final Rejection dated Jun. 5, 2017 for U.S. Appl. No. 13/839,398.
English Translation of CN Office Action dated Jun. 27, 2017 for CN Application No. 201380070843.
English Translation of CN Office Action dated Apr. 27, 2017 for CN Application No. 201380067429.
Communication from the Examining Division dated Apr. 10, 2017 for EP Application No. 06773704.
CN Office Action dated Jun. 27, 2017 for CN Application No. 201380070843.
CN Office Action dated Apr. 27, 2017 for CN Application No. 201380067429.
CA Office Action dated May 24, 2017 for CA Application No. 2885818.
CA Office Action dated May 23, 2017 for CA Application No. 2891876.
CA Office Action dated Jun. 6, 2017 for CA Application No. 2881201.
CA Office Action dated Apr. 27, 2017 for CA Application No. 2884747.
Annex to the communication dated Apr. 10, 2017 for EP Application No. 06773704.
Canadian Intellectual Property Office, Requisition by the Examiner for Application No. 2,609,841, dated Nov. 14, 2016, 8 pages, U.S.A.
United States Patent and Trademark Office, Office Action for U.S. Appl. No. 13/913,191, dated Jan. 12, 2017, 24 pages, U.S.A.
United States Patent and Trademark Office, Office Action for U.S. Appl. No. 13/913,171, dated Jan. 27, 2017, 25 pages, U.S.A.
United States Patent and Trademark Office, Office Action for U.S. Appl. No. 10/696,180, dated Dec. 22, 2016, 31 pages, U.S.A.
United States Patent and Trademark Office, Office Action for U.S. Appl. No. 13/746,842, dated Jan. 11, 2017, 38 pages, U.S.A.
United States Patent and Trademark Office, Office Action for U.S. Appl. No. 13/569,316, dated Dec. 22, 2016, 36 pages, U.S.A.
United States Patent and Trademark Office, Office Action for U.S. Appl. No. 13/174,306, dated Dec. 23, 2016, 34 pages, U.S.A.
United States Patent and Trademark Office, Office Action for U.S. Appl. No. 13/174,248, dated Dec. 23, 2016, 37 pages, U.S.A.
United States Patent and Trademark Office, Office Action for U.S. Appl. No. 13/174,269, dated Jan. 10, 2017, 35 pages, U.S.A.
United States Patent and Trademark Office, Office Action for U.S. Appl. No. 13/174,299, dated Dec. 23, 2016, 36 pages, U.S.A.
United States Patent and Trademark Office, Office Action for U.S. Appl. No. 13/174,290, dated Dec. 28, 2016, 36 pages, U.S.A.
United States Patent and Trademark Office, Office Action for U.S. Appl. No. 13/913,198, dated Feb. 3, 2017, 28 pages, U.S.A.
United States Patent and Trademark Office, Office Action for U.S. Appl. No. 14/049,605, dated Dec. 12, 2016, 18 pages, U.S.A.
Canadian Intellectual Property Office, Requisition by the Examiner for Application No. 2,924,132, Feb. 10, 2017, 4 pages, Canada.
European Patent Office, Communications pursuant to Article 94(3) EPC for Application No. 13796181.9, Feb. 10, 2017, 5 pages, Germany.
European Patent Office, Communications pursuant to Article 94(3) EPC for Application No. 13795343.6, Mar. 2, 2017, 5 pages, Germany.
European Patent Office, Communications pursuant to Article 94(3) EPC for Application No. 13158961.6, Mar. 3, 2017, 6 pages, Germany.
European Patent Office, Communications pursuant to Article 94(3) EPC for Application No. 13158964.0, Mar. 23, 2017, 7 pages, Germany.
European Patent Office, Communications pursuant to Article 94(3) EPC for Application No. 13158965.7, Mar. 23, 2017, 7 pages, Germany.
European Patent Office, Communications pursuant to Article 94(3) EPC for Application No. 13158966.5, Mar. 23, 2017, 6 pages, Germany.
European Patent Office, Communications pursuant to Article 94(3) EPC for Application No. 13158967.3, Mar. 23, 2017, 7 pages, Germany.
United States Patent and Trademark Office, Office Action for U.S. Appl. No. 13/465,555, dated Mar. 15, 2017, 13 pages, U.S.A.
United States Patent and Trademark Office, Office Action for U.S. Appl. No. 13/746,854, dated Mar. 9, 2017, 34 pages, U.S.A.
United States Patent and Trademark Office, Office Action for U.S. Appl. No. 13/746,862, dated Feb. 27, 2017, 43 pages, U.S.A.
United States Patent and Trademark Office, Office Action for U.S. Appl. No. 13/913,185, dated Mar. 23, 2017, 36 pages, U.S.A.
United States Patent and Trademark Office, Office Action for U.S. Appl. No. 14/049,828, dated May 3, 2017, 24 pages, U.S.A.
United States Patent and Trademark Office, Office Action for U.S. Appl. No. 14/100,556, dated May 1, 2017, 25 pages, U.S.A.
United States Patent and Trademark Office, Office Action for U.S. Appl. No. 14/025,893, dated Apr. 7, 2017, 27 pages, U.S.A.
Non-Final Rejection dated Nov. 22, 2017 for U.S. Appl. No. 14/025,893.
Non-Final Rejection dated Nov. 13, 2017 for U.S. Appl. No. 14/707,039.
Non-Final Rejection dated Nov. 8, 2017 for U.S. Appl. No. 10/696,180.
Final Rejection dated Sep. 20, 2017 for U.S. Appl. No. 14/100,556.
Final Rejection dated Oct. 2, 2017 for U.S. Appl. No. 14/049,605.
Annex to the communication dated Sep. 15, 2017 for EP Application No. 06773704.
Annex to the communication dated Oct. 12, 2017 for EP Application No. 13796181.
Final Office Action for U.S. Appl. No. 14/640,753, dated Jan. 16, 2018, 37 pages.
EPO Summons to Attend Oral Hearing for Application No. 13795343.6, Nov. 17, 2017, 9.
CA Office Action dated Nov. 22, 2017 for CA Application No. 2954156.

(56) References Cited

OTHER PUBLICATIONS

CA Office Action dated Nov. 20, 2017 for CA Application No. 2924132.
CA Office Action dated Dec. 27, 2017 for CA Application No. 2957135.
CA Office Action dated Dec. 22, 2017 for CA Application No. 2957133.

* cited by examiner

600

602

UPS e-InfoNotice[SM]

604

Date: ___/___/___

Customer Instructions

606
Plan Ahead and Receive Your Package on the First Attempt
To receive your package on the first delivery attempt, track the package to obtain the expected delivery date.
Print, date, complete, and post this UPS e-InfoNotice[SM] for the driver on or before the scheduled delivery day.

Shipment Information

608
I am expecting a delivery from _____ at this address. The details of this shipment include:
Tracking#: _____
Name: _____
Street Address: _____
City: _____ State: _____ Postal Code: _____
Phone: _____

Package Location

610
In my absence, please leave this shipment:
☐ Front Door         ☐ Back Door         ☐ Side Door
☐ Patio              ☐ Deck              ☐ Porch
☐ Garage/Carport     ☐ Office
☐ Neighbor (Explain): _____
☐ Other (Explain): _____

Signature: _____

Printed Name: _____

Service Provider Instructions

612
☐ Verify that the customer signature and instructions are clear on this document.
☐ Scan a blank InfoNotice[SM] when prompted by the DIAD for a standard InfoNotice delivery and place at the same location that this e-InfoNotice was found.
☐ Note scanned InfoNotice[SM] number here: _____
☐ Leave the package per the customer instructions.
☐ Collect and return this e-InfoNotice[SM] to the center turn-in with your delivery records.

Legalities

614
Your signature and instructions authorize the driver to either leave the package, or, deliver it to a nearby neighbor who is home during the day. By completing and signing this document, you, the consignee, authorize UPS to release this package without fault and UPS will not be liable for missing or damage as a result of this direction.

*Figure 6*

REGISTER - USER INFORMATION

UPS PERSONALIZED DELIVERY

ENTER USER INFORMATION — ENTER ALERTS/RELEASE — ENTER DELIVERY INSTRUCTIONS — CONFIRMATION

ENTER USER INFORMATION  HELP?

UPS PERSONALIZED DELIVERY ALLOWS YOU TO CHOOSE ONE OR MORE OF THE FOLLOWING OPTIONS:

- RECEIVE DELIVERY PRE-ALERTS BY E-MAIL OR TELEPHONE
- SEND DELIVERY PREFERENCES TO YOUR UPS DRIVER
- AUTHORIZE RELEASE OF SIGNATURE REQUIRED DELIVERIES
- REQUEST DELIVERY CHANGES PRIOR TO THE FIRST DELIVERY ATTEMPT. INCLUDES THE ABILITY TO REDIRECT, WILL CALL, POSTPONE OR EVEN REFUSE DELIVERY
- PROVIDE COMMENTS, SUGGESTIONS OR QUESTIONS TO UPS

USER INFORMATION

PROVIDE THE FOLLOWING INFORMATION.
REQUIRED FIELDS ARE SHOWN IN BOLD.

NAME
[JOHN SMITH]

ADDRESS 1
[100 NO STREET]

ADDRESS 2
[ ]

ADDRESS 3
[ ]

CITY:
[BEVERLY HILLS]

STATE:
[CA]

POSTAL CODE:
[90210]

PRIMARY E-MAIL:
[ ]

ALTERNATE E-MAIL:
[ ]

SECURITY QUESTION:
[SELECT ONE ▽]

SECURITY ANSWER:
[ ]

TELEPHONE:   EXT:
[(310) 555-1234]  [1111]

[<BACK] [NEXT>]

FIG. 10

REGISTER - USER PREFERENCES, STEP 1

UPS PERSONALIZED DELIVERY

ENTER USER INFORMATION — ENTER ALERTS/RELEASE — ENTER DELIVERY INSTRUCTIONS — CONFIRMATION

ENTER ALERTS/RELEASE PREFERENCES  HELP?

PROVIDE THE FOLLOWING INFORMATION.
REQUIRED FIELDS ARE SHOWN IN BOLD.

DELIVERY ALERT

PLEASE INDICATE THE TYPE(S) OF DELIVERY ALERTS YOU WOULD LIKE TO RECEIVE. (CHOOSE ONE OR MORE)

1102 — ☐ E-MAIL NOTIFICATION (ONCE PACKAGE INFORMATION HAS BEEN TRANSMITTED TO UPS)

1104 — ☐ E-MAIL REMINDER (WITHIN 24 HOURS OF DELIVERY)

1106 — ☐ PHONE REMINDER (WITHIN 24 HOURS OF DELIVERY)

1108 —
- ○ MORNING (8AM-12PM)
- ○ AFTERNOON (12PM-5PM)
- ○ EVENING (5PM-8PM)

PRIMARY E-MAIL: (REQUIRED FOR E-MAIL ALERTS)

1110 — [ JOHNSMITH@EMAIL.COM ]

ALTERNATE E-MAIL:

[ JOHNSMITH@WORK.COM ]

PACKAGE RELEASE

1112 — ☐ PLEASE ALLOW ALL PACKAGES DELIVERED TO ME TO BE DELIVERED ON THE FIRST ATTEMPT WITHOUT OBTAINING A SIGNATURE.

*BY SELECTING, YOU ACKNOWLEDGE THAT YOU ASSUME ALL LIABILITY ONCE THE PACKAGE IS RELEASED BY UPS WITHOUT OBTAINING A SIGNATURE.*

*UPS ALLOWS CUSTOMERS TO PRE-AUTHORIZE RELEASE OF DELIVERIES TO THEIR HOME ADDRESS. THE UPS DRIVER WILL LEAVE PACKAGES WITHOUT DIRECTLY OBTAINING A SIGNATURE AT DELIVERY. THE AUTHORIZATION IS KEPT ON FILE BY UPS.*

*PACKAGE RELEASE IS NOT AVAILABLE WHEN THE SHIPPER HAS REQUESTED A DELIVERY CONFIRMATION SIGNATURE REQUIRED SERVICE FOR THE PACKAGE.*

*UPS MAY NOT RELEASE A PACKAGE, EVEN WHEN THE RELEASE IS AUTHORIZED, IF THE CIRCUMSTANCES SURROUNDING THE DELIVERY ARE NOT SUITABLE FOR SUCH RELEASE*

TYPE OF ADDRESS

1114 — PLEASE INDICATE THE TYPE OF ADDRESS SO THAT WE MAY PROVIDE YOU WITH ADDITIONAL DELIVERY OPTIONS.

- ● I LIVE IN A HOUSE
- ○ I LIVE IN AN APARTMENT, TOWN HOME OR CONDOMINIUM

[ <BACK ][ NEXT> ]

FIG. 11

```
REGISTER - USER PREFERENCES, STEP 2
┌─────────────────────────────────────────────────────────────────┐
│ UPS PERSONALIZED DELIVERY                                       │
│   ENTER USER      ENTER ALERTS/    ENTER DELIVERY               │
│   INFORMATION       RELEASE        INSTRUCTIONS    CONFIRMATION │
│      ⊙---------------⊙---------------⊙---------------○          │
├─────────────────────────────────────────────────────────────────┤
│ ENTER DELIVERY INSTRUCTIONS                              HELP?  │
├─────────────────────────────────────────────────────────────────┤
│ PROVIDE THE FOLLOWING INFORMATION. REQUIRED FIELDS ARE SHOWN IN BOLD. │
│ DELIVERY INSTRUCTIONS ——1200                                    │
│ PLEASE LEAVE ALL PACKAGES AT:                                   │
│   ⊙ NO PREFERENCE      ○ DECK                                   │
│   ○ FRONT DOOR         ○ PORCH                                  │
│   ○ BACK DOOR          ○ GARAGE/CARPORT           ,—1202        │
│   ○ SIDE DOOR          ○ NEIGHBOR STREET ADDRESS/APT.#          │
│   ○ PATIO              [                               ]        │
│                                         (23 CHARACTER MAX.)     │
│ ADDITIONAL INSTRUCTIONS:        ,—1204                          │
│ [                                                       ]       │
│ (I.E., GARAGE DOOR CODE, GATE ACCESS CODE 007,                  │
│  LEAVE PACKAGE BEHIND THE GRILL)           [<BACK][SUBMIT>]     │
└─────────────────────────────────────────────────────────────────┘
```

FIG. 12A

```
┌─────────────────────────────────────────────────────────────────┐
│ UPS PERSONALIZED DELIVERY                                       │
│   ENTER USER      ENTER/ALERTS     ENTER DELIVERY               │
│   INFORMATION       RELEASE        INSTRUCTIONS    CONFIRMATION │
│      ⊙---------------⊙---------------⊙---------------○          │
├─────────────────────────────────────────────────────────────────┤
│ ENTER DELIVERY INSTRUCTIONS                              HELP?  │
├─────────────────────────────────────────────────────────────────┤
│ PROVIDE THE FOLLOWING INFORMATION. REQUIRED FIELDS ARE SHOWN IN BOLD. │
│ DELIVERY INSTRUCTIONS —1210                                     │
│ PLEASE LEAVE ALL PACKAGES AT:                                   │
│   ⊙ NO PREFERENCE          ○ PORCH                              │
│   ○ FRONT DOOR             ○ GARAGE                             │
│   ○ FRONT DESK/CONCIERGE   ○ NEIGHBOR STREET ADDRESS/APT.# ,1212│
│   ○ PATIO                  [                               ]    │
│                                         (23 CHARACTER MAX.)     │
│ ADDITIONAL INSTRUCTIONS:    ,—1214                              │
│ [                                                       ]       │
│ (I.E., GARAGE DOOR CODE, GATE ACCESS CODE 007,                  │
│  LEAVE PACKAGE BEHIND THE GRILL)           [<BACK][SUBMIT>]     │
└─────────────────────────────────────────────────────────────────┘
```

FIG. 12B

| REGISTRATION CONFIRMATION |
|---|
| UPS PERSONALIZED DELIVERY |
| ENTER USER INFORMATION — ENTER ALERTS/RELEASE — ENTER DELIVERY INSTRUCTIONS — CONFIRMATION |
| REVIEW CONFIRMATION |
| THANK YOU FOR COMPLETING YOUR REGISTRATION. |

USER INFORMATION
NAME:                              JOHN SMITH
ADDRESS 1:                         100 NO STREET
ADDRESS 2:
ADDRESS 3:
CITY:                              BEVERLY HILLS
STATE:                             CA
POSTAL CODE:                       90210
TELEPHONE:                         (310) 555-1234
EXT:                               1111
PRIMARY E-MAIL:                    JOHNSMITH@EMAIL.COM
ALTERNATE E-MAIL:                  JOHNSMITH@WORK.COM
SECURITY QUESTION:                 WHAT IS YOUR PET'S NAME?
SECURITY ANSWER:                   ****

BY REGISTERING FOR THE UPS PERSONALIZED DELIVERY YOU ACKNOWLEDGE THAT YOU HAVE REVIEWED AND AGREE TO THE UPS PERSONALIZED DELIVERY TERMS AND CONDITIONS

DELIVERY ALERT
E-MAIL REMINDER (WITHIN 24 HOURS OF DELIVERY)

PACKAGE RELEASE

PLEASE ALLOW ALL PACKAGES DELIVERED TO ME TO BE RELEASED WITHOUT OBTAINING A SIGNATURE.

BY SELECTING, YOU ACKNOWLEDGE THAT YOU ASSUME ALL LIABILITY ONCE THE PACKAGE IS RELEASED BY UPS WITHOUT OBTAINING A SIGNATURE.

UPS ALLOWS CUSTOMERS TO PRE-AUTHORIZE RELEASE OF DELIVERIES TO THEIR HOME ADDRESS. THE UPS DRIVER WILL LEAVE PACKAGES WITHOUT DIRECTLY OBTAINING A SIGNATURE AT DELIVERY. THE AUTHORIZATION IS KEPT ON FILE BY UPS.

PACKAGE RELEASE IS NOT AVAILABLE WHEN THE SHIPPER HAS REQUESTED A DELIVERY CONFIRMATION SIGNATURE REQUIRED SERVICE FOR THE PACKAGE.

UPS MAY NOT RELEASE A PACKAGE, EVEN WHEN THE RELEASE IS AUTHORIZED, IF THE CIRCUMSTANCES SURROUNDING THE DELIVERY ARE NOT SUITABLE FOR SUCH RELEASE

TYPE OF ADDRESS
I LIVE IN A HOUSE

DELIVERY INSTRUCTIONS
PLEASE LEAVE MY PACKAGES AT:   BACK DOOR

>UPS PERSONALIZED DELIVERY HOME

FIG. 13

DELIVERY CHANGE REQUEST

UPS PERSONALIZED DELIVERY

PROVIDE DELIVERY CHANGE REQUEST   HELP?

PROVIDE THE TRACKING NUMBER TO REQUEST UPS PERSONALIZED DELIVERY FOR A PACKAGE. REQUIRED FIELD SHOWN IN BOLD.

TRACKING NUMBER:

[_____] ←—1402

(I.E., 1Z0123456789012345)

DELIVERY CHANGE TYPES
PLEASE CHOOSE ONE OF THE FOLLOWING OPTIONS. ONLY ONE CHANGE REQUEST IS PERMITTED PER PACKAGE.

1404 ○ REDIRECT PACKAGE
   TELL US TO DELIVER THE PACKAGE TO AN ALTERNATE LOCAL ADDRESS

1406 ○ RETURN TO SHIPPER
   TELL US TO RETURN THE PACKAGE TO THE SHIPPER.

1408 ○ RESCHEDULE DELIVERY
   TELL US TO DELIVER THE PACKAGE TO YOUR HOME ON A NEW DATE.

1410 ○ UPS WILL CALL
   TELL US TO HOLD THE PACKAGE AT A SPECIFIC LOCATION FOR YOU TO PICK UP WITHIN A GIVEN DATE RANGE.

FOR INFORMATION ABOUT SAME DAY WILL CALL, PLEASE CONTACT UPS DIRECTLY AT 1-866-555-2222.

IF YOU RUN INTO DIFFICULTIES OR HAVE QUESTIONS, PLEASE CALL 1-866-555-2222 (MONDAY-FRIDAY, 8:00 A.M. TO 8:00 P.M., EASTERN TIME).

NOTE: UPS PERSONALIZED DELIVERY REQUESTS SUBMITTED FOR REDIRECT PACKAGE, RESCHEDULE DELIVERY, AND WILL CALL AFTER 7:00 P.M. LOCAL TIME* WILL REQUIRE AN ADDITIONAL BUSINESS DAY TO BE PROCESSED.

*LOCAL TIME BASED ON ORIGINAL DESTINATION ADDRESS.

TERMS AND CONDITIONS   [NEXT>]

FIG. 14

REDIRECT PACKAGE

UPS PERSONALIZED DELIVERY

INDICATE DELIVERY LOCATION                                HELP?

PACKAGE INFORMATION
TRACKING NUMBER:       1Z4891354242569148
TO REDIRECT PACKAGE, PLEASE SPECIFY AN ALTERNATE LOCAL ADDRESS (I.E,
NEIGHBOR OR LOCAL BUSINESS ADDRESS) BELOW. REQUIRED FIELDS ARE
SHOWN IN BOLD.

COMPANY NAME: — 1502
| ABC COMPANY |

RECIPIENT NAME: — 1504
| JOHN SMITH |

ADDRESS 1
| 1000 MAIN STREET |

ADDRESS 2
| |

ADDRESS 3
| |                                                    — 1506

CITY:
| BEVERLY HILLS |

STATE:
| CA |

POSTAL CODE:
| 90210 |

TELEPHONE: — 1508  EXT:
| (310) 555-0000 |  | 1212 |
                                                        — 1510
YOUR NAME:
| JOHN SMITH |

YOUR TELEPHONE:  EXT: — 1512
| (310) 555-1234 |  | 1111 |
                                                        — 1514
SPECIAL HANDLING INSTRUCTIONS:
| |

(WE CANNOT COMMIT TO SPECIFIC DELIVERY TIME. PROVIDE ANY OTHER
INSTRUCTION YOUR DRIVER MAY NEED TO DELIVER YOUR PACKAGE.)

TERMS AND CONDITIONS                          | <BACK || SUBMIT> |

FIG. 15

```
REDIRECT PACKAGE CONFIRMATION
UPS PERSONALIZED DELIVERY

UPS PERSONALIZED DELIVERY REQUEST CONFIRMATION

YOUR DELIVERY CHANGE REQUEST HAS BEEN RECEIVED AND YOUR PACKAGE
  WILL BE RETURNED TO THE SHIPPER. IF YOU HAVE ANY QUESTIONS OR NEED
  ASSISTANCE, PLEASE SELECT SEND A MESSAGE TO SEND AN E-MAIL OR CALL
  1-866-555-2222.

NEW DELIVERY ADDRESS
  COMPANY NAME:         ABC COMPANY
  RECIPIENT NAME:       JOHN SMITH
  ADDRESS 1             1000 MAIN STREET

ADDRESS 2
  ADDRESS 3
  CITY:                 BEVERLY HILLS
  STATE:                CA
  POSTAL CODE:          90210
  TELEPHONE:            (310) 555-0000
  EXT:                  1212
  CONTACT NAME:         JOHN SMITH
  CONTACT TELEPHONE:    (310) 555-1234
  EXT:                  1111
  SPECIAL HANDLING INSTRUCTIONS:

PACKAGE INFORMATION
  TRACKING NUMBER:      1Z4891354242569148

TERMS AND CONDITIONS
```

FIG. 16

| RETURN TO SHIPPER |
|---|
| UPS PERSONALIZED DELIVERY |

INDICATE RETURN　　　　　　　　　　　　　　　　　　　　HELP?

PACKAGE INFORMATION
TRACKING NUMBER:　　　1Z4891354242569148

TO RETURN TO SHIPPER, PLEASE SELECT THE REASON FOR RETURN BELOW.
REQUIRED FIELDS SHOWN IN BOLD.

REASON FOR RETURN:　　　1700
| SELECT ONE ▽ |

NAME　　1702
| JOHN SMITH |

TELEPHONE: 1704　EXT:
| (310) 555-1234 |　| 1111 |

SPECIAL HANDLING INSTRUCTIONS:　　　1706
| PLEASE DELIVER TO BACK DOOR |

TERMS AND CONDITIONS　　　　　　　　　　　　　　| <BACK | SUBMIT> |

FIG. 17

| RETURN TO SHIPPER CONFIRMATION |
|---|
| UPS PERSONALIZED DELIVERY |
| UPS PERSONALIZED DELIVERY REQUEST CONFIRMATION<br><br>YOUR DELIVERY CHANGE REQUEST HAS BEEN RECEIVED AND YOUR PACKAGE WILL BE RETURNED TO THE SHIPPER. IF YOU HAVE ANY QUESTIONS OR NEED ASSISTANCE, PLEASE SELECT SEND A MESSAGE TO SEND AN E-MAIL OR CALL 1-866-555-2222<br><br>RETURN SPECIFICATION<br>REASON FOR RETURN:      RECEIVER REFUSED SHIPPED TOO LATE |
| PACKAGE INFORMATION<br>TRACKING NUMBER:    1Z4891354242569148<br>NAME    JOHN SMITH<br>TELEPHONE:    (310) 555-1234<br>EXT.    1111<br>SPECIAL HANDLING INSTRUCTIONS:    PLEASE DELIVER TO BACK DOOR.<br><br>TERMS AND CONDITIONS |

FIG. 18

RESCHEDULE DELIVERY

UPS PERSONALIZED DELIVERY

INDICATE DELIVERY DATE                                      HELP?

PACKAGE INFORMATION
TRACKING NUMBER:         1Z4891354242569148

1700 { TO RESCHEDULE DELIVERY, PLEASE SELECT A NEW DELIVERY DATE BELOW FOR UPS TO DELIVER TO THE ORIGINAL ADDRESS. NEW DELIVERY DATE MUST BE AT LEAST ONE DAY PAST SCHEDULED DELIVERY DATE. REQUIRED FIELDS SHOWN IN BOLD.

NEW DELIVERY DATE:
[THU 06/22/2006  ▽] ─1902
NAME
[JOHN SMITH] ─1904
TELEPHONE: ─1906 EXT:
[(310) 555-1234]  [1111]

SPECIAL HANDLING INSTRUCTIONS:    ─1908
[PLEASE DELIVER TO BACK DOOR]

(WE CANNOT COMMIT TO SPECIFIC DELIVERY TIME. PROVIDE ANY OTHER INSTRUCTION YOUR DRIVER MAY NEED TO DELIVER YOUR PACKAGE.)

TERMS AND CONDITIONS 🖶                          [<BACK][SUBMIT>]

FIG. 19

| RESCHEDULE DELIVERY CONFIRMATION |
|---|
| UPS PERSONALIZED DELIVERY |
| UPS PERSONALIZED DELIVERY REQUEST CONFIRMATION |
| YOUR REQUEST HAS BEEN SUBMITTED. PLEASE PRINT THIS PAGE FOR YOUR RECORDS. IF YOU HAVE ANY QUESTIONS OR NEED ASSISTANCE, PLEASE SELECT SEND A MESSAGE TO SEND AN E-MAIL OR CALL 1-866-555-2222<br><br>NEW DELIVERY DATE:   06/22/2006 |
| PACKAGE INFORMATION<br>TRACKING NUMBER:       1Z4891354242569148<br><br>NAME                                                            JOHN SMITH<br>TELEPHONE:                                              (310) 555-1234<br>EXT.                                                              1111<br>SPECIAL HANDLING INSTRUCTIONS:       PLEASE DELIVER TO BACK DOOR.<br><br>TERMS AND CONDITIONS |

FIG. 20

```
┌─────────────────────────────────────────────────────────────┐
│ UPS WILL CALL                                               │
│ ┌─────────────────────────────────────────────────────────┐ │
│ │ UPS PERSONALIZED DELIVERY                               │ │
│ │─────────────────────────────────────────────────────────│ │
│ │ INDICATE UPS WILL CALL                            HELP? │ │
│ │ PACKAGE INFORMATION                                     │ │
│ │ TRACKING NUMBER:    1Z4891354242569148                  │ │
│ │                                                         │ │
│ │ IF YOU WOULD LIKE US TO HOLD YOUR PACKAGE FOR PICKUP AT │ │
│ │ THE FOLLOWING LOCATION ON THE DATES LISTED BELOW,       │ │
│ │ PLEASE PROVIDE THE REQUESTED INFORMATION AND SELECT     │ │
│ │ SUBMIT. REQUIRED FIELDS SHOWN IN BOLD.                  │ │
│ │ NAME:                                                   │ │
│ │ [JOHN SMITH]                                            │ │
│ │ TELEPHONE:      EXT:                                    │ │
│ │ [(310) 555-1234] [1111]                                 │ │
│ │ SPECIAL HANDLING INSTRUCTIONS:                          │ │
│ │ [                                              ]        │ │
│ │ (WE CANNOT COMMIT TO SPECIFIC DELIVERY TIME. PROVIDE    │ │
│ │ ANY OTHER INSTRUCTION YOUR DRIVER MAY NEED TO DELIVER   │ │
│ │ YOUR PACKAGE.)                                          │ │
│ │─────────────────────────────────────────────────────────│ │
│ │ PICKUP LOCATION INFORMATION                             │ │
│ │ YOUR PACKAGE WILL BE HELD AT:  UPS BEVERLY HILLS        │ │
│ │                                222 RODEO ROAD           │ │
│ │                                BEVERLY HILLS, CA 90210  │ │
│ │                                1-866-555-2222           │ │
│ │                                VIEW MAP                 │ │
│ │ HOURS OF OPERATION:            M-F 8:00 A.M. TO 6:00 P.M│ │
│ │                                SAT CLOSED               │ │
│ │                                SUN CLOSED               │ │
│ │ DATES HELD:          [FRIDAY, JUNE 23 - THURSDAY, JUNE 29]│
│ │                                                         │ │
│ │ *IF YOU SUBMIT THIS REQUEST AND DO NOT PICK UP YOUR     │ │
│ │  PACKAGE ON THE AVAILABLE DATES LISTED ABOVE, YOUR      │ │
│ │  PACKAGE WILL BE RETURNED TO THE SHIPPER.               │ │
│ │                                                         │ │
│ │ TERMS AND CONDITIONS               [<BACK] [SUBMIT>]    │ │
│ └─────────────────────────────────────────────────────────┘ │
└─────────────────────────────────────────────────────────────┘
```

FIG. 21

| UPS WILL CALL CONFIRMATION |
|---|
| UPS PERSONALIZED DELIVERY |
| UPS PERSONALIZED DELIVERY REQUEST CONFIRMATION |

YOUR DELIVERY CHANGE REQUEST HAS BEEN RECEIVED AND YOUR PACKAGE WILL BE HELD AT THE LOCATION BELOW. IF YOU HAVE ANY QUESTIONS OR NEED ASSISTANCE, PLEASE SELECT SEND A MESSAGE TO SEND AN E-MAIL OR CALL 1-866-555-2222.

PICKUP LOCATION INFORMATION

| | |
|---|---|
| YOUR PACKAGE WILL BE HELD AT: | UPS BEVERLY HILLS<br>222 RODEO ROAD<br>BEVERLY HILLS, CA 90210<br>1-866-555-2222<br>VIEW MAP |
| HOURS OF OPERATION: | M-F 8:00 A.M. TO 6:00 P.M.<br>SAT CLOSED<br>SUN CLOSED |
| DATES HELD: | FRIDAY, JUNE 23 - THURSDAY, JUNE 29 |

*IF YOU SUBMIT THIS REQUEST AND DO NOT PICK UP YOUR PACKAGE ON THE AVAILABLE DATES LISTED ABOVE, YOUR PACKAGE WILL BE RETURNED TO THE SHIPPER.

PACKAGE INFORMATION
TRACKING NUMBER:     1Z4891354242569148

| | |
|---|---|
| NAME | JOHN SMITH |
| TELEPHONE: | (310) 555-1234 |
| EXT. | 1111 |
| SPECIAL HANDLING INSTRUCTIONS: | |

TERMS AND CONDITIONS

FIG. 22

| PREFERENCES - USER INFORMATION |
|---|

| DELIVERY PREFERENCES |
|---|

USER INFORMATION — ALERTS/RELEASE — DELIVERY INSTRUCTIONS — CONFIRMATION

UPDATE USER INFORMATION         HELP?

UPDATE THE FOLLOWING INFORMATION. REQUIRED FIELDS SHOWN IN BOLD.

USER INFORMATION
NAME:    2402
| JOHN SMITH |

ADDRESS 1: 100 NO STREET
ADDRESS 2:
ADDRESS 3:    2404
CITY: BEVERLY HILLS
STATE: CA
POSTAL CODE: 90210
TELEPHONE: 2406 EXT:
| (310) 555-1234 | | 1111 |

PRIMARY E-MAIL:
| JOHNSMITH@EMAIL.COM |

ALTERNATE E-MAIL:
| JOHNSMITH@WORK.COM |

SECURITY QUESTION:
| WHAT IS YOUR PET'S NAME? ▽ |

SECURITY ANSWER:
| SPOT |

TERMS AND CONDITIONS      [NEXT>]

FIG. 24

PREFERENCES, STEP 1

DELIVERY PREFERENCES

USER INFORMATION — ALERTS/RELEASE — DELIVERY INSTRUCTIONS — CONFIRMATION

UPDATE ALERTS/RELEASE PREFERENCES      HELP?

UPDATE THE FOLLOWING INFORMATION. REQUIRED FIELDS SHOWN IN BOLD.

DELIVERY ALERT

PLEASE INDICATE THE TYPE(S) OF DELIVERY ALERTS YOU WOULD LIKE TO RECEIVE. (CHOOSE ONE OR MORE)

- ☐ E-MAIL NOTIFICATION (ONCE PACKAGE INFORMATION HAS BEEN TRANSMITTED TO UPS)
- ☐ E-MAIL REMINDER (WITHIN 24 HOURS OF DELIVERY)
- ☐ PHONE REMINDER (WITHIN 24 HOURS OF DELIVERY)
  - ○ MORNING (8AM-12PM)
  - ○ AFTERNOON (12PM-5PM)
  - ○ EVENING (5PM-8PM)

PRIMARY E-MAIL: (REQUIRED FOR E-MAIL ALERTS)

[ JOHNSMITH@EMAIL.COM ]

ALTERNATE E-MAIL:

[ JOHNSMITH@WORK.COM ]

PACKAGE RELEASE

- ☑ PLEASE ALLOW ALL PACKAGES DELIVERED TO ME TO BE DELIVERED ON THE FIRST ATTEMPT WITHOUT OBTAINING A SIGNATURE.

*BY SELECTING, YOU ACKNOWLEDGE THAT YOU ASSUME ALL LIABILITY ONCE THE PACKAGE IS RELEASED BY UPS WITHOUT OBTAINING A SIGNATURE.*

*UPS ALLOWS CUSTOMERS TO PRE-AUTHORIZE RELEASE OF DELIVERIES TO THEIR HOME ADDRESS. THE UPS DRIVER WILL LEAVE PACKAGES WITHOUT DIRECTLY OBTAINING A SIGNATURE AT DELIVERY. THE AUTHORIZATION IS KEPT ON FILE BY UPS.*

*PACKAGE RELEASE IS NOT AVAILABLE WHEN THE SHIPPER HAS REQUESTED A DELIVERY CONFIRMATION SIGNATURE REQUIRED SERVICE FOR THE PACKAGE.*

*UPS MAY NOT RELEASE A PACKAGE, EVEN WHEN THE RELEASE IS AUTHORIZED, IF THE CIRCUMSTANCES SURROUNDING THE DELIVERY ARE NOT SUITABLE FOR SUCH RELEASE*

TYPE OF ADDRESS
PLEASE INDICATE THE TYPE OF ADDRESS SO THAT WE MAY PROVIDE YOU WITH ADDITIONAL DELIVERY OPTIONS.

- ◉ I LIVE IN A HOUSE
- ○ I LIVE IN AN APARTMENT, TOWN HOME OR CONDOMINIUM

[<BACK] [NEXT>]

FIG. 25

```
PREFERENCES, STEP 2
┌─────────────────────────────────────────────────────────────┐
│ DELIVERY PREFERENCES                                        │
│    USER         ALERTS/RELEASE   DELIVERY                   │
│ INFORMATION                    INSTRUCTIONS  CONFIRMATION   │
│      ⊘-----------------⊘----------------⊘-------------○     │
│ UPDATE DELIVERY INSTRUCTIONS                        HELP?   │
│ PROVIDE THE FOLLOWING INFORMATION. REQUIRED FIELDS ARE SHOWN IN BOLD. │
│ DELIVERY INSTRUCTIONS                                       │
│ PLEASE LEAVE ALL PACKAGES AT:                               │
│ ○ NO PREFERENCE      ○ DECK                                 │
│ ○ FRONT DOOR         ○ PORCH                                │
│ ⦿ BACK DOOR          ○ GARAGE/CARPORT                       │
│ ○ SIDE DOOR          ○ NEIGHBOR STREET ADDRESS/APT.#        │
│ ○ PATIO              [                              ]       │
│ ADDITIONAL INSTRUCTIONS:              (23 CHARACTER MAX.)   │
│ [ ALWAYS COVER WITH PLASTIC                          ]      │
│ (I.E., GARAGE DOOR CODE, GATE ACCESS CODE 007,              │
│  LEAVE PACKAGE BEHIND THE GRILL)         [<BACK][SUBMIT>]   │
└─────────────────────────────────────────────────────────────┘
```

FIG. 26A

```
┌─────────────────────────────────────────────────────────────┐
│ DELIVERY PREFERENCES                                        │
│    USER         ALERTS/RELEASE   DELIVERY                   │
│ INFORMATION                    INSTRUCTIONS  CONFIRMATION   │
│      ⊘-----------------⊘----------------⊘-------------○     │
│ UPDATE DELIVERY INSTRUCTIONS                        HELP?   │
│ PROVIDE THE FOLLOWING INFORMATION. REQUIRED FIELDS ARE SHOWN IN BOLD. │
│ DELIVERY INSTRUCTIONS                                       │
│ PLEASE LEAVE ALL PACKAGES AT:                               │
│ ⦿ NO PREFERENCE           ○ PORCH                           │
│ ○ FRONT DOOR              ○ GARAGE                          │
│ ○ FRONT DESK/CONCIERGE    ○ NEIGHBOR STREET ADDRESS/APT.#   │
│ ○ PATIO                   [                              ]  │
│                                       (23 CHARACTER MAX.)   │
│ ADDITIONAL INSTRUCTIONS:                                    │
│ [ ALWAYS COVER WITH PLASTIC                          ]      │
│ (I.E., GARAGE DOOR CODE, GATE ACCESS CODE 007,              │
│  LEAVE PACKAGE BEHIND THE GRILL)         [<BACK][SUBMIT>]   │
└─────────────────────────────────────────────────────────────┘
```

FIG. 26B

| PREFERENCES - CONFIRMATION |
|---|
| DELIVERY PREFERENCES |
| USER INFORMATION — ALERTS/RELEASE — DELIVERY INSTRUCTIONS — CONFIRMATION |
| REVIEW CONFIRMATION |
| YOUR UPDATES HAVE BEEN SUBMITTED. |
| USER INFORMATION<br>NAME: JOHN SMITH<br>ADDRESS 1: 100 NO STREET<br>ADDRESS 2:<br>ADDRESS 3:<br>CITY: BEVERLY HILLS<br>STATE: CA<br>POSTAL CODE: 90210<br>TELEPHONE: (310)555-1234<br>EXT: 1111<br>PRIMARY E-MAIL: JOHNSMITH@EMAIL.COM<br>ALTERNATE E-MAIL: JOHNSMITH@WORK.COM<br>SECURITY QUESTION: WHAT IS YOUR PET'S NAME?<br>SECURITY ANSWER: ****<br>PLEASE INCLUDE ME IN OPINION SURVEYS.<br><br>BY REGISTERING FOR THE UPS PERSONALIZED DELIVERY YOU ACKNOWLEDGE THAT YOU HAVE REVIEWED AND AGREE TO THE UPS PERSONALIZED DELIVERY TERMS AND CONDITIONS |
| DELIVERY ALERT<br>E-MAIL REMINDER (WITHIN 24 HOURS OF DELIVERY) |
| PACKAGE RELEASE<br>PLEASE ALLOW ALL PACKAGES DELIVERED TO ME TO BE RELEASED WITHOUT OBTAINING A SIGNATURE.<br><br>*BY SELECTING, YOU ACKNOWLEDGE THAT YOU ASSUME ALL LIABILITY ONCE THE PACKAGE IS RELEASED BY UPS WITHOUT OBTAINING A SIGNATURE.*<br><br>*UPS ALLOWS CUSTOMERS TO PRE-AUTHORIZE RELEASE OF DELIVERIES TO THEIR HOME ADDRESS. THE UPS DRIVER WILL LEAVE PACKAGES WITHOUT DIRECTLY OBTAINING A SIGNATURE AT DELIVERY. THE AUTHORIZATION IS KEPT ON FILE BY UPS.*<br><br>*PACKAGE RELEASE IS NOT AVAILABLE WHEN THE SHIPPER HAS REQUESTED A DELIVERY CONFIRMATION SIGNATURE REQUIRED SERVICE FOR THE PACKAGE.*<br><br>*UPS MAY NOT RELEASE A PACKAGE, EVEN WHEN THE RELEASE IS AUTHORIZED, IF THE CIRCUMSTANCES SURROUNDING THE DELIVERY ARE NOT SUITABLE FOR SUCH RELEASE* |
| TYPE OF ADDRESS<br>I LIVE IN A HOUSE |
| DELIVERY INSTRUCTIONS<br>PLEASE LEAVE MY PACKAGES AT: NEIGHBOR'S ADDRESS: 104 NO STREET<br>ADDITIONAL INSTRUCTIONS: ALWAYS COVER WITH PLASTIC<br><br>>UPS PERSONLAIZED DELIVERY HOME |

FIG. 27

SYSTEMS AND METHODS FOR PROVIDING PERSONALIZED DELIVERY SERVICES

CROSS-REFERENCE TO RELATED APPLICATIONS

This application is a continuation of U.S. application Ser. No. 13/326,750 filed Dec. 15, 2011, which is a continuation of U.S. application Ser. No. 12/616,183 filed on Nov. 11, 2009, which is a continuation of U.S. application Ser. No. 11/460,268 filed on Jul. 27, 2006, which is a continuation of U.S. application Ser. No. 11/425,333 filed Jun. 20, 2006, which claims priority to U.S. Application No. 60/750,684 filed on Dec. 14, 2005, U.S. Application No. 60/701,712 filed Jul. 22, 2005, and U.S. Application No. 60/692,849 filed Jun. 21, 2005, the contents of which are hereby incorporated in their entirety by reference.

FIELD OF THE INVENTION

Embodiments of the present invention pertain to providing custom control and flexibility to consignors, consignees, and carriers for delivery of an item, such as a parcel or package, by a common carrier.

BACKGROUND

The package delivery business typically involves three main entities in the course of delivering a package: a carrier, a consignor, and a consignee. The carrier typically arranges the delivery of a package between the consignor and the consignee, and is often referred to as a package delivery provider, service provider, or common carrier. The consignor is the entity that causes the package to shipped, and can be referred to as the shipper or originator. The intended recipient of the package is the consignee. In the case of a package being shipped as part of a mail-order or Internet-based purchase, typically the consignor is the merchant and the consignee is the customer of the merchant.

The process of delivering a package is well known. Typically, the consignor prepares the item to be shipped, selects a carrier and class of service (e.g., normal or expedited delivery), and arranges for the carrier to gain custody of the package. This may occur by the consignor bringing the package to a carrier's pickup location or arranging the carrier to pick up the package at the consignor's premises. Once the carrier takes possession, the carrier routes the package to a handling facility in the town or serving area of the consignee. The package is then delivered to the consignee, usually using a delivery vehicle.

Typically, the carrier maintains a regular route for the delivery of packages, and along the route will stop at the appropriate consignee's address and attempt to deliver the package. In an optimal delivery experience, the carrier delivers the package on the initial attempt to the consignee, who is present to accept the package.

However, as can be expected, in many instances the delivery experience is not optimal in that the package is not successfully delivered on the initial attempt. There are a number of reasons why this may occur. A common reason is that the consignee is not present, and therefore unable to receive and sign for the package. In some circumstances, this may not be a problem because the delivery location is determined to be secure and/or the class of service associated with the delivery may not require a signature. For example, a class of service may not require a consignee's signature for delivery or a secure lockbox may be provided for deposit of the package. However, in many instances, the class of service (or other constraints) requires a recipient to be present to accept and sign for delivery. This results in the consignee and the carrier entering into various procedures to coordinate a follow-up delivery attempt.

For a delivery provider, such as UPS, handling millions of deliveries each day, each failed delivery attempt requires additional time and resources for coordinating a follow-up delivery attempt. Not only does this result in decreased efficiency for the carrier, but it results in an undesirable delivery experience for the consignee, and potentially the consignor as the package is not delivered as soon as it could be.

Thus, in order to affect an optimal delivery experience, coordination is required between the consignor, carrier, and consignee. All the parties have an interest in achieving prompt delivery.

However, in many instances, delays may occur, schedules may change, or there may not be complete knowledge by all three parties of the details of the delivery. For example, a consignor may be delayed in providing the package for shipment, thus resulting in delaying the anticipated date of delivery to the consignee. Alternatively, the consignee may not be able to accept delivery because he is not present. For example, the consignee may have stepped away from the delivery location for a brief time period, or may be away on vacation. Often, the consignee works during normal delivery hours and cannot be present at a residential address to accept delivery. Or the consignee may plan to be present, but due to a schedule change, cannot be present.

In other instances, the delivery may occur, but in less than optimal circumstances. For example, delivery of the package may be accomplished, but the placement of the package at the consignee's delivery location may not be as the consignee desired. For example, the consignee may desire the carrier to deliver the package to a side entrance instead of a front entrance so as to avoid theft. Or, the consignee may regularly use the side entrance rather the front entrance. The consignee may have desire to have the package placed in a secure lockbox, but has not communicated a combination to the carrier for unlocking the lockbox.

Thus, systems and methods are needed to allow for greater coordination between the consignor, the carrier, and the consignee of a package so as to achieve a successful and optimal delivery experience without wasting resources and incurring unnecessary delays in the package delivery process.

BRIEF SUMMARY

In general, embodiments of the present invention provide methods, systems, computing devices, and/or the like for providing information regarding at least one package to be delivered to a customer.

In accordance with one aspect, a method is provided. In one embodiment, the method comprises storing notification preferences for providing information to a customer regarding a package to be delivered to the customer, the notification preferences (a) identifying at least one communication format and at least one corresponding electronic destination address to be used in providing the information to the customer and (b) comprising a time period prior to a first delivery attempt of the package in which a message providing the information is to be transmitted to the at least one corresponding electronic destination address; and transmitting a message to the at least one corresponding electronic destination address prior to the first delivery attempt of the package to the customer based at least in part on the notification preferences.

In accordance with another aspect, a computing system comprising at least one processor and at least one memory is provided. In one embodiment, the computing system is configured to store notification preferences for providing information to a customer regarding a package to be delivered to the customer, the notification preferences (a) identifying at least one communication format and at least one corresponding electronic destination address to be used in providing the information to the customer and (b) comprising a time period prior to a first delivery attempt of the package in which a message providing the information is to be transmitted to the at least one corresponding electronic destination address; and transmit a message to the at least one corresponding electronic destination address prior to the first delivery attempt of the package to the customer based at least in part on the notification preferences.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 illustrates an exemplary delivery authorization form according to an embodiment of the present invention.

FIGS. 8-11, 12A-12B, and 13-27 illustrate a map of a web site, and exemplary screenshots thereof representing various embodiments of the present invention.

Figure 28:
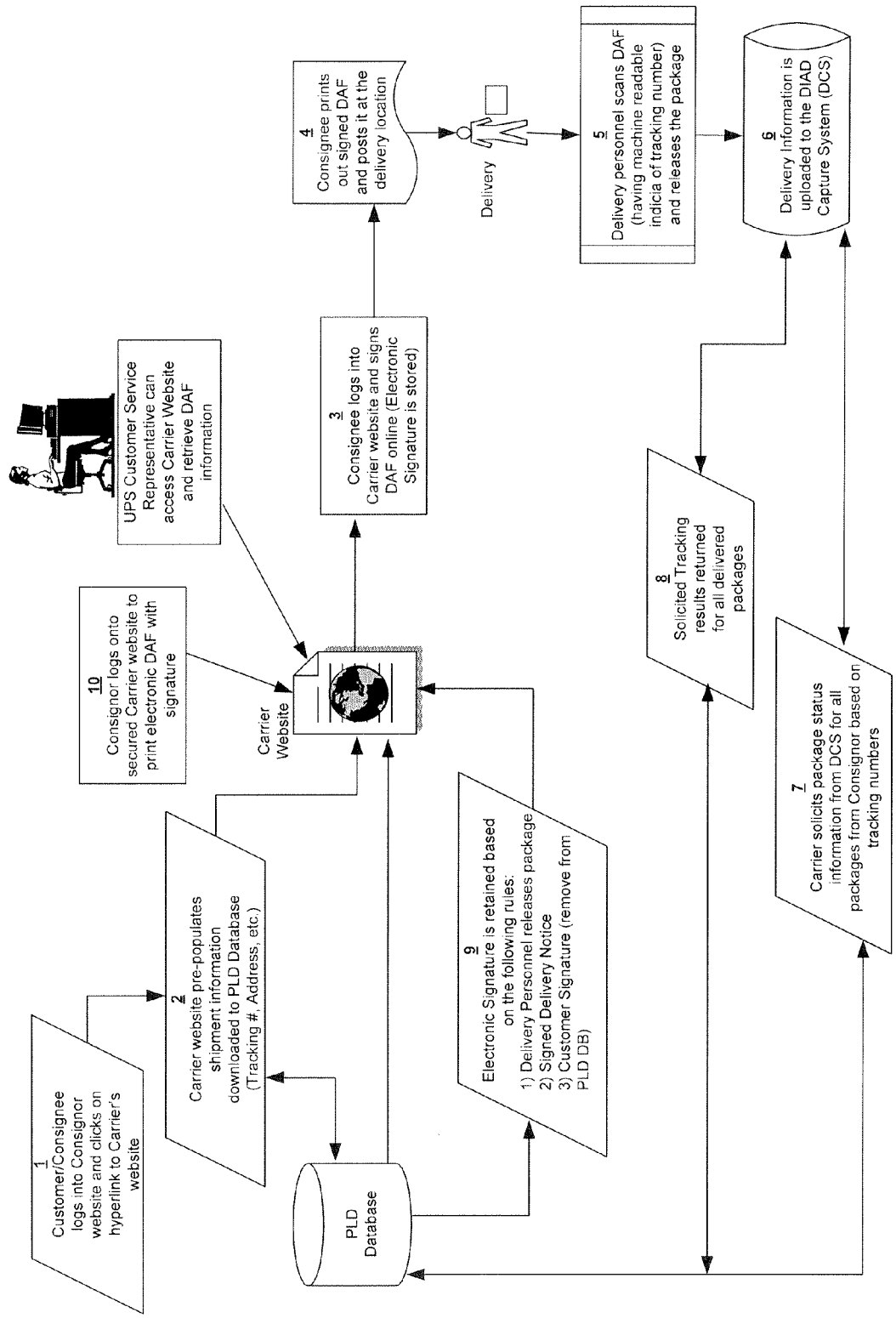

FIG. 28 illustrates an exemplary process of receiving an electronic signature from a consignee on an electronic delivery authorization form, and enabling consignors and carriers to access the signed form.

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Service Overview

There are three main entities involved in the delivery of a package: the consignor, the carrier, and the consignee. In order to provide various personalized delivery services that may arise in conjunction with the delivery of a package, methods and systems are defined for coordinating and personalizing the delivery experience between these three entities. The flexibility of the various means of communication between these entities, as well as the variety of information that can be conveyed, allows the carrier to accommodate various unforeseen circumstances that may occur in conjunction with the delivery of a package. The communication and coordination associated with the personalization of the delivery service may occur either at the request of the consignee or the consignor.

Although the embodiments disclosed herein are disclosed in the context of the delivery of a package, the principles of the present invention may apply to delivery of other items, including freight, provision of services by dispatching service personnel, or any other type of application involving delivery or dispatching. Thus, as used herein, the term "package" is not limited to a parcel, but means any type of good or service being delivered or dispatched by a carrier or service provider.

At a high level, the customization or the personalization of the delivery experience may require or involve the coordination between the:

(1) carrier and the consignee,
(2) consignor and the carrier, and
(3) consignor and the consignee.

It can be readily appreciated why coordination between each of these entities may be required. In the first scenario, the consignee may not be present to accept delivery. Communication between the carrier and the consignee may facilitate delivery by the entities agreeing on a time and/or place to accomplish delivery. In the second scenario, the consignor may request the carrier to alter the delivery address for the package. And, in the third scenario, the consignor and the consignee may agree between themselves to modify aspects affecting delivery of the package and inform the carrier of the change (which then may involve the first or second scenarios). Thus, in many instances, communication in one of the aforementioned scenarios (e.g., between the consignor and the consignee) may be followed by another instance of coordination (e.g., involving the consignor and the carrier). For example, a consignee may notify the consignor of a change of address after the consignor has already shipped the package, but before delivery has been accomplished. The consignor may then communicate the new address to the carrier.

As it will be seen, the first two instances of coordination involve the carrier in some form and impact how or when the carrier accomplishes delivery of the package. In many cases, the impacts to the carrier are highly dependent on the particular facts surrounding the package delivery. For example, a consignor contracting for the delivery of a package may require a signature by the consignee, and only the consignee. This may preclude a request by the consignee to deliver the package to a neighbor instead. Of course, if the consignee communicates with the consignor, the consignor may in turn authorize the carrier to deliver the package without a signature of the recipient, effectively waiving the signature requirement. Because various communications and combinations of coordination are possible, only some examples are provided to illustrate various embodiments of the invention.

Communication Between the Carrier and the Consignee

At a high level, the communication between the carrier and the consignee typically involves the exchange of information to coordinate, or personalize, the package's delivery. Typically, although not required, the consignee is aware of an impending package delivery. This may occur via several ways. In one common embodiment, the carrier may notify the consignee of an impending delivery. This can occur via an email notification, although other forms are possible, including other forms of electronic messaging (e.g., short message service, automated voice telephone calls, facsimile messages, hosted web site messaging, instant messaging, etc.). In other embodiments, the consignor may notify the consignee that a package has been shipped. This is quite common in situations in which the consignor is a merchant from whom the consignee has ordered an item and the consignor provides notification when the package has actually been handed off to the carrier. Typically, the consignor will also provide the consignee with a tracking number of the delivery. In other embodiments, the consignee may be expecting a package based on other facts (e.g., the consignee ordered merchandise and was expecting delivery). In this case, the consignee may proactively access a package tracking web site operated by the carrier to ascertain the status of the package delivery.

Typically, once the consignee is aware of an impending delivery, the consignee can initiate a request for personalizing the delivery of the package. The consignee may communicate the request in different ways, including electronic messaging, such as via email or web-site access, via telephone, or other forms. The request typically provides information to the carrier that the delivery personnel use in the delivery of the package. Such information may include identification of the package (e.g., via a tracking number), requests regarding when the package should be delivered on the day of delivery, where it should be placed at the delivery address, or other special handling information.

Although personalized delivery information is often provided after the consignee is aware of the existence of a package that will be delivered, this information can be also provided earlier. Specifically, a consignee could indicate delivery preferences or instructions prior to a package being shipped to the consignee. For example, personalized delivery information can be provided by the consignee as standing instructions or preferences for delivery of a package. Thus, the delivery preference is to be applied to all future deliveries, even if there is currently no package scheduled for delivery to the consignee. In other embodiments, the delivery information may be provided after the initial delivery attempt. While the carrier may prefer to receive such information prior to an initial delivery attempt, embodiments of the present invention contemplate indication of delivery preferences by a consignee before and/or after an initial delivery attempt.

Communication Between the Consignor and the Carrier

Similarly, a consignor can provide personalized delivery information to the carrier. In some embodiments, the indication of such information may be made by the consignor contemporaneously with the indication of other related package delivery information. A typical circumstance is a customer ordering information from a merchant using web-access, and when placing the order the customer (which typically is the consignee) requests that the items be placed at a certain location upon delivery (e.g., the back door). Upon shipping the package, the merchant may indicate to the carrier the destination address with special instructions regarding the delivery, including placement at the back door. This information could be included with other shipping information provided by the consignor to the carrier via a shipping system. Such shipping systems allow a consignor to prepare packages for shipping.

In another embodiment, the customer may notify the merchant of the special delivery instructions, after the package has been shipped. In that case, the consignor (the merchant) may communicate the special delivery instructions to the carrier by referencing the package or the consignee. Alternatively, and as discussed above, the consignee could indicate such directly to the carrier after learning of the impending delivery.

In other embodiments, the consignor-provided personalized delivery information could originate from the consignor itself, rather than from the consignee. For example, the consignee may know that it is shipping goods which could be damaged if wet, and thus provide delivery instructions indicating that if the package is left at the consignee's delivery address without the consignee being present, the package is to be wrapped or covered in plastic. As another example, the consignor may require that all consignees provide "live" or in-person signatures for release of a package, and would provide this information as a standing delivery preference to the carrier.

Communication Between the Consignor and the Consignee

The communication between the consignor and the consignee, by itself, does not involve the carrier and does not directly impact the delivery of the package. However, a typical result of this communication is that the consignor or consignee will then communicate personalized delivery information to the carrier regarding the package delivery. It is possible that one party may expect the other to contact the carrier, or may facilitate the communication so as to ensure the communication is as seamless as possible. For example, a consignor may communicate with a consignee and learn that the consignee will not be able to receive the package. The consignor may provide the consignee with a web-address of the carrier and the tracking number of the package as well as instructions of how to inform the carrier of this situation. Thus, the consignor facilitates the consignee in indicating his personalized delivery information to the carrier. Alternatively, the consignor could inform the carrier of the situation directly, after which the carrier can contact the consignee and inform him that his delivery preferences have been communicated. The consignor may have obtained the email address of the consignee (such as at the time the consignee placed the order with the consignor), and may provide this to the carrier for purposes of allowing the carrier to communicate shipping status information to the consignee.

Delivery Authorization Forms (DAFs)

The ability for the consignor or consignee to request personalized package delivery creates a greater likelihood that the package will be delivered successfully and in accordance with the consignee's preferences on the initial delivery attempt. By most standards, delivery of a package on the initial attempt is preferable as it results in the package being delivered sooner to the consignee, and it conserves the carrier's resources. As discussed, delivery on the initial attempt does not always occur for various reasons. For example, a consignee may not be available to receive the package, and will only know of the attempted delivery after the failed delivery attempt. In these situations, many service providers, such as UPS, will leave an indication, such as a paper note, in a conspicuous manner at the delivery location indicating that a delivery attempt has been made. One such paper based form is the InfoNotice® used by UPS to indicate a delivery attempt. The consignee, upon arriving at the delivery location typically sees the delivery indication and then is aware of the failed delivery attempt.

One embodiment of the present invention discloses providing the consignee with a notification of the impending delivery prior to the first delivery attempt and provides, or enables the consignee to access, an electronic delivery authorization form (DAF). Generally, the DAF is a form that can be provided electronically to the consignee (e.g., via email) from the consignor or the carrier, or can be accessed electronically by the consignee, such as via the carrier's website. One purpose of the DAF is to provide authorization of the carrier to leave the package without the consignee being present to receive the package. The consignee can then print the form, sign it, and post it at the delivery location in advance of the first delivery attempt. This allows the consignee to receive the package on the first delivery attempt without having to be present.

Another purpose of the DAF is to indicate delivery preferences and/or delivery instructions for delivery of the package. The DAF may include various fields relating to delivery of the package, and allows the consignee to indicate specific delivery preferences on the form (such as indicating that the package should be left at the back door). The DAF can be generated by the carrier or consignor so as to have some of these fields completed prior to the DAF being provided to the consignee. In other embodiments, the consignee can fill in the fields on his own.

After printing a hard copy and posting it in a conspicuous place at the delivery location, the delivery personnel retrieves the DAF upon delivery the package and associates the DAF with the package or delivery. Typically, the DAF includes machine readable indicia that allow delivery personnel to associate the DAF with the shipment of the package via a portable computing device carried by the delivery personnel at the time of delivery. In some embodiments, a DAF with an assigned identifier number may have already been logically associated with the delivery at the time that the DAF was provided to the consignee. Specifically, the carrier may have associated the DAF with the consignee's package at the time the carrier sent the DAF to the consignee. Various other embodiments of the DAF are discussed below.

Structure of an Exemplary Consignee Services System

Figure 1:
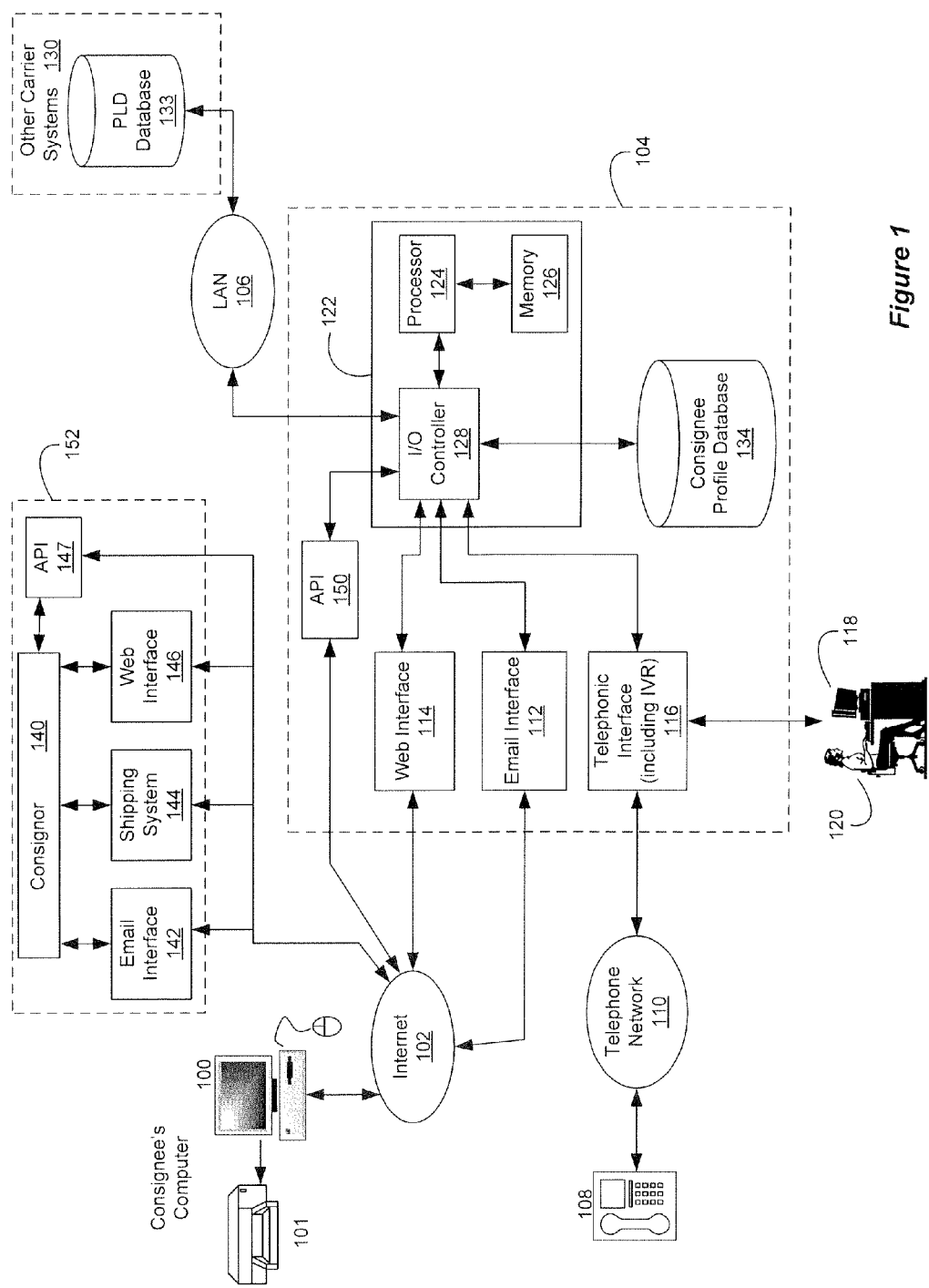
FIG. 1 is a high level diagram of a consignee services system in accordance with one embodiment of the present invention.

FIG. 1 is a high level block diagram of a consignee services system (CSS) 104 in accordance with one embodiment of the present invention. The CSS 104 typically includes a computing system 122 that may be a minicomputer, mainframe, server, or other computing device known in the arts. The computing system 122 typically includes a processor 124, associated memory 126, and an input/output controller 128. The computing system 122 may also comprise disk storage for storing one or more databases, such as the Consignee Profile Database 134 (shown in FIG. 1 as being located remotely from the computing system, although in various embodiments it may be stored locally to the computing system 122). Other embodiments may use other forms of data storages (e.g., data stores), or may use external databases that are accessed using a communication network.

The CSS 104 can send and receive email using an email interface 112 and may host a web site, which is accessible via a web interface 114. Alternatively, a separate computer (not shown) may host the web site and communicate with the computing system 122. The CSS 104 can also comprise a telephonic interface 115 providing interactive voice response (IVR) capabilities to callers. The telephonic interface 116 can allow connection to a customer service representative 120 that uses a computer 118 that is able to communicate with the computing system 122. The CSS 104 is also able to communicate with a consignee's computer 100 via the Internet, as well as a with a consignee 108 using the telephone network 110 via the IVR, using well known methods of prompting the user for information that is entered using keypad depressions (e.g., touch tones). Thus, it is possible for a user to receive a notification via a telephone call providing an audio message, and indicating a delivery preference by responding via touch-tone entry. In some instances, the use of an IVR may not be as friendly or flexible as a web-based interface, but it may provide greater availability to those consignees not having ready Internet access via a computer. The system can also communicate with the consignee via other methods known in the art. It is also possible for the CSS 104 to communicate with the consignee or consignor using an application program interface (API) 150, which typically would occur via the Internet 102, WAN, etc.

In various embodiments, the CSS 104 communicates using a local area network (LAN) 106, or other network, to other systems 130 operated by the carrier. In one embodiment, one of these other systems 130 is a package level detail (PLD) database 133. The PLD database 133 may maintain information about a package being delivered, including its status, as well as other package related information. One embodiment of a PLD database 133 is QuantumView®, which is a system operated by UPS that stores and provides consignees' individual package level information. In other embodiments, the PLD database may be separate or distinct from the QuantumView® system.

As indicated, the consignee typically communicates with or accesses the CSS 104 using a computer 100 connected to the Internet 102, as is well known. Although not shown, other ways of accessing the CSS 104 are possible, such as by using wireless access devices. As is known, cell phones, PDAs, and mobile computers can be used to send and receive email messages and access the Internet. Although these are not shown, these forms of consignee access are possible as well.

The consignor's system 152 may employ several individual computing systems, such as a main consignor computer 140 that interacts with an email interface or system 142 for sending and receiving email messages. In many e-commerce applications, the consignor may send an email message to the consignee when the consignee's order has been shipped, the email message providing a tracking number as well. The consignor computer 140 may interface or otherwise communicate with a shipping system 144. These systems are also well known in the art, and aid in preparing a package for shipment. The shipping system 144 may collect the information associated with the package and package delivery, including the consignee's address, and communicate the information to the carrier's system 104, which the carrier then stores in the PLD database 130. Finally, the consignor system 152 can include a web interface 146 which can be used by the consignee to check on the status of the order, via a consignor's web site for example. The consignor computer 140 can also interact with the carrier's system 104 via an API 147 or may simply direct the consignee to a link on the carrier's website. Similarly, the CSS 104 may communicate with a consignor 140 via the consignor's web interface 146, via an API 150 in the carrier's system, or via an API in the consignor's system 147. In other embodiments, the CSS 104 may communicate with a separate carrier-operated shipping system (not shown), which in turn, communicates with the consignor's shipping system 144. Although not shown, the consignor system 152 may also include a telephonic interface for allowing a consignee to communicate with the consignor, and vice versa, via telephone.

Specific Consignee Capabilities

Figure 8:
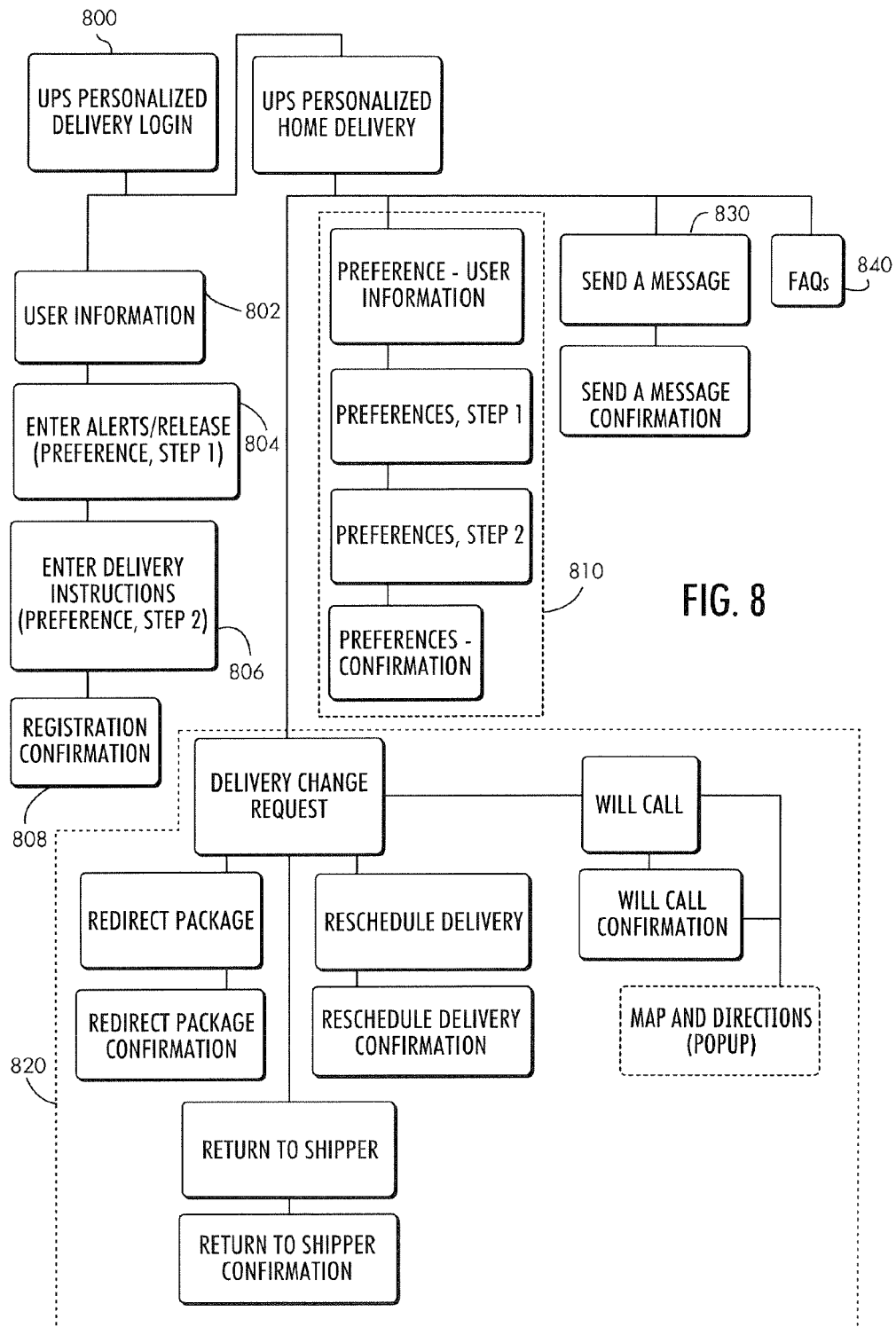

In various embodiments of the invention, a consignee can indicate and personalize delivery preferences for the delivery of a shipment. As used throughout, a "package" may be a container, parcel, or other such item. Delivery of a "package" thus encompasses a shipment of one or more of such items. Therefore, in many instances, a shipment of more than one package is described and there may be delivery preferences associated with different packages within the shipment. Various options and combinations of delivery preferences and instructions are encompassed by the scope of embodiments of the present invention, and the following provides a high level overview of potential embodiments, but is not intended to be exhaustive. FIG. 8 illustrates an exemplary site map of a carrier's web site that provides consignees with the ability to personalize the delivery experience. As can be seen in FIG. 8, and as will be better understood from the description below, the carrier may be UPS and may have an initial web page 800 to allow a user to log in to the UPS Personalized Delivery web site. A user can then be directed to a series of web pages which allow the user to register, by inputting user information 802, alerts/release 804, delivery instructions 806, and which confirm the user's registration information 808. If the user has already registered, the user may be directed to a series of web pages for updating the user's preferences 810. The user may be directed to a series of web pages to indicate a delivery change request 820. Various carrier customer web pages may be accessible to the user, as is known in the art, such as a web page allowing a user to send a message to the carrier 830 (such as a message indicating a problem with the web site or with the UPS Personalized Delivery service), or to a web page having Frequently Asked Questions (FAQs) 840.

Consignee Registration

In accordance with one embodiment of the present invention, a user can register with the consignee services system 104 for purposes of indicating standing delivery preferences and instructions. This collection of consignee information is called a consignee profile. The user does not necessarily have to be a pending consignee (i.e., there is no package currently being processed by the carrier for delivery to that user). Nevertheless, the user is viewed as a potential consignee, and therefore considered as a consignee within the scope of this and other embodiments. The consignee's delivery preferences would then be processed and applied to all subsequent packages in delivery to the consignee. These preferences and instructions would be considered as default indications. A registered consignee can also indicate a particular delivery preference for a particular package, which can override a standing or default preference. Persons who have not registered cannot provide a standing preference indication, but can still provide a per-package preference. Therefore, non-registered users can be viewed (in some regards) as having a subset of the capabilities offered to a registered user.

A consignee can register and request notification of all impending deliveries. In some embodiments, the carrier may store standing consignee preference information in the consignee profile database 134 and per-package preference information in the package level detail database 133. Other embodiments may combine and store both types of information in the consignee profile database 134. A flag indication may be incorporated in the PLD database 133 indicating that consignee delivery preferences may apply to delivery of a particular package to the consignee. Other variations are possible and are within the scope of the invention.

Registration, while not a standalone delivery preference by itself, is a capability allowing a consignee to request specific consignee services and set certain preferences. Once registered, a user can review, update, or otherwise control their preferences. Thus, registration and indication of delivery preferences may occur together. Once registered, the user may indicate a preference without having to re-register. Consignee registration may be required for processing any of the subsequent consignee services that a consignee may select. For example, some carriers may not offer a per-package delivery preference indication service without registration.

Registration may occur by the consignee accessing the CSS 104 by using a consignee computer 100 (e.g., a home computer, work computer, etc.) to access a web site hosted by the CSS 104, as shown in FIG. 1. Once at the website, the consignee can register as a user of the CSS 104. Alternatively, the consignee may register by telephone 108 directly, or via contact with a customer service representative 120 by phone or in person at one of the carrier's shipping hubs or distribution centers. The process of registering may also include authenticating or authorizing the consignee. For example, the consignee may be required to input an identifier that is unique to the consignee (e.g., driver's license number, social security number, credit card number, etc.). This unique identifier can then be verified by the CSS 104 communicating or accessing a third party database to confirm or verify the information. In general, in any process herein described, whether associated with registration or other aspects of the present invention, and whether occurring via website, telephone, or other access methods, the carrier may require the user to provide authentication information prior to accepting and processing input affecting the delivery of a package.

Figure 9:
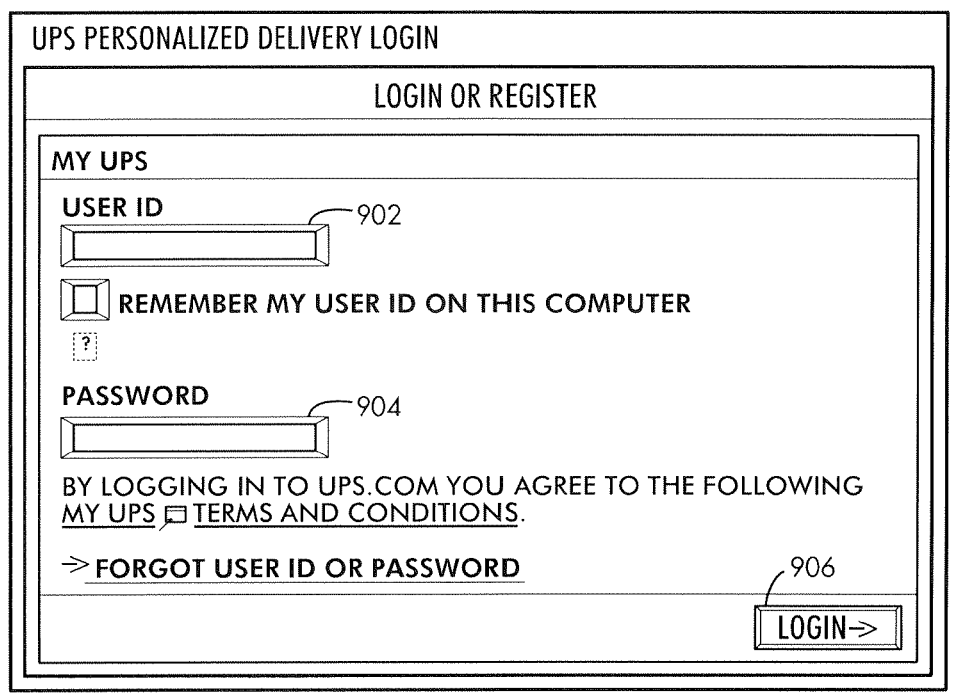
Figure 23:
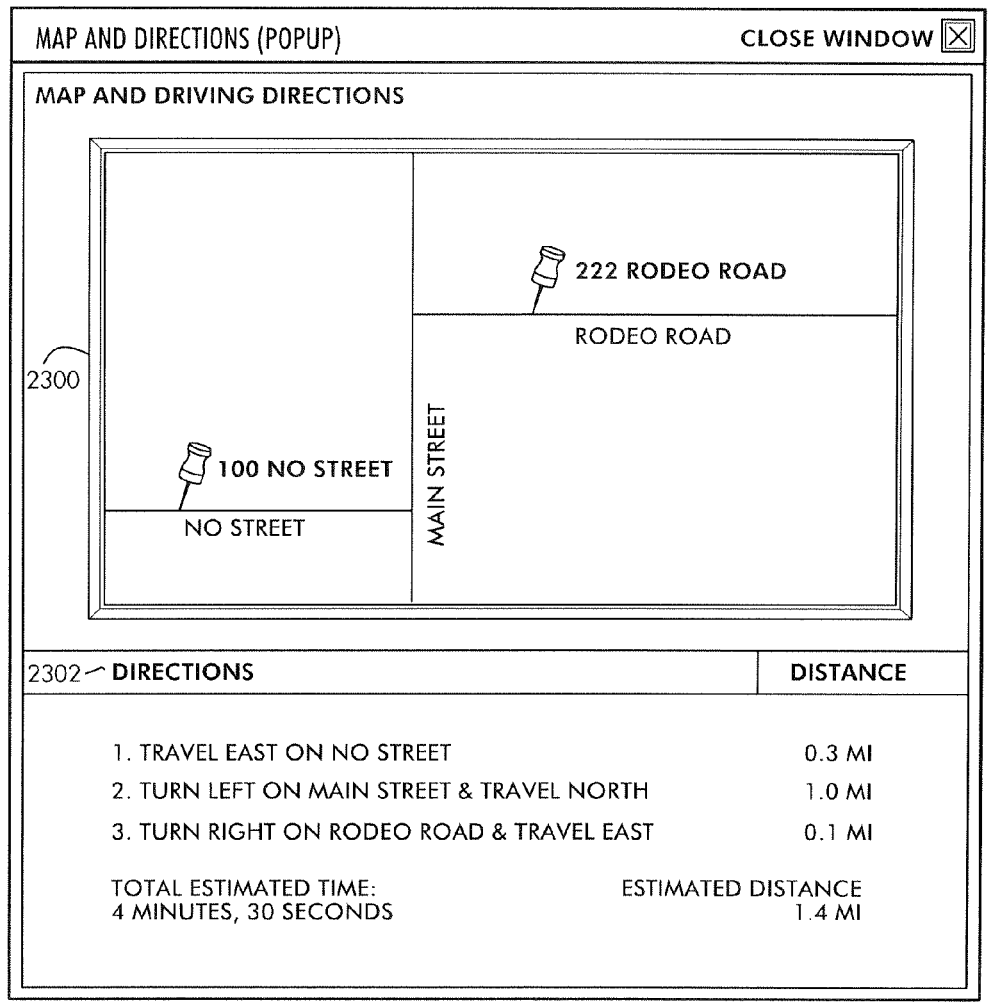

FIG. 9 illustrates a typical web screenshot that may be presented to consignee who is either a user of the CSS 104 or wants to register with the CSS 104. As shown, the user can provide a unique User ID 902 and a password 904 for security purposes. Upon logging in 906 or registering with the CSS 104, the user is prompted to provide various user profile information. The web site can be informative and provide a general information section 1000 briefly explaining the services available to the consignee. As illustrated in FIG. 10, users may be prompted to provide user information or contact information, such as their name 1002 and address 1004. Certain of this information may be required (such as a name, first address line, city, state, and postal code) and may be indicated in bold text. As indicated above, the CSS 104 may verify and authenticate that the information provided by the consignee is accurate, such as by accessing a third party database. These portions may be required to allow the CSS 104 to contact the consignee under various circumstances, depending on the services that the consignee selects. The consignee may also be required to input his telephone number 1006 and a primary email address 1008. In various embodiments, the consignee may be required to provide an alternate email address as well as a password security question and answer. An already-registered user may have previously provided this information and may be directed to a different web page to simply update his preferences.

The system may limit certain services to only certain consignees (e.g., those with a past minimum level of package deliveries). The services may be offered at no fee, a flat fee, or a per service (e.g., per-delivery) fee. Tiered service levels may also be provided to a consignee. Billing plans can also vary based on the shipping volume a consignee receives within a particular time frame. Thus, certain high-volume users may not be charged. Billing can occur on a per-occurrence basis (e.g., charged to a credit card) or via periodic billing (e.g., charged to a pre-established account or mailing a separate invoice).

Delivery Notification

Upon or after registering for consignee services, the consignee may elect to receive notification (shown as "Delivery Alert" in FIG. 11) of future deliveries. The notification may occur using various communication means, including email notification and telephonic notification. Email notification is made using a consignee-provided email address. This email address may have been provided at the time of registration 1008 (see FIG. 10), or at the time that the consignee selects to receive delivery notification 1110 (FIG. 11). In some embodiments, a plurality of addresses can be indicated, and notification can be directed to a personal digital assistant (PDA), cell phone, computer, pager, or other device. Notification can occur using other forms of electronic messaging, including short message notification, instant messaging, etc. With reference to FIG. 11, the consignee can elect to have email notification sent at the earliest time in which a package is detected in the carrier's systems 1102, or the email notification can be sent within twenty-four hours of the scheduled delivery 1104. In other embodiments (not shown), email notification can be sent at some other time in the package delivery process (such as in the morning of the day that delivery is scheduled). If a consignee selects to receive e-mail notification 1102 or e-mail reminder 1104, the consignee may have to enter or confirm his email address 1110 to ensure that the CSS 104 can send the notification to the consignee.

Telephonic Delivery Notification may also occur, for example, using automated equipment to dial a consignee indicated telephone number, and playing a prerecorded announcement which specifies delivery information. The consignee can select to receive a phone reminder 1106 within twenty-four hours of delivery. In the embodiment shown in FIG. 11, the consignee can select a time window option 1108 for receiving the phone reminder. For instance, the consignee can select a morning phone reminder (8 a.m.-12 p.m.), an afternoon phone reminder (12 p.m.-5 p.m.), or an evening reminder (5 p.m.-8 p.m.).

As shown in FIG. 11, the consignee may be presented with various selection boxes (such as email notification 1102, email reminder 1104, and phone reminder 1106) and may select one or more of these options. For example, the consignee can select to receive e-mail notification and phone reminder, or can select to receive e-mail notification and e-mail reminder, with no phone reminder. Thus, various combinations are possible, including multiple notifications being sent at different times, or sending multiple notifications via different media and to different consignee contacts (such as an email address, via short message service, or a telephone number). The notification alert(s) can also provide an indication of an estimated delivery time window(s).

Typically, a notification is provided for each package, although other embodiments may provide a notification for each delivery (which can comprise a plurality of packages). The notification may include other information, such as the class of service, consignor, weight, value, or any other information retained in the PLD database for the shipment. Typically, notification requires a user to register for the delivery notification service, although in other embodiments, the notification is provided on a 'one-time' basis, in which the consignor provides the consignee address information and requests that a notification be provided to the consignee. The provision by the carrier of delivery notification is independent of notification provided by the consignor. The carrier may also provide a delivery notification service independent from other services requiring registration of a user for purposes of indicating delivery preferences.

When entering his delivery preferences, a consignee can also select Package Release 1112, which authorizes the carrier to deliver the package on the first delivery attempt without obtaining a signature. This service is described further below, under "Package Release".

Delivery Instructions

Upon or after registering, the consignee can select or indicate various delivery instructions associated with all future package deliveries, or for a specific delivery after receiving a notification of that delivery. These instructions may be set by the consignee as default instructions for all future package deliveries, specific instructions for a given condition (e.g., timeframe, specific delivery, etc.), or a one-time indication (e.g., per delivery or per package). In the last case, the consignee may be required to provide a tracking number or other shipment identifier. In order for the consignee to personalize the delivery preferences to his specific delivery location, the consignee may be required to input a "type of address" 1114, such as whether the consignee lives in a house, or in an apartment (or similar dwelling), as shown in FIG. 11.

The delivery instructions can include, for example, the specific location at the delivery address where a package may be left if the consignee is not present to receive the delivery in person. Referring to FIG. 12A, in one embodiment of the present invention, a consignee who lives in a house, or individual dwelling unit, may instruct the carrier to leave packages at the front door, back door, side door, patio, deck, porch, garage or carport (these options are represented by delivery instructions 1200). Alternatively, the consignee could indicate that the package is to be left with a neighbor, and provide the street address or apartment number of the neighbor in the space provided 1202. In another embodiment, the consignee could indicate that there is no preference for where a package should be left. In addition to selecting or providing delivery instructions 1200, the consignee can manually enter additional instructions 1204 for delivery personnel. As an example, these additional delivery instructions 1204 could indicate the combination of a lockbox or gate, or could instruct the delivery personnel to cover the package with plastic.

Similarly (and with reference to FIG. 12B), if the consignee lives in an apartment or similar dwelling, the consignee can provide delivery instructions 1210 that may be more particular to such a dwelling. For instance, the consignee can indicate one of a variety of locations where the package could be left, including with the front desk or concierge of the apartment building. As described above, the consignee can indicate that the package is to be left with a neighbor and can input the neighbor's apartment number in the field provided 1212. The consignee can also provide additional instructions 1214, such as a code to get into the apartment building, the combination to a secure lockbox, or an indication of the location or combination to another package depository (such as a common delivery location at an apartment complex).

The delivery instructions indicated by a consignee (such as shown in FIGS. 12A and 12B) can be communicated to delivery personnel by the carrier, by transmitting an appropriate message to a portable computing device carried by the delivery personnel, which has a display for indicating text messages or other graphical information of the delivery preferences selected by the consignee.

After the consignee has provided delivery preferences and delivery instructions as described above, the CSS 104 will confirm the consignee's contact information and indicated preferences and instructions, as shown in FIG. 13.

As described above, a consignee may initially indicate delivery instructions and/or preferences upon registration, so that the CSS 104 would apply these instructions and preferences to all future deliveries. As discussed below, the consignee can also modify or update these preferences at any time, or can modify them on an individual basis for individual package deliveries.

Package Release

Upon or after registering, the consignee can also select the Package Release service 1112 (see FIG. 11), which allows a consignee to indicate that a package (or plurality of packages) may be released to the delivery location on the first delivery attempt without the consignee's signature. This is similar to the Advance Delivery Authorization service described below. This service may be selected by the consignee at the time of registration or can be indicated on a per-package or per-delivery basis, such as after receiving notification of an impending delivery. In some embodiments, the consignor may require a signature, and the consignee's waiver cannot override the consignor's request for a signature. In other embodiments, the carrier may determine that the circumstances surrounding the delivery are not suitable for release of the package without the consignee being present, and thus the package release request may be disregarded.

Delivery Change Request

The Delivery Change Request (DCR) service (see FIG. 14) allows a consignee to redirect or otherwise impact the delivery of a package(s). In concept, this is similar to the previously mentioned delivery preference in which the consignee may indicate the package is to be left with a neighbor. However, when the change request requires delivery at a different stop along a delivery route (e.g., at a distant address), then this capability could be viewed as a DCR. Typically, the DCR applies on a per-package or per-delivery basis, although it may be indicated at the time of registration for future packages that might be delivered to the consignee within a specified time period, for instance. With reference to FIG. 14, if the DCR is to apply to a specific package, the consignee will be required to input the tracking number 1402 of the package.

The consignee can then select from several DCR types, including: redirect package, refuse delivery, reschedule delivery, or will call. A "redirect package" request 1404 instructs the carrier to deliver the package to an alternate local address and/or recipient specified by the consignee when the consignee makes the request. A "return to shipper" request 1406 instructs the carrier to return the package to the consignor or shipper, and may require a consignee to indicate the consignee's reasons for return. A "reschedule delivery" request 1408 instructs the carrier to deliver the package to the original delivery location (e.g., the consignee's home) on a date and/or time specified by the consignee in the consignee request. A "will call" request 1410 instructs the carrier to hold the package for consignee pickup at a location and for a period of time specified by the consignee in the consignee request. Those skilled in the art will readily understand that other instruction options exist that do not depart from the spirit and scope of the present invention. Many of the capabilities and associated information requirements for each of these capabilities are disclosed in the accompanying figures illustrating how a consignee may indicate the DCR information via a carrier's web site.

In the embodiment shown in FIG. 14, a consignee is limited to selecting only one DCR per package or delivery. In other embodiments (not shown), a consignee may be able to select more than one DCR. For instance, a consignee may leave for vacation at a vacation home on the day that delivery is scheduled. The consignee could then select "reschedule delivery" and "redirect package" in order to schedule delivery for two days later, the delivery to occur at the vacation home.

As shown in FIG. 15, if a consignee selects "Redirect Package" 1404, the consignee will be directed to a web page to provide the necessary information to redirect the package. For instance, the consignee can input the name of the company 1502 where the package is to be delivered. The consignee typically is required to provide the recipient name 1504 for the "redirect" request. In the embodiment shown in FIG. 15, the consignee may be redirecting package delivery to his work address rather than his home address. In this case, the "recipient name" 1504 is the same as the consignee's name 1510, namely, John Smith. The consignee may have to input or confirm his name 1510 and telephone number 1512. The consignee is also required to input the alternate address 1506 for the redirect request. A consignee may be limited to specifying an alternate local address, the bounds of which may be determined by the carrier. For instance, the carrier can limit the redirect request to an address located along the same delivery route, or an address that is serviced by the same hub facility.

The consignee may also be required to provide a telephone number 1508 for the recipient at the redirected address. The "redirect package" service also enables the consignee to provide special handling instructions 1514 that may be associated with the redirect address. For example, the consignee may specify that the package is to be left with the receptionist at the redirect delivery location and input the receptionist's or office's main telephone number. As shown in FIG. 16, the carrier may direct the consignee to a web page to confirm the consignee's input information for the redirect package request.

If the consignee selects "Return to Shipper" 1406 (FIG. 14), the consignee will be directed to a web page (see FIG. 17) to indicate the reason 1700 for returning the package to the shipper. Such reasons may be that the consignee determined, after the package was in transit, that the consignee no longer desires the item. Another reason for return may be that the consignee needed the package by a certain date and determined that the consignor shipped the package too late for it to be of any use. One of ordinary skill in the art may appreciate the variety of reasons that a consignee may have for returning a shipment to a consignor after the package has shipped. The consignee may also be required to provide the consignee's name 1702 and telephone number 1704 so that the consignor will have this information when the package is returned and can associate the information with the shipped package. As may be appreciated, because the consignee may have entered this information previously (see e.g., FIG. 10), the CSS 104 may automatically fill in these fields on each subsequent web page visited by the consignee so that the consignee does not have to repeatedly enter the information. The consignee can also enter special handling instructions 1706 for the returned shipment. For example, the consignee can indicate that the package is to be delivered to the consignor's back door. As another example, the consignor could indicate that the package is to be returned at a lower class of service so that the consignee and consignor do not have to incur additional costs. FIG. 18 illustrates a web page confirming the information provided by the consignee in the "return to shipper" delivery change request.

If the consignee selects "Reschedule Delivery" 1408 (FIG. 14), the consignee will be directed to a web page (see FIG. 19) to indicate certain instructions for the reschedule delivery request. The web page may provide informational instructions 1900 to the consignee and indicate that the new delivery date selected by the consignee must be at least one day past the scheduled delivery date. The consignee can select a new delivery date 1902, and input or confirm his name 1904 and telephone number 1906. The consignee can also confirm or provide special delivery instructions 1908 for the rescheduled delivery. As described above, the consignee's name and telephone number can be completed automatically by the CSS 104. Similarly, the special handling instructions 1908 can be filled in based on the information provided by the consignee when indicating delivery instructions (see FIG. 12A, additional instructions 1204, and FIG. 12B, additional instructions 1214). If the special handling instructions 1908 are automatically included by the CSS 104, they can be deleted, changed, or left alone, according to the consignee's preference for the rescheduled delivery. FIG. 20 illustrates a confirmation web page of the reschedule delivery information provided by the consignee.

Finally, if the consignee selects to "Will Call" 1410 the package, the consignee will be directed to a web page (FIG. 21) to provide additional information. The consignee can confirm his name 2102 and telephone number 2104, and can confirm or provide special handling instructions 2106. The CSS 104 can automatically determine a carrier facility that will hold the package for pickup, based on the consignee's delivery address. For example, the CSS 104 may use the consignee's postal code (provided, for example, as part of the consignee's contact information 1002 in FIG. 10) to determine the nearest UPS Store. The web page will present the pickup location information 2110 (such as the facility name, address and telephone number) to the consignee. The web page can also include a hyperlink 2114 to allow the consignee to view a map (discussed below) of the carrier facility location. The CSS 104 can also provide the hours of operation 2112 of the carrier facility. The consignee can then indicate the date or date range 2116 during which the package is to be held. In various embodiments, the carrier may only hold packages for will call for a certain period of time (e.g., one week from the scheduled date of delivery), and automatically provide the date range to the consignee. The web page may include a disclaimer 2118 indicating that if the consignee does not pick up the package on the dates provided, the package will be returned to the shipper.

FIG. 22 illustrates a confirmation web page confirming the consignee's will call request. If the consignee clicks on the "View Map" hyperlink 2114 (FIG. 21), the consignee can be directed to a map showing the location of the carrier facility. In the embodiment shown in FIG. 23, the CSS 104 can use the consignee's address and the carrier facility address to provide a map 2300 and directions 2302 to the consignee indicating how to get to the carrier facility to pick up the package.

Although the Delivery Change Requests discussed above were described with regard to the consignee accessing various web pages to provide information, other embodiments of the present invention enable a consignee to provide Delivery Change Request information via telephone. For example, a consignee making a "Redirect Package" request can call the carrier via the Telephonic Interface (including IVR) 115 and provide the required information using IVR (Interactive Voice Response), or by communicating the information to a customer service representative 120 who can input the information into a computer 118 in communication with the CSS 104. In general, any input provided by a consignee (whether for a Delivery Change Request or other request) could also be provided by the consignor, or an agent designated by the consignee.

Delivery Change Requests can also be made by the consignor rather than, or in addition to, the consignee. A consignor-requested DCR may be made proactively by the consignor or in response to a request by the consignee to do so. In the former instance, the consignor may have placed the wrong item in the package and indicate a DCR similar to the "return to shipment" DCR described above. In this instance, this DCR may be a "recall package" DCR, because it is made by the consignor. In the latter instance, the consignee may realize that he will be at a different address at the time that the package is to be delivered. Rather than contact the carrier with this information, the consignee may contact the consignor and indicate the address to which the package is to be redirected. The consignor can then make a Delivery Change Request on behalf of the consignee and provide all of the necessary information for redirecting the package.

Modification and Updates to Consignee Profile

As discussed above, a registered user of the CSS 104 can update and modify his user profile, including notification preferences, delivery instructions, and delivery change requests, at any time after registration (see generally FIGS. 24-27). These modifications and updates can also occur on a per-package or per-delivery basis. For example, in response to an email notification sent to the consignee's email address, the consignee can access the carrier's website (proactively or through a link provided in the email), provide the tracking number for the package, and indicate certain delivery instructions or DCR for the package.

FIG. 24 illustrates a web page allowing a consignee to update his user information. The consignee may update his name 2402, telephone number 2406, and email address 2408, but would not be able to update his address 2404. Presuming the package is already en route to the consignee's address, if the consignee wanted to update the delivery address for this delivery, he would have to make a redirect package request as described above. In other embodiments, the consignee may be able to update or modify his address (not shown), but the modification would apply only to future deliveries not currently en route to his delivery address. The consignee could update other aspects of his user information, such as his primary e-mail 2408, alternate e-mail, or security question and answer.

Similarly, the web page illustrated in FIG. 25 would enable the consignee to update his delivery preferences, as described with reference to FIG. 11. FIG. 26A illustrates a web page enabling the consignee to update his delivery preferences if he lives in a house. Likewise, FIG. 26B illustrates a web page enabling the consignee to update his delivery preferences if he lives in an apartment, town-home, or condominium. FIG. 27 illustrates a web page confirming updates that the consignee made to his user information, delivery preferences, and delivery instructions. Although not specifically shown, it is understood that the CSS 104 enables the consignee to update his profile with respect to a particular package or delivery, in addition to modifying his standing or default delivery preferences and instructions. For example, the web pages illustrated in FIGS. 24-27 could include a field for inputting the tracking number of a specific package, and the consignee could be directed through similar web pages to add or modify any preferences or instructions for the particular delivery.

Figure 2:
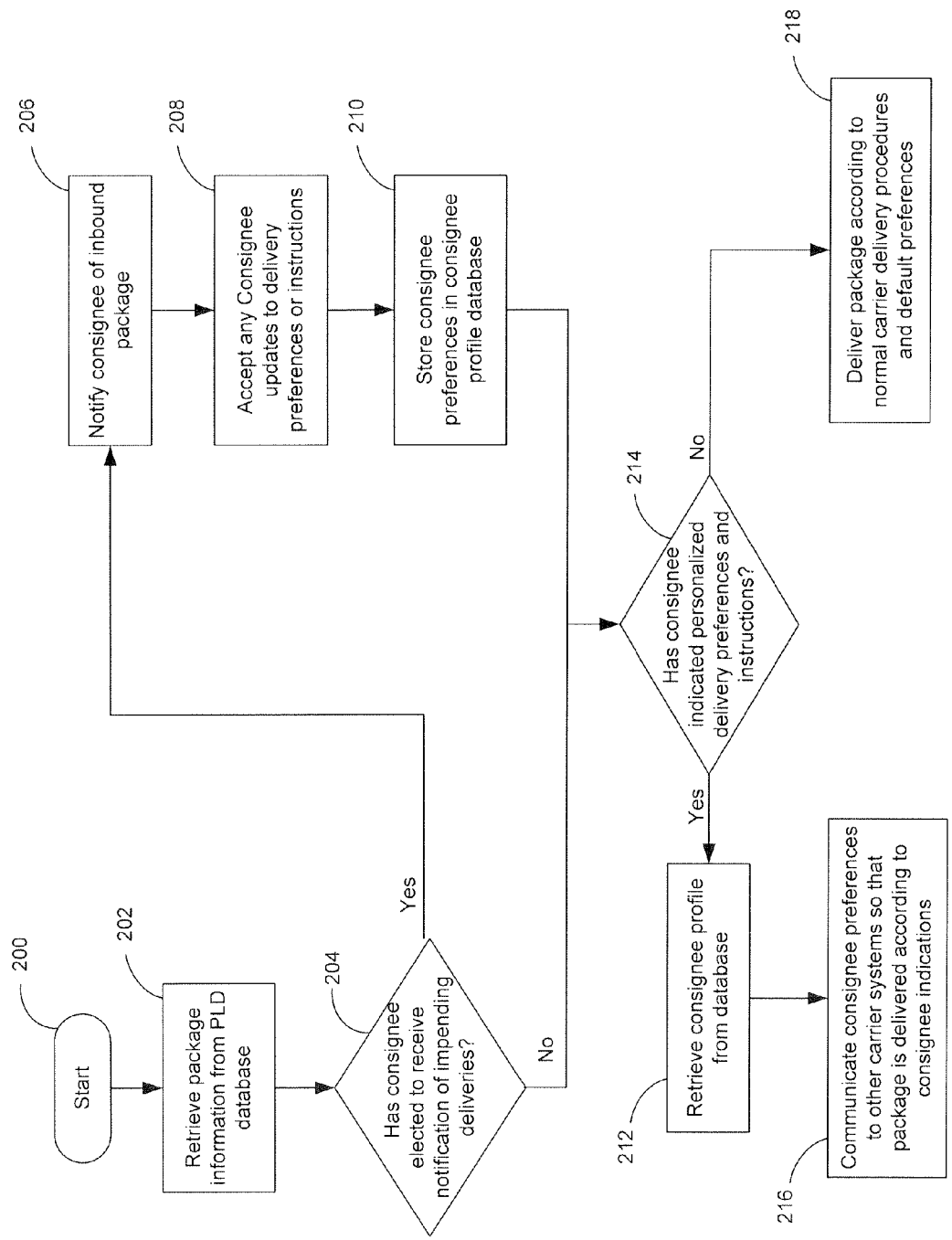
FIG. 2 is a flow chart illustrating a method of providing consignee services, in accordance with one embodiment of the present invention.

Carrier Package Processing for Consignee Indicated Personalized Delivery Service FIG. 2 illustrates one embodiment for processing a package in accordance with consignee indicated personalized delivery preferences. As may be appreciated, variations and modifications are possible, which remain within the scope of the present invention.

The process begins at step 200 with a package being processed by the carrier's package handling system. The package is typically assigned a package identifier and encoded with a machine readable form of the identifier representing a tracking number. Such identifiers are well known in the art and used to track a package through the various stages of handling. Typically, a package is scanned (e.g., 'read') several times during its handling by the carrier. Typically this occurs when the package is first handled by the carrier, and thereafter at various points when it is loaded and unloaded from a delivery vehicle or processed in a package routing center.

At step 202, it is presumed that at some point equipment scans the package for determining how to process the package. During this process, the PLD database 133 may be accessed to read/write package level data so as to determine where to route the package. When the package data is read, a determination is made at step 204 whether the consignee has elected to be notified of impending deliveries to the consignee's name or address. As discussed, this service provides a notification to the consignee of the pending delivery of the package, typically in the form of an email or telephonic notification message. If the consignee has elected this service, then the next step 206 is to notify the consignee of the package.

It is common for the email message to provide a link to the carrier's web site. The consignee may click on the link to provide preferences or instructions regarding the delivery of the package. As described above, a registered consignee may update preferences or instructions already registered with the CSS 104. In other embodiments, an unregistered user can input or indicate delivery preferences for this particular delivery. In either case, assuming that the consignee has done this, the carrier's computing systems at step 208 accept the consignee's delivery preferences and/or instructions. The carrier then stores this information as a consignee profile, or consignee profile record, in the CSS 104 (such as in the consignee profile database 134) in step 210. In other embodiments, the carrier could alternatively store the consignee's preferences in the PLD database 133 as a record for that particular shipment.

The package is presumed to be continued to be routed, until it is loaded on the final delivery vehicle for delivery. Around this time, the CSS 104 ascertains whether there are any delivery preferences indicated. The determination of personalized delivery preferences or instructions may occur either prior to the package being placed on the delivery vehicle (e.g., while the package is being routed by the carrier's sorting and handling systems) or after it is placed on the delivery vehicle, or at both times (such as might occur if the consignee also modifies the personalized delivery instructions on the day of delivery). As illustrated in FIG. 2, the CSS 104 may ascertain whether the consignee has indicated personalized delivery preferences and instructions regardless of whether the consignee has elected to receive notification of the delivery.

The CSS 104 may determine this by querying the consignee profile database 134, or by the accessing the PLD database 133. As noted herein, the indication of personalized delivery preferences and instructions can be stored either in the PLD database 133 or in the consignee profile database 134, often depending on the type of information to be stored. In the case of the personalized delivery instructions being stored in the PLD database 133, the CSS 104 can set a flag with that date indicating exception treatment, so that the information is properly conveyed to delivery personnel associated with delivery of the package.

Once the determination has been made that a personalized delivery is to be provided to the consignee in step 214, the CSS 104 determines the specific preferences and/or instructions indicated by accessing the consignee profile record (at step 212) in consignee profile database (or the PLD database, if appropriate). The delivery preferences and instructions are then communicated by the CSS 104 at step 216 to the appropriate parcel processing system, which typically involves communicating the delivery preferences/instructions to the delivery via a portable computing device (described below). The portable computing device then notifies the delivery personnel of the preference/instruction, typically via a text or graphic message displayed at the appropriate time. If the CSS 104 determines at step 214 that no personalized delivery preferences/instructions have been indicated by the consignee, then the carrier delivers the package to the consignee under standard delivery procedures at step 218.

Figure 3:
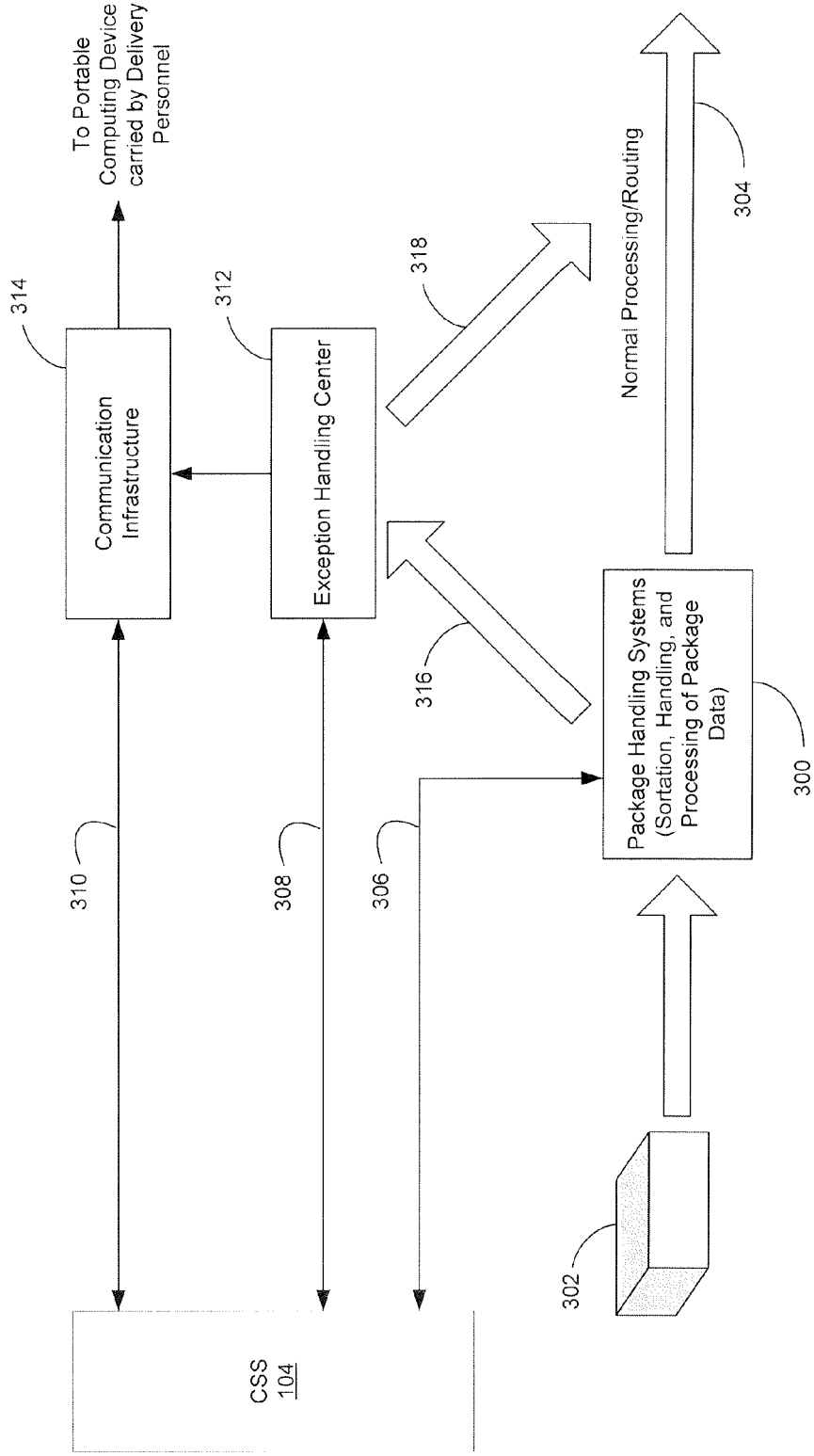
FIG. 3 is a diagram illustrating further details of components of a consignee services system, in accordance with one embodiment of the present invention.

Exemplary systems for processing a package in this manner are shown in FIG. 3. In FIG. 3, a package 302 is received by the carrier's package handling systems (PHS) 300 which may comprise sortation equipment, package handling equipment, and associated computer and processing systems for instructing the equipment how to process a package. Such package handling systems 300 include the various systems capable of identifying a package via machine readable indicia conveying a tracking number, such as disclosed in U.S. Pat. No. 5,804,802, the contents of which are incorporated by reference.

The package 302 is typically scanned or otherwise identified in the normal handling of a package while in the carrier's sorting facility by the PHS 300. The scanning equipment, upon identification of the package, may check the consignee's address against consignee addresses stored in the consignee profile database. This may be accomplished by conveying the address via path 306 to the carrier's CSS 104.

Alternatively, the PHS 300 in communication with the CSS 104 may determine that an exception exists for the package. For instance, using the consignee address, the CSS 104 may communicate with the consignee profile database, determine that the consignee has indicated certain delivery preferences or instructions, and can communicate this information, or 'exception', back to the PHS 300. As an example, the 'exception' may be a delivery instruction by the consignee indicating that the package is to be redirected to a different delivery address.

In such cases, the PHS 300 may receive information via communication link 306 from the CSS 104 that exception handling is required for a specific consignee or package delivery. This information could be transmitted periodically on a batch basis for all relevant packages, or individually for each package as required. Alternatively, the PHS 300, upon notifying the CSS 104 of an address match, may receive an indication from the CSS that special handling is required. In any case, the PHS 300 diverts the package via path 316 to an Exception Handling Center (EHC) 312. There, either further processing systems and/or personnel determine via information received via communication path 308 from the CSS 104 what the 'exception' for the particular consignee or package may be (for example, that the package should be redirected to another address). This may entail printing and attaching a new shipping label on the package, and forwarding the package via path 318 back into the normal processing flow 304 of packages. In some embodiments, the EHC 312 may be directly notified by the CSS 104 that personalized delivery for a package is required. In such cases, the EHC 312 may determine that the package is already loaded onto a package delivery vehicle and the personalized delivery instructions are communicated using a communication infrastructure 314 (for example the systems illustrated in FIG. 7) that wirelessly relays the instructions to a portable computing device carried by the delivery personnel.

Finally, the CSS 104 may also convey the personalized delivery preferences or instructions via link 310 directly to the communication infrastructure 314 that communicates the information the portable computing device used by delivery personnel. These systems help to ensure that the portable computing device associated with handling the package is notified, at the appropriate time during delivery.

Advance Delivery Authorization

Service Overview

The Advance Delivery Authorization (ADA) service is similar to the "Package Release" service described above. However, the ADA service involves the use of the electronic delivery authorization form (DAF) for indicating package release. This is another embodiment of the invention that provides a personalized delivery experience for the consignee. In various embodiments, the DAF is provided in electronic format (such as a PDF file attachment to an email), which can be printed out and posted at the delivery location for retrieval by the delivery personnel responsible for delivering the package. Typically, this applies in situations in which the consignee or his representative is not present to accept a package for delivery, but wants to provide an indication that the package may be left at the premises anyway. Currently, an initial delivery attempt is made, and a paper form is left at the delivery address indicating the unsuccessful delivery attempt; the paper slip can later be signed by the consignee and left at the delivery address for a subsequent delivery attempt instructing the delivery personnel to leave the package. ADA provides the ability to avoid the initial unsuccessful delivery attempt; in other words, ADA provides the consignee with the ability to authorize delivery of a package in advance of a first delivery attempt.

ADA accomplishes this by providing the consignee with advance knowledge of the delivery, and providing the consignee with a delivery authorization form (DAF) which is left at the premises (e.g., on the front door) in advance of the initial delivery. The delivery personnel may or may not be aware of the pre-existence of the DAF, but upon encountering the DAF will deliver the package accordingly. Of course, there are some service options which may preclude the use of a DAF (e.g., where the consignor requires a "live", or in-person, signature, or if the package is COD and requires payment, etc.). It is presumed, for the sake of illustration, that there is no restriction precluding the use of a DAF.

Figure 4:
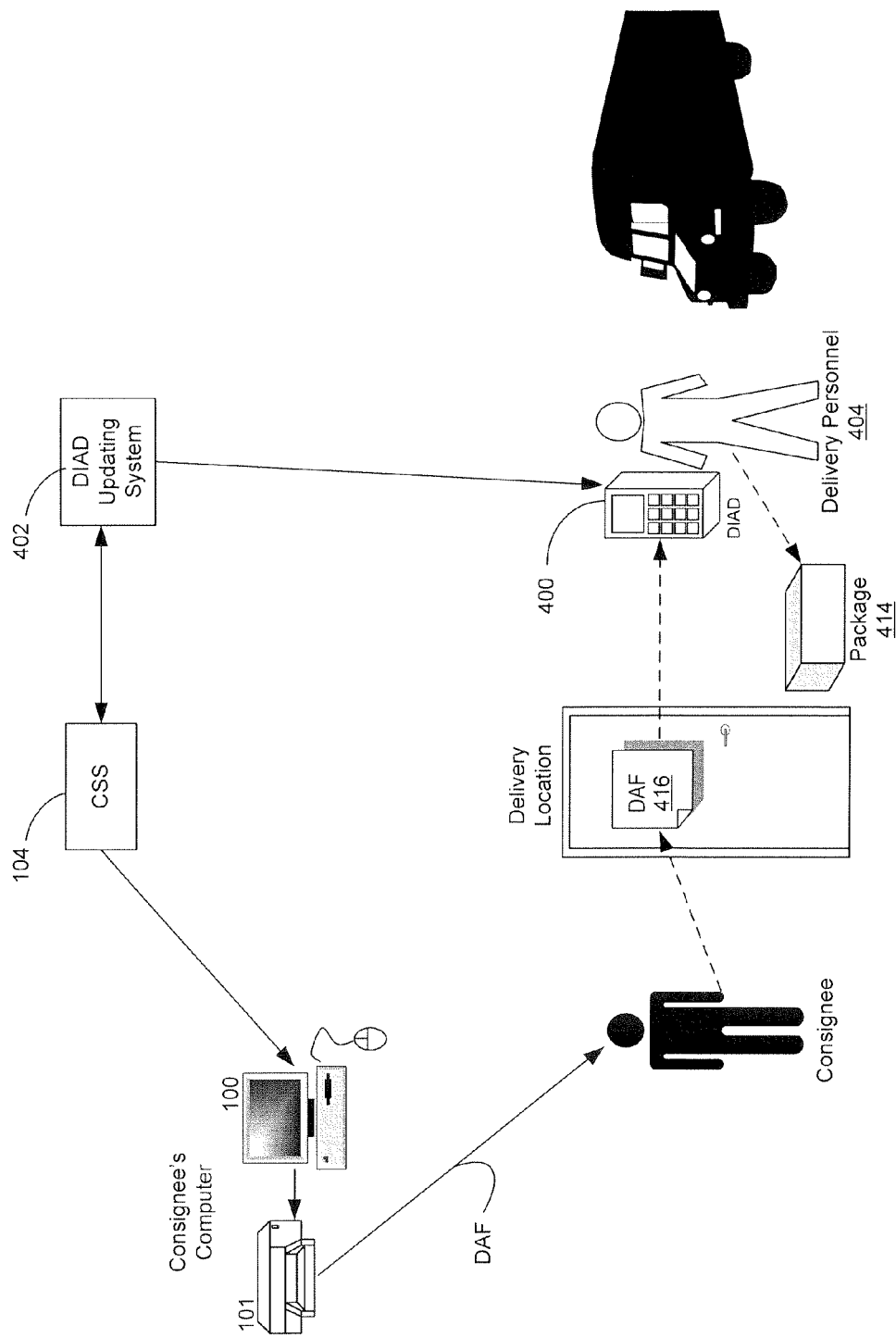
FIG. 4 is a high level diagram of a customized pickup and delivery system in communication with delivery personnel, in accordance with one embodiment of the present invention.

FIG. 4 provides a high level overview of one embodiment of the Advance Delivery Authorization service. In FIG. 4, the CSS 104 is presumed to provide notification of an impending package delivery to a consignee 412. The notification message is viewed by the consignee on the consignee's computer 100. The notification message may include an attachment including a DAF in any of the well known file formats. This allows the consignee to print the form locally, such as at the consignee's printer 101.

Meanwhile, the CSS notifies a DIAD Updating System 402 that communicates to a portable computing device 400 associated with the delivery personnel. Individual components of the DIAD Updating System 402 will be discussed in greater detail with reference to FIG. 7. The portable computing device 400 is provided information regarding the DAF form, which may be encountered when the delivery personnel 404 attempts to deliver the package 414. The information regarding the DAF form which is provided to the portable computing device 400 may indicate to the delivery personnel that a DAF was requested by, or provided to, a consignee, thus indicating that the delivery personnel should be on the lookout for a DAF at the delivery address.

Upon receiving the notification message of the impending package delivery, the consignee may know that he may not be present to accept the delivery. Consequently, the consignee fills out and signs the DAF 416 and places the DAF 416 in a conspicuous location, such as the front door of the delivery address 420. Upon arriving at the delivery address, the delivery personnel 404 observes and retrieves the DAF 416, and knows to leave the package according to the instructions or preferences indicated on the DAF 416. The DAF may have a unique identification number, which the portable computing device 400 may record and/or verify, and which allows the DAF to be associated with the shipment. In summary, the DAF transforms an otherwise unsuccessful delivery attempt into a successful delivery.

This is but one variation of the service, as a more complete description of the various embodiments is provided below.

Delivery Authorization Form Generation and Communication to the Consignee

The delivery authorization form (DAF) may be provided to the consignee by various entities, including the carrier, the consignor, or another party. The DAF is typically provided to the consignee using electronic communication, including email, the Internet, or any other communication method known in the art. The consignee may receive the DAF directly (e.g., as an email attachment), or may receive information prompting the consignee to request the DAF (e.g., by accessing a web site and requesting the DAF). The consignee may receive this information via telephone or wireless communication, and then use the consignee's computer to access the Internet to retrieve the form. The consignee may access the Internet via dial-up, digital subscriber line (DSL), cable Internet, wireless, or any other means of accessing the Internet known in the art.

The DAF typically includes fields associated with package delivery, for the input of information such as the date (e.g., the date that the DAF is signed by the consignee), name and/or address of the consignor, tracking number of the shipment, name of the consignee, address and telephone number of the consignee, desired package delivery location (such as the consignee's front or back door, garage, a neighbor's address etc.), consignee's printed name, and consignee's signature. The DAF may also include instructions to a consignee for filling out and executing the DAF, as well as liability limitations associated with using the DAF. The DAF may also provide instructions to the delivery personnel to follow upon retrieval of the DAF. An individual DAF may have an associated serial number. This serial number may be initially only associated with the DAF, and is used by the carrier to associate the executed DAF with the shipment. This latter association typically occurs at the time of the delivery attempt. Typically, the delivery personnel retrieve the DAF upon the delivery attempt and records or reads the serial number in association with the delivery, as described further below.

FIG. 6 illustrates one embodiment of a delivery authorization form (DAF) 600, which may be used by a carrier such as UPS. A DAF may include a general information field 602 identifying the purpose or name of the form and identifying the carrier. A date field 604 may provide an indication of the date on which the consignee executed the form. A customer instruction section 606 provides instructions to the consignee further explaining the purpose of the form and how to fill it out. The "Shipping Information" section 608 provides various fields for the input of a consignor's name or address, a tracking number, a consignee's personal information (such as name, address and telephone number). However, a DAF may include more or less information than what is shown in FIG. 6, or may be provided to the consignee with some information already completed (rather than the fields being blank). The completion of the form may occur by the carrier or consignor prior to communication of the DAF to the consignee.

The "Package Location" section 610 may provide personalized delivery preference information, including pre-printed options as to where the package should be left. For instance, the "Package Location" section 610 may provide "check-off" boxes for indicating to delivery personnel whether to leave the package at the front door, back door, patio, or office, among other options. The "Package Location" section 610, as shown, also includes the option of requesting that the package be left with a neighbor, and provides space for a consignee to indicate the address or other description of the neighbor's location. In one embodiment, not shown, the DAF could include instructions to a consignee indicating that delivery personnel cannot deliver to an address other than the delivery address. This may be because delivery personnel follow a pre-planned route for deliveries, and receiving an alternate address request on a DAF may not be compatible with the pre-planned route.

A field may be provided for hand-written information, such as additional delivery instructions or preferences, and a signature line is provided for authorizing release of the package. In other embodiments, the consignee could complete the form by using an electronic editing tool on a computer prior to printing out the form. For example, in one embodiment, a consignee may be able to "sign" the form using a computer mouse to generally follow the shape of the consignee's signature. The process of providing an Electronic Signature is described further below.

A "Service Provider Instructions" section 612 may be included which provides various instructions to delivery personnel regarding how to handle the DAF. Finally, a "Legalities" section 614 may provide the carrier's disclaimers or other legal notices.

Other embodiments of the DAF may be of different size, shapes, and configurations than the DAF 600 shown in FIG. 6. It is not required to be sized to fit on a standard 8.5×11 inch sheet of paper, but may be smaller.

Communicating the DAF to the Consignee

Returning to FIG. 1, the consignee can receive the DAF as an electronic attachment in an email message sent from the CSS 104. Alternatively, the consignee may receive the DAF via a web interface 114, such as by proactively accessing the carrier's web site. In another embodiment, a separate computer (not shown) may host the carrier's web site and communicate with the computing system 122 to provide the DAF to the consignee. In other embodiments, the consignee can receive the DAF as an electronic attachment in an email message from the consignor 140, or by accessing the consignor's web site via the consignor's web interface 146.

The CSS 104 can communicate with the consignee's computer 100 and provide a DAF via email (e.g., as a *.pdf attachment) using the email interface 112. Alternatively, the CSS can provide a hyperlink in an email message for the consignee to access the carrier's web site, or the consignee can proactively access the web site in order to retrieve the DAF. For consignees that do not have, or choose not to use, a computer, the DAF may be provided in facsimile form via the telephone network 110 or other communication method.

The consignee typically communicates via the consignee's computer 100 with the consignor's web interface 146. A typical scenario begins with the consignee executing an online purchase of a product. The consignor receives the order information (such as the product identifier, customer identification and shipping information, and other information particular to the order). The consignor conveys the appropriate information to its shipping system 144, which in turn, conveys certain information to the carrier. The Internet is often used to convey the information to the carrier, typically via the API 150, but other interfaces can be used.

The carrier will then use the shipping information to establish a record for the package or shipment in the PLD database, which is assigned a tracking number. The carrier then provides the tracking number to the consignor. Thereafter, packages are provided by the consignor to the carrier bearing the tracking number, allowing the carrier to readily associate the package with the PLD information. This may be accomplished using well known scanning systems, based on bar codes, radio-frequency identification (RFID) tags or devices, etc.

The carrier may communicate an estimated delivery date to the consignor based on the class of service. This may be communicated to the consignor via the web interface 114, sending an email message via the email interface 112, or via the API 150.

The consignor may then further communicate certain information, such as the estimated delivery date and tracking number to the consignee. This typically occurs via an email message via the consignor's email interface 142. Alternatively, the carrier may communicate this information directly to the consignee in an email via the carrier's email interface 112. In other embodiments, the aforementioned emails may convey a hyperlink allowing the consignee to link to an appropriate web site to learn of the estimated delivery date.

Possible Service Flows and Operation Configurations

Figure 5A:
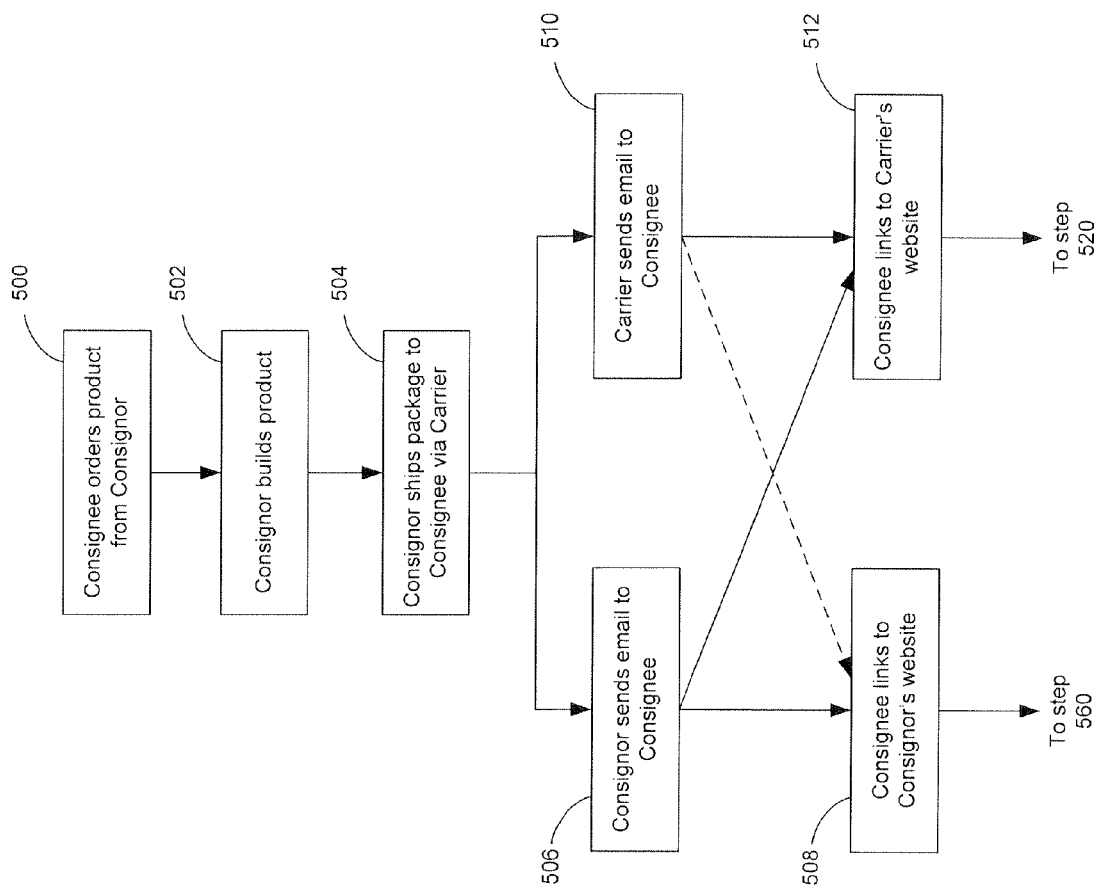
FIGS. 5a and 5b illustrate a method of providing various consignee services according to various embodiments of the present invention.
Figure 5B:
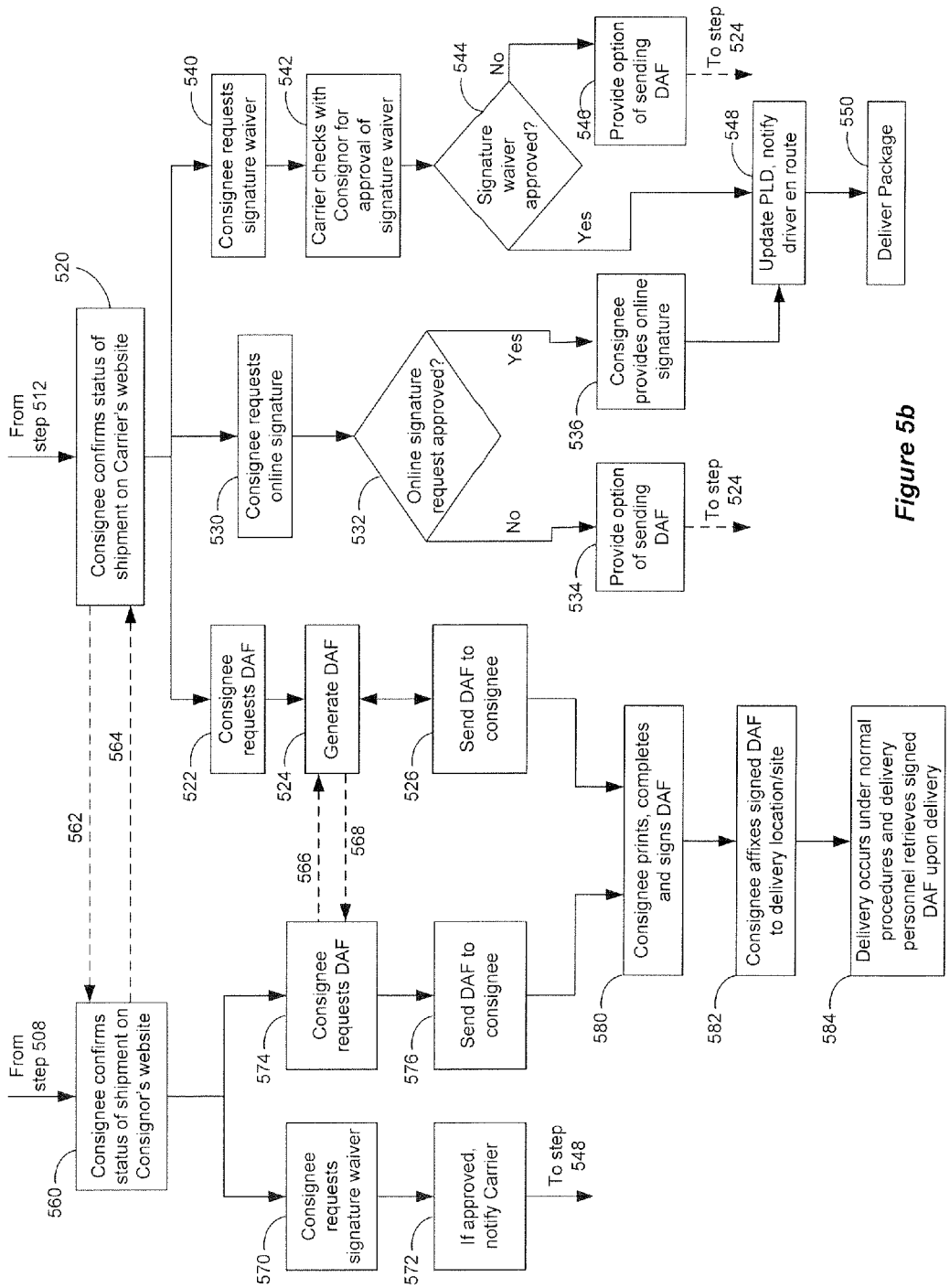

Numerous possibilities exist for communication between the consignor, the carrier and the consignee. FIGS. 5*a* and 5*b* disclose various embodiments, and are not intended to be an exhaustive delineation of every option.

The embodiments illustrated in FIGS. 5*a* and 5*b* are predicated on a consignee ordering an item using the Internet from a merchant (i.e., the consignor), who then ships the product to the customer. The process begins at step 500 with the consignee placing an order with the consignor. This step may occur in several different ways, for example by the consignee using the consignee's computer to interact via the Internet with the consignor's web site. The consignor typically assigns an identification number to the order and provides the relevant shipping information to the consignor's shipping system (see previous discussion associated with FIG. 1). At step 502, the consignor builds (e.g., selects and packs) the product. At step 504, the consignor provides the relevant shipping information (such as the consignee's name, address, and telephone number) to the carrier via a shipping system 144 in order to ship the product via the carrier. The consignor may provide the information via the carrier's API 150 and receive in response a tracking number from the carrier (not shown).

A package received by the carrier typically bears a label with the tracking number printed in a machine readable form. Such identifiers are well known in the art and used to track a package through the various stages of handling. Other forms of package identification, such as RFID tags could be used. Typically, a package is scanned (e.g., 'read') several times during its handling by the carrier. At step 504, the consignor provides the package to the carrier, and the carrier's package handling equipment scans the package for determining how to process the package. During this process, the PLD database 133 of the carrier may be accessed to read or write package level data.

The Advance Delivery Authorization service is predicated on the consignee knowing, in advance, of the impending delivery. The consignee may be notified of the impending delivery by the consignor at step 506 sending a shipment notification message to the consignee. Typically, when the consignee places an order, the consignee provides an email address so that the consignee can receive such notifications via email. Alternatively, the carrier at step 510 may send a shipment notification message to the consignee. The carrier may know the consignee's email address via a prior registration, as discussed elsewhere herein, or may obtain this information from the carrier or the package level data. Typically, the message is sent to the consignee by the carrier after the carrier has determined an estimated delivery date. In either aspect (i.e., at step 506 or step 510), the message to the consignee may include, among other information, the order number provided by the consignor, the tracking number provided by the carrier, and the estimated delivery date. In other embodiments, the email sent to the consignee may provide a hyperlink to the consignor's or carrier's web site.

At step 508, the consignee may link to the consignor's web site from either the email provided by the consignor or from the email provided by the carrier and proceed to step 560, as discussed in detail below. Alternatively, at step 512, the consignee may link from either email to the carrier's web site and proceed to step 520, as discussed in detail below. In an alternative aspect, the consignee may proactively access the web site of the consignor and proceed with step 560, or may proactively access the carrier's web site and proceed with step 520. As previously mentioned, various authentication information may be required by the carrier prior to accepting and processing any information affecting the delivery of the package to the consignee.

In one aspect (not shown), the email may also include a delivery authorization form for the consignee to fill out and sign, as discussed above. This form may be provided through an attachment to the email or directly in the body of the email in electronic image format, such as *.pdf, *.gif, or other web-transportable image format. The consignee may then print out the DAF using the consignee's printer. The consignee may then fill out any necessary information, such as the date, the tracking number, the consignee's name, address and phone number, the name of the consignor, and the desired delivery location, among other information. The consignee then signs the form. Alternatively, the consignee can fill out this information using the consignee's computer. The consignee then prints out the completed form and signs it. The consignee can then affix the signed DAF to a delivery location or site, such as the consignee's front door. The delivery would occur under ordinary procedures, and the delivery personnel would retrieve the signed DAF upon delivery of the package and deliver the package according to the indications made by the consignee on the DAF.

In another aspect of this invention, the consignor may have registered with the consignee services system 104, as described above, and chosen to receive notification of inbound packages and indicated delivery preferences. When the consignor provides the relevant shipping information to the carrier at step 504, this information may be updated to the carrier's PLD database. The PLD database 133 may then communicate with the Consignee Profile Database 134 to determine if the consignee has registered with the CSS 104. Assuming the consignee has chosen to receive notification messages for shipments bound to the consignee's name or address, the CSS 104 triggers a notification message to be sent to the consignee. This automated notification typically includes a tracking number, service, reference number, or scheduled delivery date. The notification message may also include a delivery authorization form provided as an attachment to an email in an electronic image format, such as *.pdf, *.gif, or other web-transportable image, or provided via a hyperlink to the carrier's web site. The DAF may already indicate certain shipment-specific information, such as the name of the consignor, the consignee's name, address and telephone number, the tracking number, and an associated DAF serial number. The consignee prints the DAF directly from the email and signs it, without having to fill out manually any information other than the date, and places the DAF at the anticipated delivery location for the delivery person to retrieve.

Advanced Signature Authorization via Carrier's Web Site

At step 512, the consignee accesses the carrier's web site, either through a hyperlink provided in an email from the consignor or the carrier, or proactively. The carrier's web site may present to the consignee a summary of the shipment, including its status, estimated delivery date, tracking number, consignor, etc. At step 520 the consignee confirms the status of the shipment. At step 522, the consignee may determine that he will be unable to receive the delivery on the estimated delivery date and therefore requests a DAF from the carrier. At step 522 the carrier's CSS 104 will generate a DAF. The step of generating the DAF may include completing various fields of the DAF. For instance, because the CSS 104 is in communication with the PLD database 133, it can retrieve the package level data (e.g., the consignor's information, the package tracking number, the consignor's name and address), and can populate the fields (described above with reference to FIG. 6) of the DAF with this information. Alternatively, the carrier can simply generate a blank DAF. In either case, the carrier transmits the DAF to the consignee (typically via the Internet, although other means can be used) at step 526.

A completed or semi-completed DAF may include the tracking number associated with the shipment, and a serial number associated with the DAF. If the consignee has registered certain delivery preferences with the CSS 104, the DAF may also reflect these preferences, including specialized delivery instructions such as where the delivery personnel should leave a package when the consignee is not home. The personalized delivery preferences determined by the carrier may be based on the preferences retained in the consignee profile database 134. Alternatively, the consignee can fill out the DAF to instruct or indicate to the delivery personnel to leave packages at the front door, back door, side door, patio, deck, porch, garage, carport, neighbor's home, or other special delivery instructions.

Thus, the DAF generated at step 524 may be personalized to the particular consignee and particular shipment. The CSS will then send the DAF to the consignee at step 526, typically via email. Alternatively, the web site may provide the consignee with an electronic image of a delivery authorization form, such as *.pdf, *.gif, or other web transportable image. The consignee may then retrieve the electronic image of the DAF. Upon receiving the DAF, the consignee may proceed with step 580 in printing out the DAF using the consignee's printer. If the CSS 104 generated much of or all of the necessary information for the DAF at step 524, the consignee needs only to print out the DAF, fill in any missing information, such as the date, and sign the DAF. Alternatively, if less than all necessary information was generated and included in the DAF at step 524, the consignee may then fill out any missing and/or necessary information, such as the tracking number, the consignee's name, address and phone number, and the name of the consignor, among other information. The consignee may then sign the form. Alternatively, the consignee may fill out this information using the consignee's computer 100 prior to printing. The consignee may then print out the completed form and sign it.

The consignee can then affix the signed DAF to a specific location or site at the delivery address, such as the consignee's front door (step 582). At step 584, the delivery would occur under normal procedures, and the delivery personnel would retrieve the signed DAF upon delivery of the package, and would know to deliver the package according to the instructions indicated on the DAF. Different procedures for delivery personnel to take upon and after delivery of the package are discussed in more detail below.

Returning to step 520, the consignee may alternatively request providing an online signature (step 530) to authorize delivery of the package. If the consignee requests to provide an online signature, the carrier website may require that the consignee agree to certain legal limitations or liabilities associated with providing an online signature. For example, the carrier website may provide "Terms and Conditions" which the consignee may have to agree with by clicking on a box indicating "I agree" with the Terms and Conditions. Both the carrier and consignor may require this legal authorization from the consignee. In one embodiment (not shown), the carrier (or consignor) may require that the consignee have a signature on file with the carrier in order to provide an online signature. For example, the consignee may have to provide a paper (i.e., hand-written) signature to the carrier prior to requesting the online signature option. The carrier may also provide the consignee with language regarding the legalities or liabilities of providing a paper signature to authorize future online signatures.

At step 532, the carrier's CSS 104 would then confirm whether or not an online signature would be accepted to authorize delivery of this package. This can include the CSS 104 communicating with the consignor system 152 to determine if an online signature is acceptable. Alternatively, this information may be part of the package level data, and the CSS 104 can communicate with the PLD database 133 to determine if the online signature is acceptable. If not accepted, at step 534 the system notifies the consignee of the denial of the online signature request and provides the consignee with the option of using a DAF to authorize delivery of the shipment. The system may provide this option in many different ways, such as automatically sending an email to the consignee including a DAF, or automatically providing the consignee with a message on the carrier's web site stating that the online signature request has been denied and providing an online, printable DAF. If the online signature is authorized, at step 536 the consignee would provide his online signature. This may be done by providing an electronic or digital signature or other method known in the art.

If the online signature is accepted at step 534, it can be provided in various ways, as described further below. For example, the "online signature" may be provided simply by the consignee clicking on a box agreeing to certain legal "Terms and Conditions". In other embodiments, the consignee may be directed to a web page having a graphic box to indicate his signature using a mouse or other pointing device, as described below. Once the signature has been accepted by the carrier, the carrier system updates the shipment information in the PLD database (step 548) to indicate that an authorization signature has been provided for package release. If the package had not yet left the shipping facility, this information would become part of the package level data and would authorize the delivery personnel to deliver the package without requiring a signature at the time of delivery.

Alternatively, if the package were already en route to the consignee, the updated PLD information may be communicated to a portable computing device associated with delivery personnel delivering the package, such as the DIAD (Delivery Information Acquisition Device) carried by delivery personnel of UPS. The DIAD is typically uploaded with information for the carrier's package processing systems for each package scheduled to be delivered. Aspects of the DIAD are disclosed in U.S. patent application Ser. No. 10/227,147, filed Aug. 23, 2002, the contents of which are incorporated herein by reference in their entirety. The CSS 104 may communicate any generic delivery information or package specific information to a package processing system, which in turn forwards the information to the DIAD when there is an update in the delivery information for the consignee or the shipment. Information conveyed to the DIAD can be of various forms, including notes, alerts, or procedural details associated with the indicated consignee (discussed further below). The delivery personnel will then have information that an online signature has been provided at or before the time of delivery, and will deliver the package (step 550) without requiring a signature from the consignee upon delivery.

In another embodiment, upon accessing the status of the shipment via the carrier's website (step 520), the consignee may request signature waiver (step 540) to effect a Package Release. The Package Release allows a consignee to indicate that a package (or plurality of packages) may be released without the consignee's signature. The carrier may then communicate with the consignor to determine if it is allowable for the signature to be waived (step 542). Alternatively, whether or not a signature is required may be part of the package level data stored in the PLD database 133. As another example, the carrier may have previously received information from the consignor indicating that a signature is required and may not be waived. If, at step 544 the signature waiver is approved, the CSS would update the PLD database with this information and continue in accordance with step 548, described above. If the signature may not be waived, the package may be delivered according to ordinary delivery procedures, and a signature would be required from the consignee at the time of shipping (not shown). Alternatively, at step 546, the carrier may communicate an updated notification message to the consignee indicating that signature waiver has not been accepted. The message may include an attachment of a delivery authorization form in electronic image format, such as *.pdf, *.gif, or other web-transportable image, or may include a hyperlink to the carrier's website which would provide online access to a DAF. The consignee may then proceed according to step 580.

Advanced Signature Authorization via Consignor's Web Site

Returning to step 508, the consignee can access the consignor's web site through a hyperlink provided in an email from the consignor (or the carrier) or proactively, and can then proceed to step 560 where the consignee may confirm the status of the shipment. The consignor's website may provide a hyperlink to the carrier's website via path 562, after which the consignee would proceed with step 520 as discussed above. Alternatively, the consignor and carrier's web sites may be linked through the APIs between the carrier and consignor's computers, and the consignor may request the shipment status information from the carrier by path 562 and the carrier may return the shipment status information to the consignor via path 564 to be displayed on the consignor's web site.

The consignee may then request signature waiver at step 570. If the consignor authorizes waiver of the signature requirement, the consignor communicates this information to the carrier (step 572). This may be communicated via email, through the Internet via the web interface of both the consignor or and the carrier, via the APIs, or through any other means known in the art. The carrier would then proceed as in step 548 in updating the PLD database 133 with the information that the signature requirement has been waived. Delivery personnel would then deliver the package without requiring a signature from the consignee at the time of delivery (step 550).

Returning to step 560, according to another embodiment of the present invention, upon confirming shipment status through the consignor's web site, the consignee may request a delivery authorization form at step 574. The consignor's web site may then provide a means for the consignee (path 566) to access directly the carrier's web site to obtain the DAF and proceed as in step 524. The consignor may provide this link to the consignee via an email, through a hyperlink on the consignor's web site, or through any other means known in the art. Alternatively, the consignor's system communicates with the carrier's web site via path 566 (such as by accessing the carrier's system via the API) and requests the DAF from the carrier. The carrier would then generate the DAF (including any related information, such as the consignee's name, address and telephone, and the tracking number of the shipment, among other information). The DAF may also include a serial number associated with the DAF, as will be discussed in more detail below.

The carrier would then communicate the DAF to the consignor via path 568 (such as, for example, via the consignor's API 147). The consignor then provides or transmits the DAF to the consignee in step 576. The consignor may provide the form to the consignee as an attachment to an email in electronic image format, such as *.pdf, *.gif, or other web-transportable image format, or may provide a hyperlink to allow the consignee to access an online version of the form. The consignee would then proceed to step 580 as discussed above.

When the consignor provides the consignee with a DAF at step 576 (or possibly when the carrier provides the DAF at several points in the system), the DAF may or may not include an associated serial number. Several possibilities for the inclusion or exclusion of a serial number on the consignor-provided DAF are described below. The procedures used by the delivery personnel depend on the presence of a serial number on the DAF. The DAF may be completely filled out, signed, dated, and have an associated serial number, in which case delivery would proceed under normal delivery procedures.

As discussed earlier in conjunction with FIG. 4, under normal delivery procedures, updated consignee preference information may be communicated to delivery personnel delivering the package via a portable computing device 400 such as the DIAD. When the CSS associates a serial number with the DAF at step 524, the CSS may update this information to the DIAD Updating System 402 (of FIG. 4) and indicate that the consignee will be using a DAF and provide the serial number of the DAF. The DIAD Updating System 402 will then communicate this information to the DIAD 400 (of FIG. 4) of the delivery personnel delivering the package. Upon delivering the package and retrieving the DAF, the delivery personnel may scan the DAF and the DIAD confirms that the serial number of the DAF is the serial number that was associated with the shipment by the DIAD Updating System 402. If the DIAD Updating System 402 has not updated or otherwise communicated the serial number to the DIAD 400, the delivery personnel may scan the DAF as an initial association of the serial number with the shipment.

Electronic Signature via Carrier's Web Site

FIG. 28 illustrates an embodiment of a consignee providing an Electronic Signature at the carrier's website. As can be seen, at Step 1, the customer (e.g., the consignee) can log into the consignor's website, such as to check the status of the consignee's order. At the consignor's website, the consignee can click on a hyperlink to link to the carrier's website. At step 2, the carrier website pre-populates shipment information, which has previously been stored in the PLD database. As described throughout, the shipment information can be the tracking number of the package or shipment, the address of the consignee, a unique identifier for the consignee, etc. At step 3, the consignee logs into the carrier website and is presented with a DAF, which includes the data that was pre-populated at step 2. At the carrier's website, the consignee is presented with a graphic box in which the consignee can provide a digital signature. For example, the consignee can use a computer mouse or other pointing device (e.g., trackball, trackpoint, etc.), to sign in the box. In other embodiments, an electronic signature could be provided by selecting or clicking on a box indicating that a signature thereby provided, or by typing the consignee's name into a text box and indicating that the typed name represents the consignee's signature. The carrier's website may also include an authentication feature (not shown) to verify that the person providing the signature is the consignee (or an authorized representative of the consignee). For example, the carrier's website may require that the consignee provide his social security number, driver's license number, a credit card number, or any other identifier which would be unique to the consignee. The carrier could then authenticate the consignee by verifying the information with a third party or third party database.

The consignee may also complete any information on the DAF that was not pre-populated by the carrier. The CSS 104 captures this electronic signature and stores it (along with any additional information completed by the consignee). The electronic signature may be stored as "inactive" at this time, as it has not yet been associated with or used to release the delivery of the package. In one embodiment, this information may be stored in the PLD database. In other embodiments, some or all of this information could be stored in the consignee profile database. Once the carrier website captures the electronic signature and other information, the completed DAF is presented to the consignee. At step 4, the consignee can print the signed DAF and post it at a location at the delivery address (such as at the front door).

Upon delivering the package to the consignee, the delivery personnel retrieves the DAF, and can scan it using a portable computing device, such as the DIAD. In the embodiment illustrated in FIG. 28, the DAF includes machine readable indicia that can indicate the tracking number and/or the unique serial number for the DAF. As described throughout, this step serves to associate the package with the DAF. The driver then releases the package.

At step 6, the delivery information is uploaded to the DIAD Capture System (DCS, described further below). At step 7, the CSS 104 solicits package status information from the DCS for all packages shipped from the consignor, based on tracking numbers. The solicited data is retrieved from the DCS and the results are returned for all delivered packages at step 8. This information can then be stored in the PLD database. At step 9, the electronic signature provided at step 3 will be retained or overridden, depending on certain parameters. If the delivery personnel released the package based on retrieving the DAF including the electronic signature, then the electronic signature will be retained and stored, and will remain associated with the DAF. However, the consignee, when completing the DAF, may have indicated that delivery was to occur at a neighbor's address. If the delivery personnel releases the package to the indicated neighbor, the delivery personnel may obtain a signature from the neighbor on an additional DAF. This signed DAF, and its signature, would override the electronic signature provided by the consignee. Similarly, the consignee may have thought initially that he would not be home to accept delivery, and thus may have completed and signed a DAF at step 3. For various reasons, however, the consignee may actually be present at the time of delivery and can provide a "live" signature. Upon receiving the "live" signature on the DIAD, this signature will override the electronic signature provided at step 3. The consignee's electronic signature can then be removed from the database in which it was stored.

At step 10, the consignor can log into a secure carrier website and be provided with a visual representation of the signed DAF. The consignor can then print the electronic DAF with the electronic signature and keep this DAF for the consignor's record. Similarly, the carrier (e.g., via a customer service center or representative), can access the carrier web site and retrieve the DAF and associated information and signature. This may be useful for updating data associated with the consignee or shipment in the consignee profile database and PLD database.

Possible Schemes for Associating a Serial Number to a DAF

The possibilities described below are representative only, and do not preclude other possibilities or combinations thereof, as may come to mind to one skilled in the art.

Possibility 1: Serial Number Not Included on the DAF or Not Provided to Consignee In the situation where the DAF does not have a serial number associated with it, several options for delivery procedures exist for the delivery personnel to follow. For instance, delivery personnel may select a serial number to associate with a DAF at the time of delivery. The delivery personal may select the number by copying the number from an existing paper-based delivery notice or selecting a value stored in the DIAD. The delivery personnel would manually write the number on the DAF. Alternatively, the delivery personnel may have a roll or sheet of stickers with a sequential serial number printed on each sticker, where each delivery personnel has a different range of serial number stickers such that the delivery personnel may peel a sticker from the sheet or roll and affix it to the DAF. The delivery personnel may then enter this serial number into the DIAD to associate the value with the DAF. In addition, the sticker may provide the serial number in a bar code or other machine readable form, such that the delivery personnel may scan the sticker and scan the package to associate the serial number with the tracking number. As another alternative, when the delivery personnel returns to the carrier's facility, the serial number that was manually entered onto the DAF or the serial number of the sticker that was affixed to the DAF may be communicated to the CSS and/or other carrier systems.

A second option for delivery personnel to associate a serial number with a DAF that does not already have an associated serial number is for the carrier to provide its delivery personnel with a stack of blank DAFs so that when a delivery personnel encounters a DAF that does not have an associated serial number, he may take a DAF (similar to the existing UPS InfoNotice® forms) from his stack of blank DAFs and associate that serial number to the signed DAF. As an example (as illustrated in the "Service Provider Instructions" in FIG. 6), the delivery personnel encounters a DAF without a serial number. The delivery personnel may then retrieve a blank DAF (e.g., UPS InfoNotice®) from the provided stack and scan that DAF using a scanning device. The delivery personnel may then place the scanned, serial number-associated DAF at the delivery location to indicate that the package was delivered and that the signed DAF was retrieved, and the delivery personnel may then manually write down the serial number of the scanned DAF in a space provided on the signed DAF. The delivery personnel may then return to the carrier facility and provide the signed DAF with the manually entered serial number to the records facility for updating in the CSS. As an additional measure, the delivery personnel may scan the serial number of the blank DAF and scan the package, so that the serial number and tracking number of the shipment are associated in the system, and when the delivery personnel returns to the carrier facility with the signed form and the manually entered serial number, the records center need only verify the association of the serial number and the tracking number.

Another option for associating a serial number to a DAF that has been signed but does not have an associated serial number is for the delivery personnel to communicate with the CSS at the time of delivery (such as via the DIAD). The delivery personnel may input the tracking number of the package or shipment into the system, the CSS would process this information, such as by accessing the PLD database in order to retrieve the package information and generating an associated serial number, and then would return a serial number to the delivery personnel (such as via the DIAD) for the delivery personnel to associate with the DAF. The delivery personnel may then manually write down the serial number in a space provided on the DAF. In this aspect, the CSS may have already associated the tracking number and the provided serial number, such that when the delivery personnel returns to the carrier facility with the signed form and the manually entered serial number, the records center need only verify the association of the serial number and tracking number.

Possibility 2: Carrier Provides Consignor with Predetermined Range of Serial Numbers A second possibility is that the carrier may have assigned a range of serial numbers to the consignor to allocate as required. The carrier would have to allocate each consignor unique values to avoid duplication. This allows the consignor to directly provide the consignee with a DAF with a serial number from the predetermined range. This avoids the consignor at step 360 having to communicate with the CSS at path 370 to request a DAF with an associate serial number. Thus, if for some reason the consignor's system was unable to communicate with the carrier's system at paths 370 and 372, the consignor could still provide a serial number-associated DAF to the consignee upon the consignee so requesting at step 360. Alternatively, if the consignor requests a DAF from the carrier at path 370 and the generated DAF that that the carrier sends back to the consignor does not include a serial number, the consignor may associate a serial number from the predetermined range to be associated with this DAF. The consignor may somehow manipulate the DAF to include the serial number (such as by editing the electronic image to include the serial number), or may provide it to the consignee and instruct the consignee to fill in the serial number manually on the DAF.

Alternatively, if the consignor requested a DAF from the carrier at path 370 and the carrier generated DAF related information including a serial number, or if the carrier sent the DAF with minimal information including at least a serial number, the consignor could provide this serial number-associated DAF to the consignee at step 362 and not have to assign a serial number from the predetermined range of numbers provided by the carrier.

Delivery under Possibility 2 would occur under normal procedures. The delivery personnel may retrieve the signed DAF and scan in the serial number, such that the serial number is associated with the tracking number in the CSS. Alternatively, the delivery personnel will return to the carrier's facility and may provide the DAF to the records center so that the serial number may be officially associated with the shipment in the carrier's system.

Possibility 3: Carrier Assigns Individual Serial Numbers to Each DAF Requested by the Consignor A third possibility would allow the consignor and carrier systems to be in communication (such as via the API of each system or the web interface of each system), such that every time a consignee requests a DAF from the consignor at step 360, the consignor would communicate with the carrier via path 370 and the carrier would generate a serial number at step 304. The carrier would communicate this information back to the consignor via path 372.

If a serial number was provided and included on the DAF, delivery under Possibility 3 would occur under normal procedures. The delivery personnel may retrieve the signed DAF and scan in the serial number, such that the serial number is associated with the tracking number in the CSS. If a serial number was not provided from the carrier to the consignor, delivery personnel may follow the delivery procedures outlined in Possibility 1.

Example Application of Advance Delivery Authorization

A description of the systems and methods for providing a consignee with Advance Delivery Authorization is now provided using one embodiment of the present invention. This description represents one possible method of a consignee using the service, and does not represent all possible variations of the service or possible events that can occur.

A consignee orders a product from a consignor by accessing the consignor's web site. Upon ordering the product, the consignee provides relevant information, such as the consignee's name, address, email address, phone number, and other identifying information, comprising the order and/or shipping information. The consignor associates an order number with this order. The consignor provides the appropriate shipping information to the carrier and is provided with a tracking number. The package is provided to the carrier bearing the tracking number.

The carrier then processes the package, and through existing procedures notifies the consignee of the anticipated delivery date of the package. The notification may include a hyperlink or other link to the web site of the carrier as well as the tracking number. The consignee may then click on this link or otherwise use the link to connect to the web site of the carrier. Alternatively, if the consignee has previously received a tracking number or other shipment identifying number, the consignee may proactively access the web site of the carrier and indicate the tracking number.

Upon accessing the carrier's website, the consignee confirms the status of the shipment. The carrier's web site provides information such as the tracking number, the number of packages in the shipment, and information as to where the shipment is in the delivery process (such as at a hub awaiting delivery, en route, etc.). The shipment status typically provides an estimated time and/or date of delivery. Assuming the consignee determines he is unavailable at the expected delivery time, the consignee requests a DAF from the carrier's web site.

The CSS generates a DAF, which includes the tracking number, the consignor's name and address, the consignee's name, address and telephone number, and a serial number. The DAF may also include special delivery instructions that the consignee may have previously provided to the carrier, such as the preferred delivery location or site. Upon generating the DAF, the CSS would provide the DAF to the consignee via the carrier's web site, so that the consignee may print the DAF directly from the web site. Alternatively, the CSS may provide a hyperlink to the carrier's web site where the DAF would be available for the consignee to print. Another alternative would be for the CSS to generate an email to the consignee that would include the DAF as an attachment or in the body of the email.

The CSS may then update the DIAD Updating System 402 and indicate that a DAF and associated serial number was generated for the consignee. The DIAD Updating System 402 will then communicate this information to the DIAD of the delivery personnel at the appropriate time of the day of the package's delivery (discussed further below).

After the consignee prints the DAF provided from the carrier, the consignee may fill in any information that may not have been filled in by the carrier (such as if the consignee has an alternate phone number that had not been previously associated with the shipment, or an alternate delivery location that differs from the location as provided in the consignee's special delivery preferences). The consignee signs and dates the form. The consignee attaches the DAF to the anticipated delivery site (such as the consignee's front or back door).

The delivery personnel retrieves the signed DAF at the time of delivery and then delivers the package. The delivery personnel may scan the DAF to read the serial number and confirm it is the serial number indicated in the DIAD for this particular delivery.

Carrier Provided Personalized Delivery Information (CP-PDI)

Heretofore described, the information provided to the DIAD (or other portable computing device) has been personalized delivery information that originated from the consignor, or the consignee. There is another category of information that may be provided to the DIAD in conjunction with a package delivery that originates from the carrier itself. This information is known as carrier provided personalized delivery information, or CPPDI.

Typically, carrier delivery personnel are responsible for delivering packages along a regular route. In many instances, the delivery personnel become familiar with the route and develop a personal knowledge of the route, the consignees along the route and their delivery preferences, and other information pertaining to package delivery along the route. For example, the delivery personnel may know that a particular elderly consignee has a health condition (e.g., a bad back), and that packages should be left on a table at the front door. The elderly consignee may not have communicated this information to the carrier via the aforementioned systems or methods, but may have informed the delivery personnel in person at some point in time (such as at the time of a prior delivery). The delivery personnel may also know that certain consignee homes may be frequented by a dog or other animal. This type of information is often "stored" mentally by the delivery personnel, but in the case of the regular delivery personnel being replaced or substituted with a temporary driver, this information is unknown to the temporary driver.

Thus, the same infrastructure and systems, described above, that store and process delivery preferences and instructions of consignees and consignors, can also be the basis for storing and providing other information. This other information may be information observed by the carrier (e.g., the delivery personnel) at certain delivery addresses, specific route information (such as road conditions or detours), etc. Thus, if a regular delivery personnel is sick, a temporary or substitute driver can be provided with this carrier-provided information. This information can be provided by the carrier to the DIAD of the delivery personnel (regular and temporary) of various delivery routes to aid the delivery personnel with completing the delivery.

Types of Customized Pickup and Delivery (CPaD) Data

The personalized delivery preferences and instructions provided by the consignee and consignor, as well as the CPPDI described above, can be collectively referred to as Customized Pickup and Delivery (CPaD) data. Generally, CPaD data can be categorized into at least three types: Procedures, Alerts, and Notes. The distinction between the categories typically involves what information is conveyed and how and when it is processed by the carrier systems and the DIAD. In other embodiments, more or fewer categories can be defined. The following distinctions are not intended to limit the categories of information, but rather provide general guidelines as to what information falls into which category. Additionally, CPaD data may not necessarily be communicated to the DIAD as part of these categories, but may be sent to the DIAD in a different way or at a different time than described throughout.

Alerts are one type of CPaD data that comprise information that must be addressed by the delivery personnel. Generally, alerts must be addressed before the delivery to a consignee is completed, or before the delivery personnel proceeds to the next stop on the delivery route. One example of an Alert may be an indication that a delivery is COD (Cash-on-Delivery) and notifying the delivery personnel that only certified check or money order can be accepted from the consignee. In one embodiment, the DIAD displays an icon to the delivery personnel indicating that an Alert is involved with the delivery. Because the delivery personnel must address an Alert, certain screen functions of the DIAD may be interrupted or blocked until the delivery person addresses the Alert (i.e., reads, review, and/or acknowledges or responds to it).

Notes are another type of CPaD data. Notes involve information that is of a general informational nature. Typically, notes comprise information that can be bypassed, in that the delivery personnel are not required to acknowledge or respond to the information before proceeding with the delivery or other deliveries. An example of a Note may be a message indicating that a large dog is present at the consignee delivery address, and that the delivery personnel should beware of the dog. This type of message is informational only, and can be read and bypassed by the delivery personnel without any specific action being taken on the delivery personnel's part.

Procedures are another type of CPaD data that provide information to delivery personnel indicating a certain procedure or protocol that needs to be followed for delivery of the package. In many instances, Procedures accompany Alerts and/or Notes. For example, if an Alert is sent to the DIAD indicating that a package is COD, once the delivery personnel acknowledges the alert, he may be presented with certain Procedures to follow for the COD delivery. For instance, a Procedure message can remind the delivery personnel to obtain proof of identification before accepting a check or money order for a COD delivery. Similarly, if a Note is sent to the DIAD indicating that a large dog is usually present on the premises, and Procedure might follow indicating that packages can be left on the front porch to avoid encountering the dog.

It can be appreciated that Alerts, Notes, and Procedures can indicate various messages or information to delivery personnel, and can be sent to the DIAD in conjunction with each other in order to convey this information. Alerts, Notes, and Procedures can be presented on the DIAD in the form of text and/or graphics (e.g., including icons). The information can be in the form of 'canned' text or free-form text. Thus, certain common types of information (i.e., those Alerts, Notes, and Procedures that arise many times and generally not with reference to any specific consignee or delivery) can be provided as 'canned' text to the delivery personnel. For example, an Alert indicating that the delivery personnel must scan machine readable indicia on a DAF before proceeding with the next delivery may be 'canned' text. On the other hand, information that is more specific to a certain delivery or consignee, and is not commonly encountered, can be provided as determined by the originator of the message (e.g., in free-form text). Thus, the CSS 104 may have to generate a free-form Note to indicate that a large dog is present at the consignee's delivery address. Additionally, audible alarms (e.g., sounds, beeps, etc.) can be used in addition to text or icons, allowing the DIAD to provide an additional indication to the delivery personnel of the presence of CPaD data.

Triggering Alerts, Notes and Procedures to the DIAD

The distinction between Alerts, Notes and Procedures lies not only in the different type of information that each of these messages provide, but also in the ways in which the information can be triggered to be sent to the portable computing device (e.g., DIAD) carried by the delivery personnel. Alerts, Notes and Procedures can be triggered based on whether the delivery personnel is performing a delivery, a pickup, or a combination delivery and pickup. Alternatively, Alerts, Notes and Procedures can be triggered only during certain days of the week, for certain delivery addresses, only if the delivery personnel is a temporary driver (as opposed to the 'regular' driver), etc. Thus, there can be any number of criteria to trigger Alerts, Notes and Procedures to be sent to the DIAD.

As an example, a regular driver may notice that a large dog is always present at a particular address. The driver may contact the carrier (e.g., via the DIAD, or via a customer service representative, etc.), and inform the carrier that CPPDI should be entered into the carrier systems to indicate the presence of the dog at the address. In CSS 104 can then trigger this information to be presented in various ways. In one instance, the CSS 104 can trigger this information only if a temporary or new driver is delivering or picking up a package at this address. This message would likely be triggered in the form of a Note so that no response would be required by the driver, and would be triggered regardless of the day of the week.

As another example, a pickup location may be closed for two weeks due to a fire at the location. This information may be provided to the delivery personnel in the form of an Alert, and require that the delivery personnel acknowledge the message. Because this situation may affect the delivery personnel's delivery and pickup route for the day, this message may be triggered to be sent to the DIAD at the beginning of the delivery personnel's shift, and may be sent each day that the pickup location is closed. This information likely would be sent regardless of whether the delivery personnel is the regular driver or a temporary driver.

As another example, the DIAD typically provides the delivery personnel with a list of items to be delivered and picked up along the deliver route that day. This list can be presented to the delivery personnel at the beginning of the shift as general information. In this instance, the delivery personnel can view the list of pickup and delivery stops that need to be made, and can view any Alerts, Notes and Procedures associated with each stop, or with the day's route, at the beginning of the shift. These same Alerts, Notes and Procedures, however, can be triggered to be presented when the delivery personnel arrives at each pickup and delivery location as well.

Thus, there are numerous combinations of the ways and times at which CPaD data can be triggered to be sent to the DIAD.

Systems for Storing and Triggering CPaD Data to the DIAD

The above examples presume that CPaD data has been properly loaded into the DIAD for the current day's deliveries and pickups. This requires that the CPaD data be maintained in various information systems of the carrier so that the information can be downloaded properly to the DIAD at the necessary times.

Figure 7:
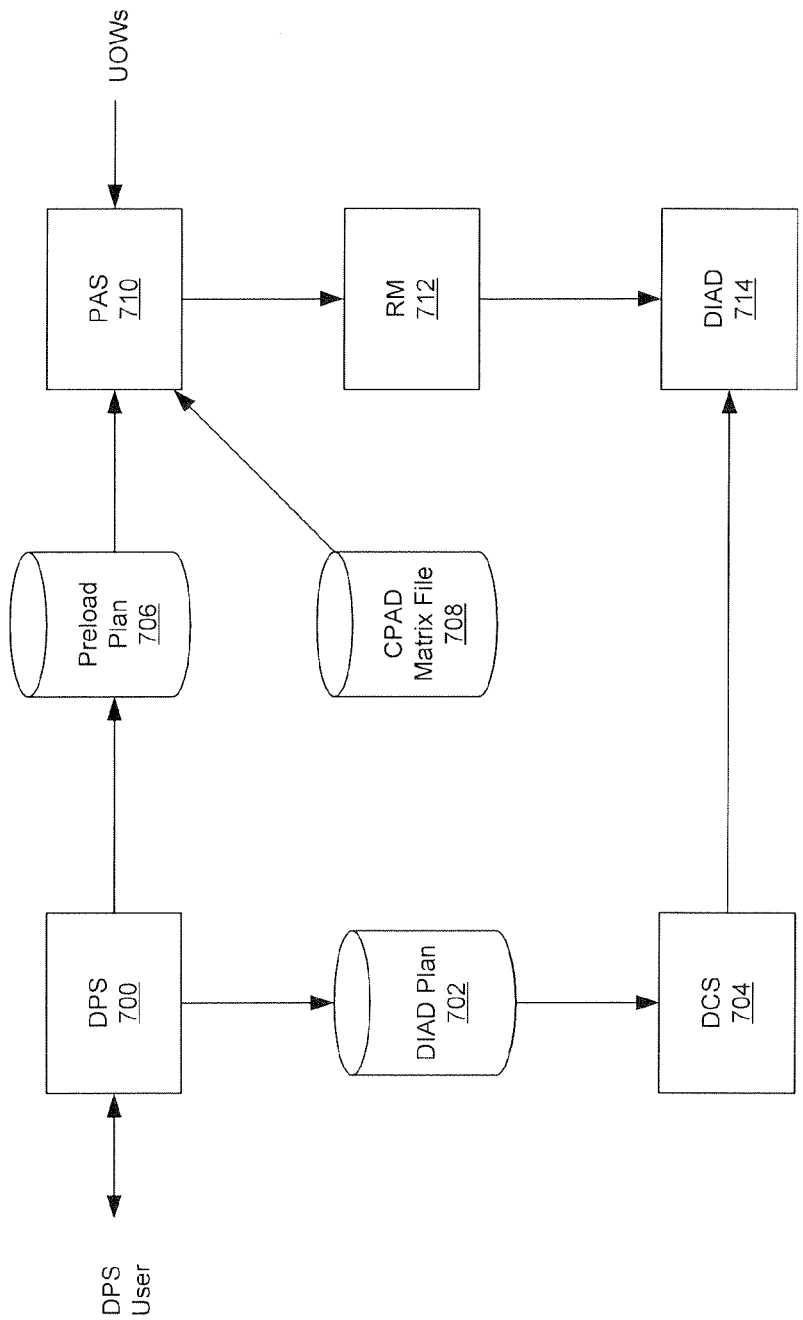
FIG. 7 is a diagram illustrating one embodiment of the architecture of a carrier's information processing system for providing personalized delivery services.

FIG. 7 illustrates an exemplary carrier system including several information systems which are involved in providing CPaD data to the DIAD, as described above. The Dispatch Planning System (DPS) 700 is the system that defines the routes taken by various package delivery vehicles in any given territory in which the carrier operates. This system typically has an interface to allow a user (e.g., a "DPS User") to enter Alerts, Notes, and Procedures for various addresses, consignees, pickup accounts, and pickup events. The DPS allows the DPS User to not only create, but also edit, review, and delete CPaD data. This information is compiled by the DPS into a DIAD Plan 702, which contains Alerts, Notes and Procedures associated with various addresses, consignees, pickup accounts, and/or pickup and delivery events as specified by the DPS User in the DPS. In one embodiment, the DPS sends the DIAD Plan 712 to the DIAD Control System (DCS) 704 for transfer to the DIAD 714.

Because the DPS 700 schedules the routes and dispatch plan for a given vehicle, the DPS 700 has information for every pickup and delivery scheduled for any vehicle in a particular service territory. Thus, any CPaD data associated with a pickup or delivery can be communicated to the DIAD associated with the pickup or delivery without involvement of the Preload Assist System (PAS) 710. However, as will be described further below, CPaD data can be associated with a pickup or delivery address, and the CPaD data may be sent to the DIAD via a different route. In this instance, the Preload Assist System (PAS) 710 receives packages (Units of Work, or "UOWs") and allocates them to a particular delivery vehicle based on the preload plan 706 defined by the DPS 700. Typically, there are numerous delivery vehicles in a territory, and each package coming into the carrier handling facilities must be routed to the appropriate delivery vehicle for loading in a certain order. The preload plan 706 defines how the packages should be directed, and the PAS 710 uses the preload plan 706 to physically divert the packages to the appropriate delivery vehicle for loading in the specified order.

The PAS 710 retrieves CPaD data from the CPaD Matrix File 708. Although not shown, the DPS 700 and DCS 704 can also retrieve data from the CPaD Matrix File 708. The CPaD Matrix File 708 may comprise CPaD data associated with a consignee's address, a particular package, or other data. The file can be generated in a variety of ways, including data entry by a customer service agent. The agent may receive CPaD data generated by a consignor using a consignor shipping system interfacing with the carrier's systems. In other embodiments, the CPaD data may be received from consignees interacting with a carrier web site (e.g., in response to receiving notification of a delivery, as described above). In various other embodiments, the CPaD data may be CPPDI, provided by delivery personnel or the carrier, as described above. The CPaD Matrix File 708 can also comprise territory related information, procedure related data, general shipper related data, and specific shipper number data.

For each package loaded onto the delivery vehicle, the PAS 710 checks if there is any associated CPaD data in the CPaD Matrix File 708 and transfers that information along with the Alerts, Notes, and Procedures to the DIAD. The PAS 710 provides the CPaD data regarding the packages loaded onto the delivery vehicle to the appropriate DIAD 714 using a Route Manager (RM) 712 as a conduit. As described above, the DIAD 714 also receives information regarding the packages from the DCS 704 that provides information about the route and the deliveries. Typically, the CPaD data is provided to the DIAD 714 using a wireline connection prior to the start of the day's deliveries, during which time package related information is downloaded into the DIAD. In some embodiments, CPaD information can be sent wirelessly to the DIAD after the delivery vehicle has departed for the day's deliveries. The wireless transmission of data can use any of the well known wireless data transfer mechanisms.

The CPaD Matrix File & Methods for Linking CPaD Data with Other Data

The CPaD Matrix File, described above, can contain various CPaD data as well as other relevant data, such as shipping data. At a high level, a "delivery" can be represented as a record being stored in a database having various fields. The database record for a "delivery" can be conceptually indexed or viewed as a collection of records based on any variety of fields, including the shipper (such as the consignor's identity, address, or unique consignor identification number), package (e.g., tracking number), consignee (e.g., consignee name, address, or unique consignee identification number), delivery truck route, etc.

Any particular data field associated with a delivery related record can be thought of as shipment-dependent data, and is called herein a "delivery-related datum" (DRD). From an implementation aspect, CPaD data (which may be shipment-independent or shipment-dependent) can be associated or linked with any DRD within the CPaD Matrix File. For example, every package delivery is associated with a consignee's address. Thus, the consignee's address is one example of a DRD which can be linked to CPaD data. Each delivery is also associated with a shipper (consignor). Thus, the shipper is another form of a DRD, which can be linked to a particular piece of CPaD data. Another example of a DRD is a package identifier such as a tracking number, which is an alpha-numeric value many carriers assign to each package and/or delivery and typically used for tracking purposes. CPaD data can also be linked to a package tracking number. Thus, CPaD data can be associated with any DRD, or a set of DRD associated with a delivery. Thus, CPPDI provided by the carrier, or consignee and consignor personalized information can be linked to DRD for a particular package or delivery.

Various examples illustrate how CPaD data can be associated with different DRD. As discussed above, consignee personalized delivery instructions or preferences can be provided for delivery of a specific package. Thus, the CPaD data (the personalized delivery instructions), would be linked with a DRD, which likely would be the package tracking number. By associating the personalized delivery instructions with the package tracking number, the relevant carrier systems are able to provide the appropriate information to the DIAD at the proper time. For example, if the CPaD data contained an indication that delivery was to be made to the back door at the consignee's address, by linking this data to the package tracking number, this information could be provided as a Note to the DIAD at the time when the delivery personnel delivers the package to the consignee's address.

As another example, if the CPaD data is CPPDI, indicating that a particular pickup location is closed for two weeks, this CPaD data could be linked with the relevant DRD, namely, the address of the pickup location (such as the consignor's address, for instance). By linking this data, the relevant carrier systems would know to trigger this information to the DIAD at the beginning of the delivery day, so that the delivery personnel knows not to drive to this location.

As yet another example, consider a retail business that normally schedules packages to be picked up every business day. The business may request that a particular loading dock be used for all package pickups/deliveries for a given time period week while the normal loading dock is undergoing renovation. In this case, the information may indicate that a certain loading dock should be used for a given time period. It would be appropriate to associate this delivery preference information with the pickup/delivery address for a given time period. This would avoid having to link the CPaD data to each and every package delivered and/or picked up at that location.

Various possibilities for linking CPaD data to DRD are possible, and the following list represents a few of the possibilities of how CPaD data can be linked. For example, a delivery preference could be associated with: a consignee's address, an address with a specific consignee, an individual consignee within that building, consignee's floor of a multi-story building, pickup location of a specific packaging being delivered, pickup location for a set of packages, shipper number, or package tracking number.

The linking or association of CPaD data to DRD is relevant because it can impact how and when the CPaD data is displayed and/or loaded in the DIAD (e.g., the conditions in which the delivery personnel is made aware of the CPaD data) as well as how the delivery preference data may be stored by the carrier. For example, if the delivery preference is linked with a package tracking number, the delivery preference may be stored or linked with a package level detail database record. If it is linked to a service location, a separate database may be used for storing the information.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for linking electronic shipping information stored in an item database to an electronic consignee profile record stored in a consignee profile database to enable transmission of an electronic message using notification preferences for the provision of information regarding an item to be delivered to a consignee, the method comprising:
   storing, by a computing system, an electronic consignee profile record corresponding to a consignee in a consignee profile database that comprises a plurality of electronic consignee profile records, wherein each of the plurality of electronic consignee profile records (1) is identifiable by address matching, (2) comprises a collection of consignee information comprising an address to which items can be delivered, (3) provides the consignee with access to electronic shipping information for items to be delivered by the carrier to the consignee via a web-based interface in electronic communication with the computing system using access credentials, (4) comprises notification preferences for items to be delivered by the carrier to the consignee, and (5) comprises a unique consignee profile identifier;
   receiving, by the computing system, electronic shipping information for an item to be delivered to the consignee, wherein (1) the electronic shipping information comprises an address on a label to which the item is to be delivered, the label affixed to the exterior of the item by a consignor, (2) at least a portion of the electronic shipping information is electronically captured from a scan of the item by scanning equipment, and (3) the electronic shipping information for the item is stored in an item database;

responsive to receiving the electronic shipping information for the item, querying, by the computing system, the consignee profile database to identify the electronic consignee profile record for the consignee of the item from the plurality of electronic consignee profile records stored in the consignee profile database by matching the address of the electronic shipping information stored in the item database to the address of the electronic consignee profile record for the consignee stored in the consignee profile database;

responsive to identifying the electronic consignee profile record in the consignee profile database by matching the address, linking, by the computing system, the electronic shipping information for the item with the electronic consignee profile record by storing the electronic shipping information for the item stored in the item database in association with the electronic consignee profile record stored in the consignee profile database;

after linking the electronic shipping information for the item in association with the electronic consignee profile record in the consignee profile database, accessing, by the computing system, the notification preferences of the electronic consignee profile record for items to be delivered by the carrier to the consignee, wherein (1) the consignee is the intended recipient of the item, and (2) the notification preferences (a) comprise at least one electronic communication format and at least one corresponding electronic destination address to be used in providing the information to the consignee, (b) comprise a time period prior to a first delivery attempt of the item in which an electronic message providing the information is to be transmitted to the at least one corresponding electronic destination address, and (c) are stored in association with the electronic consignee profile record corresponding to the consignee; and automatically generating and transmitting, by the computing system, an electronic message to the at least one corresponding electronic destination address for display via a mobile device, wherein the electronic message is selected from the group consisting of an email message, a short message service message, an automated voice message, a facsimile message, a hosted web site message, a message for an application executing on the mobile device, and an instant message.

2. The method of claim 1 further comprising receiving the notification preferences as input from the consignee.

3. The method of claim 1 further comprising automatically generating the message providing the information regarding the package to be delivered to the consignee.

4. The method of claim 1, wherein the electronic message comprises a link to a carrier's website through which the consignee provides instructions regarding the delivery of the item.

5. A computing system for linking electronic shipping information stored in an item database to an electronic consignee profile record stored in a consignee profile database to enable transmission of an electronic message using notification preferences for the provision of information regarding an item to be delivered to a consignee, the computing system comprising at least one processor and at least one memory, the computing system configured to:

store an electronic consignee profile record corresponding to a consignee in a consignee profile database that comprises a plurality of electronic consignee profile records, wherein each of the plurality of electronic consignee profile records (1) is identifiable by address matching, (2) comprises a collection of consignee information comprising an address to which items can be delivered, (3) provides the consignee with access to electronic shipping information for items to be delivered by the carrier to the consignee via a web-based interface in electronic communication with the computing system using access credentials, (4) comprises notification preferences for items to be delivered by the carrier to the consignee, and (5) comprises a unique consignee profile identifier;

receive electronic shipping information for an item to be delivered to the consignee, wherein (1) the electronic shipping information comprises an address on a label to which the item is to be delivered, the label affixed to the exterior of the item by a consignor, (2) at least a portion of the electronic shipping information is electronically captured from a scan of the item by scanning equipment, and (3) the electronic shipping information for the item is stored in an item database;

responsive to receiving the electronic shipping information for the item, query the consignee profile database to identify the electronic consignee profile record for the consignee of the item from the plurality of electronic consignee profile records stored in the consignee profile database by matching the address of the electronic shipping information stored in the item database to the address of the electronic consignee profile record for the consignee stored in the consignee profile database;

responsive to identifying the electronic consignee profile record in the consignee profile database by matching the address, link the electronic shipping information for the item with the electronic consignee profile record by storing the electronic shipping information for the item stored in the item database in association with the electronic consignee profile record stored in the consignee profile database;

after linking the electronic shipping information for the item in association with the electronic consignee profile record in the consignee profile database, access the notification preferences of the electronic consignee profile record for items to be delivered by the carrier to the consignee, wherein (1) the consignee is the intended recipient of the item, and (2) the notification preferences (a) comprise at least one electronic communication format and at least one corresponding electronic destination address to be used in providing the information to the consignee, (b) comprise a time period prior to a first delivery attempt of the item in which an electronic message providing the information is to be transmitted to the at least one corresponding electronic destination address, and (c) are stored in association with the electronic consignee profile record corresponding to the consignee; and automatically generate and transmit an electronic message to the at least one corresponding electronic destination address for display via a mobile device, wherein the electronic message is selected from the group consisting of an email message, a short message service message, an automated voice message, a facsimile message, a hosted web site message, a message for an application executing on the mobile device, and an instant message.

6. The computing system of claim 5, wherein the computing system is further configured to receive the notification preferences as input from the consignee.

7. The computing system of claim 5, wherein the computing system is further configured to automatically generate the message providing the information regarding the package to be delivered to the consignee.

8. The computing system of claim 5, wherein the electronic message comprises a link to a carrier's website through which the consignee provides instructions regarding the delivery of the item.

* * * * *

UNITED STATES PATENT AND TRADEMARK OFFICE
CERTIFICATE OF CORRECTION

PATENT NO. : 10,078,810 B2  
APPLICATION NO. : 13/913066  
DATED : September 18, 2018  
INVENTOR(S) : Robert Lee Klingenberg et al.

Page 1 of 1

It is certified that error appears in the above-identified patent and that said Letters Patent is hereby corrected as shown below:

On the Title Page

Page 7: Other Publications, Line 14: Please remove "Jan. 20," and replace with --Jan. 30,--.

In the Specification

Column 27, Line 37: Please remove "or and" and replace with --and/or--.
Column 31, Line 26: Please remove "that that" and replace with --that--.

In the Claims

Column 39, Line 52: In Claim 3, before "message" insert --electronic--.
Column 39, Line 53: In Claim 3, delete "package" and insert --item--.
Column 41, Line 06: In Claim 7, before "message" insert --electronic--.
Column 41, Line 6-7: In Claim 7, delete "package" and insert --item--.

Signed and Sealed this
Twentieth Day of November, 2018

Andrei Iancu
*Director of the United States Patent and Trademark Office*